US012060868B2

(12) United States Patent
Li et al.

(10) Patent No.: US 12,060,868 B2
(45) Date of Patent: *Aug. 13, 2024

(54) THERMALLY-POWERED POLYMER FIBER TENSILE ACTUATORS AND ARTICLES INCLUDING SAME

(71) Applicant: Board of Regents, The University of Texas System, Austin, TX (US)

(72) Inventors: Na Li, Richardson, TX (US); Carter S. Haines, Murphy, TX (US); Marcio D. Lima, Richardson, TX (US); Monica Jung DeAndrade, Richardson, TX (US); Shaoli Fang, Richardson, TX (US); Jiyoung Oh, Richardson, TX (US); Mikhail E. Kozlov, Dallas, TX (US); Dongseok Suh, Plano, TX (US); Ray H. Baughman, Dallas, TX (US)

(73) Assignee: The Board of Regents, The University of Texas System, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,305

(22) Filed: Oct. 18, 2021

(65) Prior Publication Data

US 2022/0260062 A1 Aug. 18, 2022

Related U.S. Application Data

(63) Continuation of application No. 16/685,904, filed on Nov. 15, 2019, now Pat. No. 11,149,720, which is a (Continued)

(51) Int. Cl.
*F03G 7/06* (2006.01)
*D01D 5/00* (2006.01)
(Continued)

(52) U.S. Cl.
CPC ............. *F03G 7/06* (2013.01); *D01D 5/0007* (2013.01); *D01F 6/00* (2013.01); *D01H 1/10* (2013.01);
(Continued)

(58) Field of Classification Search
CPC ........... F03G 7/06; D01D 5/0007; D01F 6/00; D01H 1/10; D02G 3/02; D02G 3/26;
(Continued)

(56) References Cited

U.S. PATENT DOCUMENTS 4,843,921 A 7/1989 Kremer
5,460,883 A * 10/1995 Barber, Jr. ............. B29C 48/32
51/299

(Continued)

FOREIGN PATENT DOCUMENTS

JP 4696751 B2 6/2011
JP 4734929 B2 7/2011
(Continued)

OTHER PUBLICATIONS

Foroughi, J., et al., "Torsional Carbon Nanotube Artificial Muscles", Science, vol. 334, No. 6055, Oct. 28, 2011 (Oct. 28, 2011), pp. 494-497.
(Continued)

*Primary Examiner* — Hoang M Nguyen
(74) *Attorney, Agent, or Firm* — Dickinson Wright PLLC; Ross Spencer Garsson

(57) ABSTRACT

Actuators (artificial muscles) comprising twisted polymer fibers generate tensile actuation when powered thermally. In some embodiments, the thermally-powered polymer fiber tensile actuator can be incorporated into an article, such as a textile or garment.

21 Claims, 23 Drawing Sheets

Related U.S. Application Data continuation of application No. 15/814,941, filed on Nov. 16, 2017, now Pat. No. 10,480,491, which is a continuation of application No. 14/418,811, filed as application No. PCT/US2013/053227 on Aug. 1, 2013, now Pat. No. 9,903,350.

(60) Provisional application No. 61/784,126, filed on Mar. 14, 2013, provisional application No. 61/678,340, filed on Aug. 1, 2012.

(51) Int. Cl.

| | | |
|---|---|---|
| *D01F 6/00* | (2006.01) | |
| *D01H 1/10* | (2006.01) | |
| *D02G 3/02* | (2006.01) | |
| *D02G 3/26* | (2006.01) | |
| *D02G 3/44* | (2006.01) | |
| *D04C 1/02* | (2006.01) | |
| *H02N 10/00* | (2006.01) | |
| *H02N 11/00* | (2006.01) | |

(52) U.S. Cl.
CPC ............... *D02G 3/02* (2013.01); *D02G 3/26* (2013.01); *D02G 3/448* (2013.01); *D04C 1/02* (2013.01); *H02N 10/00* (2013.01); *H02N 11/006* (2013.01); *D10B 2401/046* (2013.01); *D10B 2401/061* (2013.01); *D10B 2509/00* (2013.01); *Y10T 428/249921* (2015.04); *Y10T 428/2925* (2015.01)

(58) Field of Classification Search
CPC .......... D02G 3/448; D04C 1/02; H02N 10/00; H02N 11/006; D10B 2401/046; D10B 2401/061; D10B 2509/00; Y10T 428/249921; Y10T 428/2925
USPC ............................. 60/527–529; 310/306–309
See application file for complete search history.

(56) References Cited

U.S. PATENT DOCUMENTS

| | | | |
|---|---|---|---|
| 5,685,149 A | | 11/1997 | Schneider et al. |
| 6,535,311 B1 * | | 3/2003 | Lindquist ............ G02B 6/3576 |
| | | | 359/489.06 |
| 6,555,945 B1 | | 3/2003 | Baughman et al. |
| 6,782,892 B2 | | 8/2004 | Li et al. |
| 6,893,886 B2 | | 5/2005 | Liu et al. |
| 6,924,335 B2 | | 8/2005 | Fan et al. |
| 6,957,993 B2 | | 10/2005 | Jiang et al. |
| 7,045,108 B2 | | 5/2006 | Jiang et al. |
| 7,291,396 B2 | | 11/2007 | Huang et al. |
| 7,321,188 B2 | | 1/2008 | Jiang et al. |
| 7,393,428 B2 | | 7/2008 | Huang et al. |
| 7,438,844 B2 | | 10/2008 | Huang et al. |
| 7,559,253 B2 | | 7/2009 | Liu et al. |
| 7,641,885 B2 | | 1/2010 | Liu et al. |
| 7,641,938 B2 | | 1/2010 | Liu et al. |
| 7,662,467 B2 | | 2/2010 | Li et al. |
| 7,674,410 B2 | | 3/2010 | Huang et al. |
| 7,678,614 B2 | | 3/2010 | Huang et al. |
| 7,704,480 B2 | | 4/2010 | Jiang et al. |
| 7,947,145 B2 | | 5/2011 | Wang et al. |
| 7,947,331 B2 | | 5/2011 | Liao et al. |
| 7,973,295 B2 | | 7/2011 | Jiang et al. |
| 7,988,896 B2 | | 8/2011 | Zhang et al. |
| 7,992,616 B2 | | 8/2011 | Liu et al. |
| 8,012,585 B2 | | 9/2011 | Liu et al. |
| 8,029,900 B2 | | 10/2011 | Wu et al. |
| 8,052,825 B2 | | 11/2011 | Cheng et al. |
| 8,053,069 B2 | | 11/2011 | Katagiri et al. |
| 8,076,836 B2 | | 12/2011 | Liu et al. |
| 8,081,469 B2 | | 12/2011 | Wang et al. |
| 8,158,199 B2 | | 4/2012 | Jiang et al. |
| 8,163,340 B2 | | 4/2012 | Wang et al. |
| 8,216,540 B2 | | 7/2012 | Liu et al. |
| 8,221,667 B2 | | 7/2012 | Yao et al. |
| 8,236,389 B2 | | 8/2012 | Jiang et al. |
| 8,247,055 B2 | | 8/2012 | Jiang et al. |
| 8,268,398 B2 | | 9/2012 | Liu et al. |
| 8,287,678 B2 | | 10/2012 | Feng et al. |
| 8,298,623 B2 | | 10/2012 | Wang et al. |
| 8,309,051 B2 | | 11/2012 | Yao et al. |
| 8,343,451 B2 | | 1/2013 | Feng et al. |
| 8,357,881 B2 | | 1/2013 | Feng et al. |
| 8,410,676 B2 | | 4/2013 | Feng et al. |
| 8,437,136 B2 | | 5/2013 | Wang et al. |
| 8,444,947 B2 | | 5/2013 | Feng et al. |
| 8,445,621 B2 | | 5/2013 | Sunaga et al. |
| 8,450,930 B2 | | 5/2013 | Liu et al. |
| 8,459,866 B2 | | 6/2013 | Li et al. |
| 8,545,745 B2 | | 10/2013 | Chen et al. |
| 8,563,136 B2 | | 10/2013 | Yang et al. |
| 8,603,585 B2 | | 12/2013 | Wang et al. |
| 8,642,121 B2 | | 2/2014 | Dai et al. |
| 8,668,896 B2 | | 3/2014 | Liu et al. |
| 8,795,461 B2 | | 8/2014 | Jiang et al. |
| 8,808,049 B2 | | 8/2014 | Liu et al. |
| 8,815,397 B2 | | 8/2014 | Jiang et al. |
| 8,815,398 B2 | | 8/2014 | Jiang et al. |
| 8,906,191 B2 | | 12/2014 | Jiang et al. |
| 8,906,338 B2 | | 12/2014 | Feng et al. |
| 8,916,081 B2 | | 12/2014 | Chen et al. |
| 8,922,100 B2 | | 12/2014 | Whinnery |
| 9,023,477 B2 | | 5/2015 | Luo et al. |
| 9,040,159 B2 | | 5/2015 | Li et al. |
| 9,048,006 B2 | | 6/2015 | Feng et al. |
| 9,784,249 B2 * | | 10/2017 | Li ........................ H02N 10/00 |
| 9,903,350 B2 * | | 2/2018 | Li ........................ D02G 3/26 |
| 10,480,491 B2 * | | 11/2019 | Li ........................ H02N 10/00 |
| 11,143,169 B2 * | | 10/2021 | Li ........................ H02N 10/00 |
| 11,149,720 B2 * | | 10/2021 | Li ........................ H02N 10/00 |
| 2002/0106956 A1 | | 8/2002 | Howland |
| 2006/0281382 A1 | | 12/2006 | Karayianni et al. |
| 2008/0170982 A1 | | 7/2008 | Zhang et al. |
| 2008/0290141 A1 | | 11/2008 | Shaw et al. |
| 2009/0029052 A1 | | 1/2009 | Luo et al. |
| 2009/0029620 A1 | | 1/2009 | Miura |
| 2009/0085444 A1 * | | 4/2009 | Alvarez Icaza Rivera ................. |
| | | | H02N 11/006 |
| | | | 310/365 |
| 2009/0181239 A1 | | 7/2009 | Fan et al. |
| 2009/0236387 A1 | | 9/2009 | Simonelli et al. |
| 2010/0006278 A1 | | 1/2010 | Fan et al. |
| 2010/0104808 A1 | | 4/2010 | Fan et al. |
| 2010/0234779 A1 | | 9/2010 | Asvadi et al. |
| 2010/0285300 A1 | | 11/2010 | Wang et al. |
| 2010/0308489 A1 | | 12/2010 | Feng et al. |
| 2011/0020210 A1 | | 1/2011 | Liu et al. |
| 2011/0030938 A1 | | 2/2011 | Liu et al. |
| 2011/0039075 A1 | | 2/2011 | Feng et al. |
| 2011/0052478 A1 | | 3/2011 | Feng et al. |
| 2011/0056928 A1 | | 3/2011 | Feng et al. |
| 2011/0094671 A1 | | 4/2011 | Wang et al. |
| 2011/0108545 A1 | | 5/2011 | Wang et al. |
| 2011/0120633 A1 | | 5/2011 | Liu et al. |
| 2011/0155295 A1 | | 6/2011 | Fan et al. |
| 2011/0217547 A1 | | 9/2011 | Mather et al. |
| 2011/0220722 A1 | | 9/2011 | Yu et al. |
| 2011/0278758 A1 | | 11/2011 | Liu et al. |
| 2012/0045643 A1 | | 2/2012 | Liu et al. |
| 2012/0070625 A1 | | 3/2012 | Liu et al. |
| 2012/0100203 A1 | | 4/2012 | Fang et al. |
| 2012/0273118 A1 | | 11/2012 | Jiang et al. |
| 2012/0315459 A1 | | 12/2012 | Fugetsu et al. |
| 2014/0315120 A1 | | 10/2014 | Imanishi et al. |
| 2015/0152852 A1 | | 6/2015 | Li et al. |
| 2015/0219078 A1 | | 8/2015 | Li et al. |
| 2018/0073490 A1 | | 3/2018 | Li et al. |

(56) References Cited

U.S. PATENT DOCUMENTS

| | | |
|---|---|---|
| 2020/0088175 A1 | 3/2020 | Li et al. |
| 2020/0191127 A1 | 6/2020 | Li et al. |

FOREIGN PATENT DOCUMENTS

| | | |
|---|---|---|
| JP | 4743520 B2 | 8/2011 |
| JP | 4807128 B2 | 11/2011 |
| JP | 4968854 B2 | 7/2012 |
| JP | 5061342 B2 | 10/2012 |
| JP | 5178509 B2 | 4/2013 |
| JP | 5229732 B2 | 7/2013 |
| JP | 5299884 B2 | 9/2013 |
| JP | 5429751 B2 | 2/2014 |
| JP | 5437966 B2 | 3/2014 |
| JP | 5629869 B2 | 11/2014 |
| JP | 5629918 B2 | 11/2014 |
| JP | 5679939 B2 | 3/2015 |
| JP | 5699387 B2 | 4/2015 |
| JP | 6228605 B2 | 11/2017 |
| WO | 2014022667 A2 | 2/2014 |

OTHER PUBLICATIONS

Haines, C., et al.; "Artificial Muscles from Fishing Line and Sewing Thread"; Science 343, 868 (Feb. 21, 2014); 5 pages.

Haines, C., et al.; "Supplementary Materials for Artificial Muscles from Fishing Line and Sewing Thread"; [81 Science 343, 868 (Feb. 21, 2014); 36 pages.

Lee, D., et al., "Characteristics of chemo-mechanically driven polyacrylonitrile fiber gel actuators", Materials Science and Engineering c. Elsevier Science S.A, CH, vol. 28, No. 2, Jan. 18, 2008 (Jan. 18, 2008), pp. 294-298.

Lima, M., et al., "Biscrolling Nanotube Sheets and Functional Guests into Yarns", Science, vol. 331, No. 6013, Jan. 6, 2011 (Jan. 6, 2011), pp. 51-55.

China National Intellectual Property Administration; China Application No. 201380051372.0; Notice on Reexamination dated Nov. 12, 2018; 3 pages English Translation.

European Patent Office, European Search Report; EP16170466.3; Dated Jul. 11, 2016; 8 pages.

Examiner Ikki Yasuike, Notification of Reasons for Rejection; Japanese Patent Application No. 2015-183949; dated Jun. 26, 2017; 6 pages English Translation.

International Searching Authority, International Preliminary Report on Patentability; PCT/US2013/053227; dated Feb. 12, 2015; 10 pages.

International Searching Authority, International Search Report and Written Opinion; PCT/US2013/053227; dated Jul. 28, 2014; 16 pages.

International Searching Authority, Written Opinion and International Search Report for PCT/US2013/053227 mailed on Jul. 28, 2014; 15 pages.

Korean Intellectual Property Office, Office Action; Korean Patent Application No. 10-2015-7005179; dated May 17, 2019; 3 pages English translation.

The State Intellectual Property Office of the People's Republic of China; CN201380051372.0; Decision on Rejection; dispatch Mar. 7, 2018; 1 page.

The State Intellectual Property Office of the People's Republic of China; CN201380051372.0; Notice on Second Office Action; dispatch Aug. 9, 2017; 4 pages.

The State Intellectual Property Office of the People's Republic of China; CN201380051372.0; Notice on the First Office Action; dispatch Oct. 27, 2016; 5 pages.

European Patent Office, Communication pursuant to Article 94(3) EPC; EP16170466.3; Dated Dec. 19, 2022; 5 pages.

\* cited by examiner

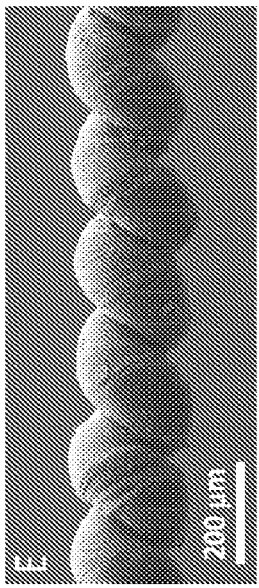
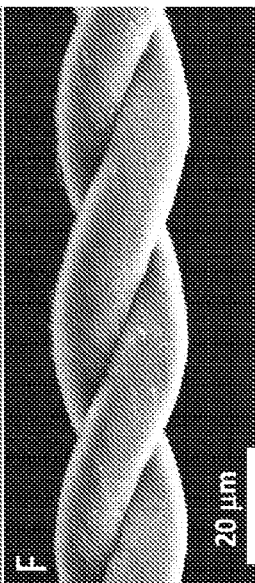
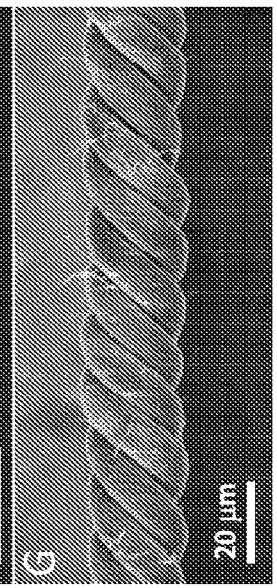
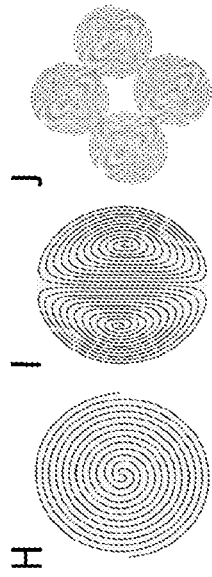
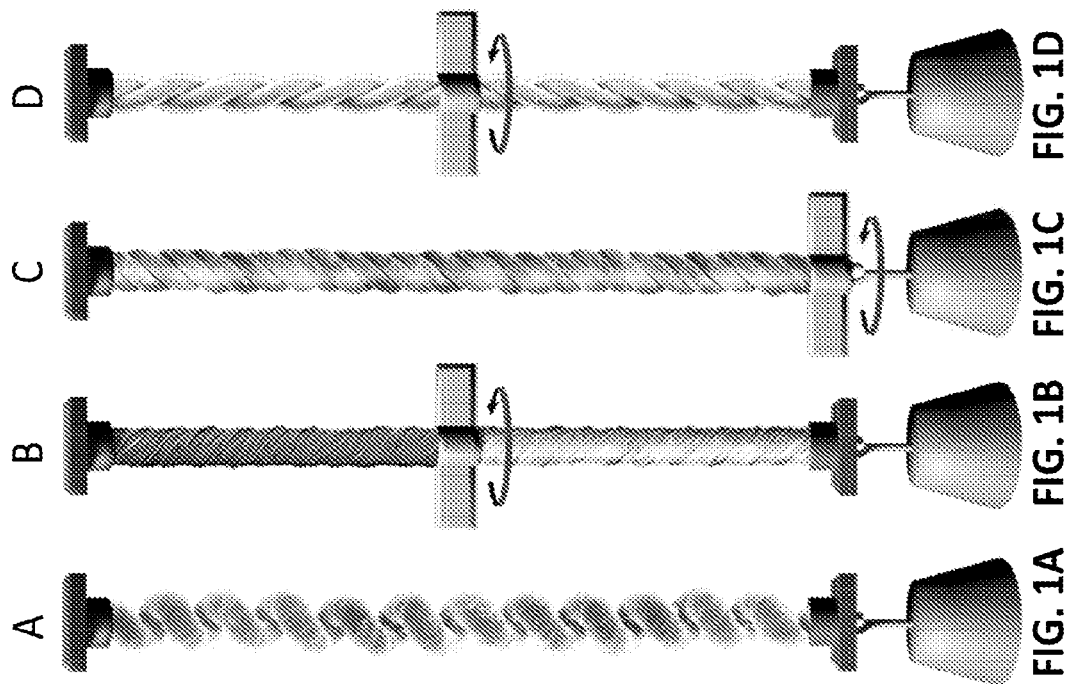

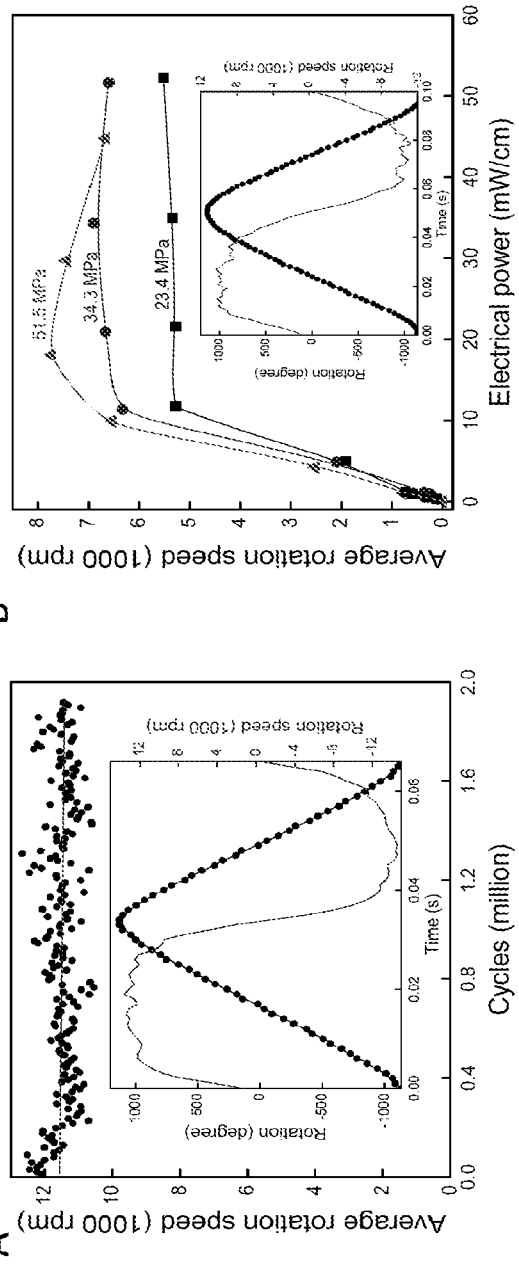
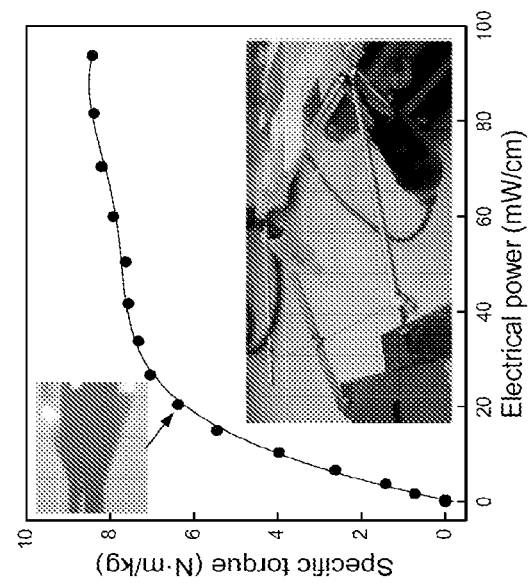
FIG. 4A
FIG. 4B
FIG. 4C

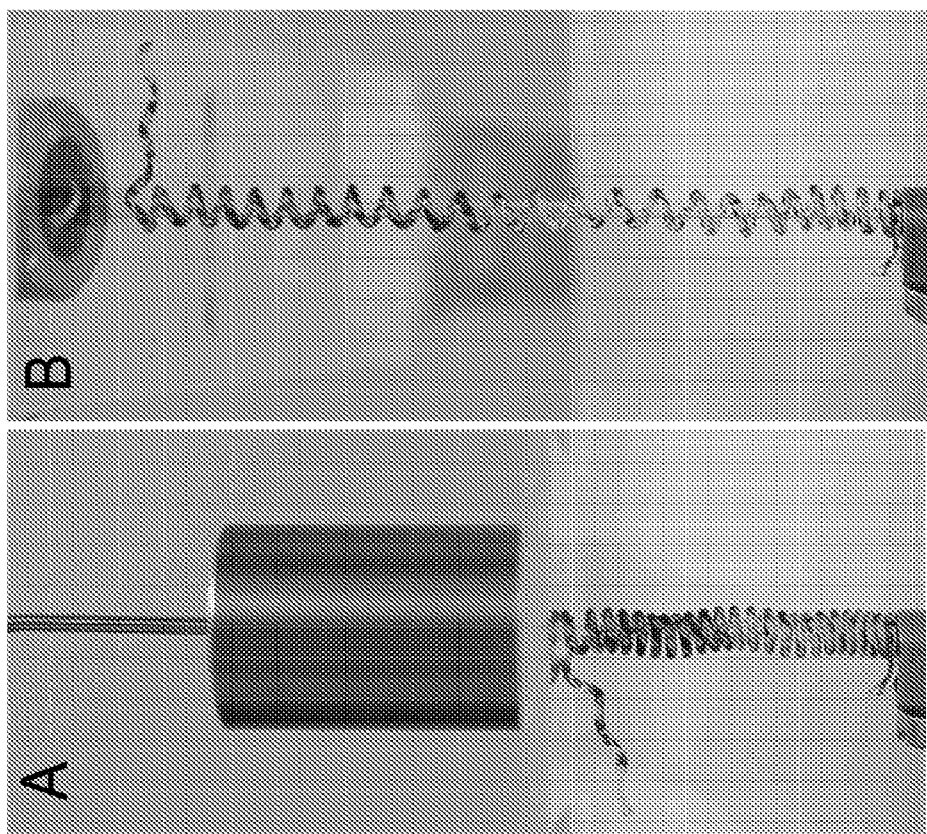

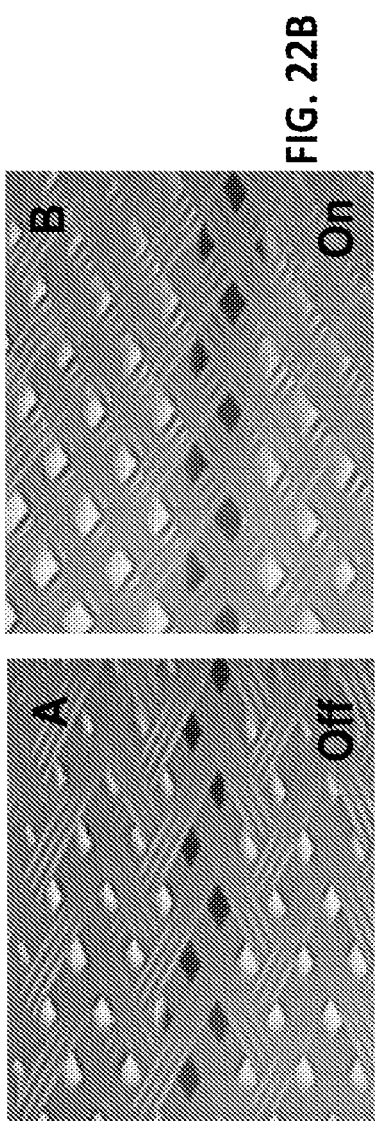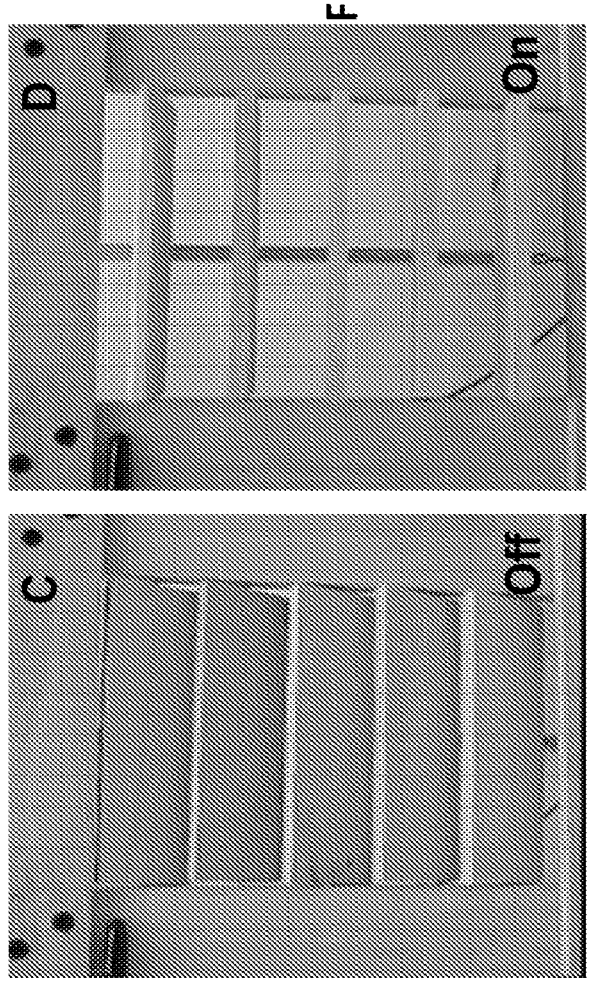
FIG. 22A  FIG. 22B  FIG. 22C  FIG. 22D

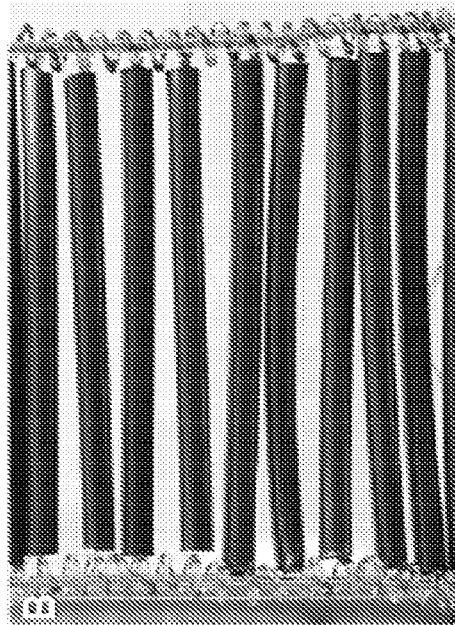
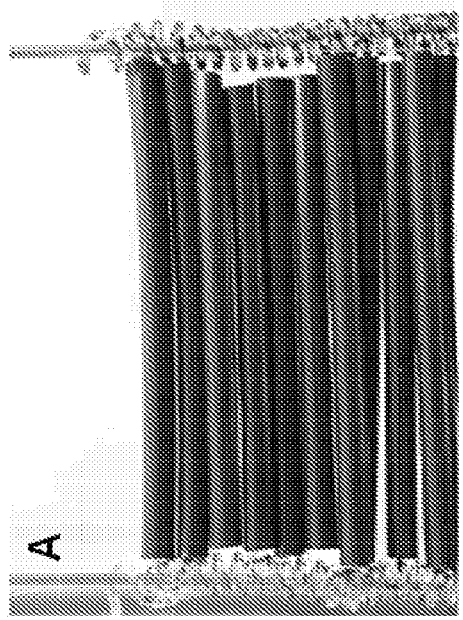
FIG. 23B
FIG. 23A

THERMALLY-POWERED POLYMER FIBER TENSILE ACTUATORS AND ARTICLES INCLUDING SAME

CROSS-REFERENCE TO RELATED PATENT APPLICATIONS

This application is a continuation application of and claims priority and benefit to U.S. patent application Ser. No. 16/685,904, filed on Nov. 15, 2019, entitled "Thermally-Powered Coiled Polymer Fiber Tensile Actuator System And Method," (issued as U.S. Pat. No. 11,149,720 on Oct. 19, 2021), which is a continuation application of U.S. patent application Ser. No. 15/814,941 filed on Nov. 16, 2017, entitled "Coiled, Twisted Nanofiber Yarn and Polymer Fiber Torsional Actuators," (issued as U.S. Pat. No. 10,480,491 on Nov. 19, 2019), which is a continuation application of and claims priority and benefit to U.S. patent application Ser. No. 14/418,811 filed on Jan. 30, 2015, entitled "Coiled And Non-Coiled Twisted Polymer Fiber Torsional and Tensile Actuators" (issued as U.S. Pat. No. 9,903,350 on Feb. 27, 2018), which is the § 371 National Phase application of PCT/US13/53227, filed on Aug. 1, 2013; and claims priority to U.S. Patent Provisional Patent Application Ser. No. 61/678,340, filed on Aug. 1, 2012, entitled "Coiled And Non-Coiled Nanofibers Yarn Torsional And Tensile Actuators," and U.S. Patent Provisional Patent Application Ser. No. 61/784,126, filed on Mar. 14, 2013, entitled "Coiled And Non-Coiled Twisted Nanofiber Yarn And Polymer Fiber Torsional And Tensile Actuators," which patent applications are commonly owned by the owner of the present invention. These patent applications are hereby incorporated by reference in their entirety for all purposes.

GOVERNMENT INTEREST

This invention was made with government support under Grant Nos. FA9550-09-1-0537 and FA9550-12-1-0211 awarded by the Air Force Office of Scientific Research, Grant AOARD-10-4067 awarded by the Air Force, and MURI Grant No. N00014-08-1-0654 awarded by the Office of Naval Research. The government has certain rights in the invention. This invention also was supported by Grant No. AT-0029 from the Robert A. Welch Foundation.

FIELD OF INVENTION

Suitably tethered, twist-spun nanofiber yarns and twisted fibers provide highly reversible electrically, photonically, thermally, or chemically driven torsional or tensile actuation without the required presence of either a liquid or solid electrolytes. Yarn coiling or fiber coiling, either due to over twist or plying of yarn or fiber, dramatically increases actuator tensile stroke, as does yarn filling with a guest that changes dimensions during actuation.

BACKGROUND OF INVENTION

Actuator materials and mechanisms that convert electrical, chemical, thermal, or photonic energy to mechanical energy have been sought for over a century. Nevertheless, humankind has had little success in replicating the wondrous properties of natural muscle, which has meant that the most advanced prosthetic limbs, exoskeletons, and humanoid robots lack critically needed capabilities.

Probably no other material has been described for so many fundamentally different types of actuators than carbon nanotubes. Demonstrated electrically powered and fuel powered nanotube actuators provide up to a few percent actuator stroke and a hundred times higher stress generation than natural muscle. Large stroke pneumatic nanotube actuators have been demonstrated that use electrochemical gas generation within nanotube sheets. In other studies, nanotubes have been used either as electrodes or as additives to profoundly modify the response of other actuating materials—like dielectric, ionically conducting, photoresponsive, shape memory, and liquid crystal polymers.

The following provide examples of these diverse types of actuators based on carbon nanotubes. Electrostatic attraction and repulsion between two nanotubes was used for cantilever-based nano-tweezers [P. Kim, C. M. Lieber, Science 286, 2148-2150 (1999)] and mechanically-based switches and logic elements [T. Rueckes, K. Kim, E. Joselevich, G. Y. Tseng, C. L. Cheung, C. M. Lieber, Science 289, 94-97 (2000); V V. Deshpande, H. Y Chiu, H. W. Ch. Postma, C. Mikó, L. Forró, M. Bockrath, Nano Letters 6, 1092-1095 (2006)]. On the macroscale, electrically powered [R. H. Baughman et al., Science 284, 1340-1344 (1999); U. Vohrer, I. Kolaric, M. H. Hague, S. Roth, U. Detlaff-Weglikowska, Carbon 42, 1159-1162 (2004); S. Gupta, M. Hughes, A. H. Windle, J. Robertson, J. Appl. Phys. 95, 2038-2042 (2004)] and fuel powered [V. H. Ebron et al., Science 311, 1580-1583 (2006)] carbon nanotube actuators provided up to a few percent actuator stroke and a hundred times higher stress generation than natural muscle. Demonstrated large stroke pneumatic nanotube actuators used electrochemical gas generation within nanotube sheets [G. M. Spinks et al., Advanced Materials 14, 1728-1732 (2002)]. Carbon nanotube composites with organic polymers provided photoresponsive [S. V. Ahir, E. M. Terentjev, Nature Materials 4, 491-495 (2005)], shape memory [H. Koerner, G. Price, N. A. Pearce, M. Alexander, R. A. Vaia, Nature Materials 3, 115-120 (2004)], and electromechanical [S. Courty, J. Mine, A. R. Tajbakhsh, E. M. Terentjev, Europhysics Letts. 64, 654-660 (2003)] actuators. Previous work has also demonstrated the use of polymer-filled non-twisted carbon nanotube yarns as thermally powered shape memory materials, but reversible actuation was not achieved [P. Miaudet et al., Science 318, 1294-1296 (2007)]. In other work, dispersed carbon nanotubes or nanotube sheets have been used for electrically heating thermally actuating materials to provide cantilever deflections [A. T. Sellinger, D. H. Wang, L. S. Tan, R. A. Vaia, Adv. Mater. 22, 3430 (2010); L. Chen, C. Liu, K. Liu, C. Meng, C. Hu, J. Wang, S. Fan, ACS Nano 5, 1588 (2011); and Y. Hu, W. Chen, L. H. Lu, J. H. Liu, C. R. Chang, ACS Nano 4, 3498-3502 (2010)]. Major limitations exist for the above described carbon nanotube artificial muscles, as well as prior art artificial muscles of any type. These limitations include slow response, low stroke or force generation, short cycle life, hysteresis in actuator response, use of electrolytes, or a narrow temperature range for operation—and in most cases a combination of some of these and other limitations (like low energy conversion efficiency).

Artificial muscles based on carbon nanotube artificial aerogel sheets have been developed that can operate at extreme temperatures (near 0 K to above 1900 K) where prior-art muscles cannot operate. They provide stroke rates and strokes that can exceed $4\times10^4$%/s and 250% in one direction and generate over 30 times higher force than for the same weight and length natural muscle [A. E. Aliev et al., Science 323, 1575-1578 (2009) and A. E. Aliev et al., PCT International Appl. WO 2010/019942 A2 (2010)]. Unfortunately, these carbon nanotube muscles typically use thousands of volts of applied potential and cannot be scaled in the thickness direction to provide muscles that can support heavy loads.

Electrochemically powered multiwalled carbon nanotube (MWNT) yarn muscles [J. Foroughi et al., *Science* 334, 494-497 (2011)] can generate over a thousand times larger rotation per length than previous torsional muscles based on shape memory alloys [A. C. Keefe, G. P. Carman, *Smart Mater. Struct.* 9, 665-672 (2000)], ferroelectric ceramics [J. Kim, B. Kang, *Smart Mater. Struct.* 10, 750-757 (2001)] or conducting polymers [Y Fang, T. J. Pence, X. Tan, *IEEE/ASME Trans. Mechatronics* 16, 656-664 (2011)]. The twist-spun actuating yarn can accelerate a paddle to 590 revolutions/minute in 1.2 s [J. Foroughi et al., *Science* 334, 494-497 (2011)] and provide similar torque and mechanical power generation per yarn weight as the gravimetric capabilities of large electric motors. However, these advantages come at a cost. Since actuation arises from yarn volume changes generated by ion influx during electrochemical double-layer charge injection, overall system gravimetric performance is degraded by the need for electrolyte, counter electrode, and device packaging, which add much more to actuator weight than the actuating yarn. The liquid electrolyte also limits operating temperature and voltage, as well as actuation rate and deployment possibilities.

In some invention embodiments, the present invention eliminates the need for electrolyte, counter electrode, and special packaging by using a solid guest material in the yarn to generate the volume changes that produce tensile and torsional actuation. As used herein, the term "tensile actuation" denotes actuation in the length direction of an actuator, regardless of whether the actuator elongates or contracts in the length direction during an actuation step. In hybrid nanotube muscles the twist-spun nanotubes confine this actuating guest in both solid and molten states, and provide the mechanical strength and helical geometry enabling torsional actuation and enhanced tensile actuation. Yarn actuator structure will be engineered to maximize either torsional or tensile actuation. Reversible actuation will be powered electrically, photonically, or chemically.

Furthermore, with embodiments of the present invention, the Applicant has provided demonstration of high-cycle-life, large-stroke, and high-rate torsional and tensile artificial muscles that:

(1) Comprise only a neat or hybrid twist-spun nanotube yarn as the actuating element.
(2) Require no electrolyte or counter-electrodes and operate at low voltages.
(3) Can be electrically, chemically, and photonically powered.
(4) Deliver over two million reversible torsional actuation cycles, wherein a hybrid yarn muscle spins a rotor at an average 11,500 revolutions/minute. This rotation rate is 20 times higher than we previously demonstrated for electrochemical carbon nanotube muscles and over 20,000 times higher than for previous muscles based on shape memory alloys, ferroelectric ceramics, or conducting polymers.
(5) Generates a gravimetric torque per muscle weight that is (a) five times higher than for previous electrochemical torsional muscles and (b) slightly higher than for large electric motors.
(6) Delivers 3% tensile contraction at 1,200 cycles/minute for over 1.4 million cycles.
(7) Delivers 27.9 kW/kg average power density during muscle contraction, which is 85 times higher than for natural skeletal muscle. Including times for both actuation and reversal of actuation, a contractile power density of 4.2 kW/kg was demonstrated, which is four times the power-to-weight ratio of common internal combustion engines.
(8) Demonstrated a maximum tensile contraction of 10%.
(9) While the above demonstrations of (3)-(8) are for hybrid muscles in which a twist-spun nanotube host confines a volume expanding guest, the Applicant of the present invention has also demonstrated torsional and tensile actuation for neat twist-spun nanotube yarns that are electrothermally heated to incandescent temperatures. These neat muscles provide 7.3% tensile contraction while lifting heavy loads at extreme temperatures where no other high work capacity actuator can survive.
(10) Demonstrations include torsional motors, contractile muscles, and sensors that capture the energy of the sensing process to mechanically actuate.

Complex coiled fiber geometries are used to dramatically increase actuator performance compared with that of prior art nanofiber yarn muscles.

Paraffin waxes are used in some invention embodiments as prototypical guests in carbon nanotube yarns because of high thermal stability; the tunability of transition widths and temperatures; the large volume changes associated with phase transitions and thermal expansion; and their ability to wet carbon nanotubes. Such waxes have been long investigated and commercially deployed as thermally or electrothermally powered actuators [E. T. Carlen, C. H. Mastrangelo, *Journal of Microelectromech. Syst.* 11, 165 (2002)]. By confining the actuating wax in the nanosized pores of a carbon nanotube yarn, Applicant has avoided conventional hydraulic and external heating systems and directly use a muscle-like geometry, where high surface/volume and thermal and electrical conductivities enhance response rate and a helical geometry enables both torsional rotation and tensile contraction.

In some other invention embodiments, twist insertion and optional fiber coiling is applied to ordinary polymer fibers, like the high strength polyethylene and nylon used for fishing line and sewing thread, in order to obtain high performance artificial muscles that provide torsional actuation, tensile actuation, or a combination thereof. Like for nanofiber yarn invention embodiments, (1) the need for electrolyte, counter electrode, and special packaging is also eliminated, since electrochemical processes are not required for actuation and (2) reversible actuation can be powered electrically, photonically, thermally, or chemically for the twisted and for the coiled polymer fibers.

Both cost and performance provide major advantages for the twisted and coiled polymer fibers. While wires of shape memory metals can generate giant stresses and large strokes and provide fast contractions during electrothermal actuation, these artificial muscles are very expensive—popular high-performance NiTi wires cost about $1400/pound and $1.50/m. In contrast, commercially available polymer fibers that are precursor to the polymer muscles are inexpensive (typically ~$2.50/pound), and the processes needed to convert the commercially fibers to artificial muscles (twist insertion and optional incorporation of conductor) are inexpensive.

Also, competing shape memory metal actuators are heavy and provide hysteretic actuation, which makes them difficult to precisely control, since actuation depends upon prior history within a cycle even when the applied load is constant. Thermally powered shape memory polymer fibers and polymer-filled, non-twisted carbon nanotube fibers can deliver giant strokes and contractile work capacities [P. Miaudet et al., *Science* 318, 1294-1296 (2007)], but provide largely irreversible actuation. Electrochemically driven fibers of organic conducting polymers also provide large strokes, but have poor cyclability and require an electrolyte containment system, which adds to system weight and cost. Invention embodiments will eliminate all of these problems.

SUMMARY OF INVENTION

The present invention includes twist-spun nanofiber yarns and twist-inserted polymer fibers that serve as artificial muscles to produce torsional and/or tensile actuation.

The present invention further has actuators (artificial muscles) including twist-spun nanofiber yarn and twisted polymer fibers that generate torsional and/or tensile actuation when powered electrically, photonically, thermally, chemically, by absorption, or by other means. These artificial muscles utilize non-coiled or coiled yarns or polymer fibers and can be either neat or including a guest. The present invention also includes devices including these artificial muscles.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

It is also to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1D for nanofiber yarns show: tensile load and optional paddle positions for a two-end-tethered, fully-infiltrated homochiral yarn (FIG. 1A); a two-end-tethered, bottom-half-infiltrated homochiral yarn (FIG. 1B); a one-end-tethered, fully-infiltrated homochiral yarn (FIG. 1C); and a two-end-tethered, fully-infiltrated heterochiral yarn (FIG. 1D). A homochiral yarn is a yarn having one chirality (which can differ between yarn twist and coil twist directions) and a heterochiral yarn is one in which different segments have opposite chirality. The depicted yarns are coiled, non-coiled, four-ply, and two-ply, respectively. The arrows indicate the observed direction of paddle rotation during thermal actuation. Red and green yarn-end attachments are tethers, meaning they prohibit end rotation—red attachments also prohibit translational displacement.

FIGS. 1E-1G for carbon nanotube yarns are Scanning Electron Microscopy (SEM) micrographs of homochiral coiled yarn fully infiltrated with paraffin wax (FIG. 1E), neat two-ply yarn (FIG. 1F) and neat four-ply yarn (FIG. 1G).

FIGS. 1H-1J are illustrations of the ideal cross-sections for Fermat (FIG. 1H), dual-Archimedean (FIG. 1I), and guest-infiltrated four-ply Fermat yarns (FIG. 1J).

FIG. 3B shows tensile actuation for the yarn of FIG. 3A with 109 MPa applied tensile stress when driven at 3% duty cycle by 15 ms, 32 V/cm square-wave voltage pulses having a period of 500 ms. FIG. 3C shows the stress dependence of steady-state tensile actuation and contractile work (black and blue data points, respectively) produced by Joule heating (0.189 V/cm) for a 150 µm diameter, dual-Archimedean yarn having different levels of inserted twist. FIG. 3D shows tensile strain versus time for the yarn of FIG. 3C with 3,990 turns/m of inserted twist per precursor sheet stack length, when supporting a 5.5 MPa tensile stress and driven by a 15 V/cm square wave having 50 ms pulse duration and 2.5 s period.

FIGS. 4A-4C show graphs of electrothermal torsional actuation for two-end-tethered, paraffin-wax-infiltrated, carbon nanotube yarns. FIG. 4A shows (for the configuration of FIG. 1B) average revolutions per minute versus cycle number for a 3.9 cm long, half-infiltrated, homochiral Fermat yarn (10 µm diameter and approximately 22,000 turns/m twist), when excited by a 15 Hz, 40 V/cm, square wave voltage using 50% duty cycle and 41 MPa applied load. Each point on the graph represents the average speed over 120 cycles. Inset: rotation angle and rotation speed versus time for one complete cycle. The average rotation speed was approximately 11,500 revolutions/minute over nearly 2 million cycles. FIG. 4B shows average revolutions per minute as a function of applied electrical power for different tensile loads when using the yarn in FIG. 4A, but deploying a heavier paddle. Inset: rotation angle and speed versus time for 51.5 MPa stress. The average speed was 7,600 revolutions/minute. FIG. 4C shows (for the configuration of FIG. 1D) static torque versus applied electrical power for a 100 µm diameter, 6.4 cm long, fully-infiltrated, heterochiral, dual-Archimedean yarn having approximately 3,000 turns/m of inserted twist per stack length. Insets: Greco-Roman catapult configuration used for torque measurements (bottom) and photograph indicating the melting temperature of a paraffin flake applied to the surface of the wax-infiltrated yarn (top left).

FIG. 7A shows a variant of a two-end-tethered, partially infiltrated yarn motor in which contact with a lateral surface prohibits rotation of an attached end weight, but still enables vertical movement of this mechanical load. FIG. 7B shows a torsional motor based on a fully infiltrated yarn that is one-end tethered. In this case the attached mechanical weight can both rotate and translate vertically.

FIGS. 19A-19B are photographs showing a mandrel-wrapped, coiled nylon 6 monofilament fiber (having a positive thermal expansion) when in contracted state at room temperature while supporting a 50 g compressive load (FIG. 19A) and after heating using hot air (FIG. 19B) to lift this compressive load by providing a reversible expansion of coil length. The coiled structure was made by wrapping an 860 µm nylon 6 monofilament about a 2.7 mm diameter mandrel.

FIGS. 20A-20B depict, respectively, the actuation strain observed when the actuators are cyclically heated and cooled between 20° C. and 180° C. The insets of FIGS. 20A-20B show the corresponding tensile moduli under these conditions.

FIG. 21A pictures a flat braid textile made from four SZ polymer fiber muscles that were derived from non-twisted nylon 6 monofilament. FIG. 21B shows round braided ropes made by braiding eight non-coated, SZ nylon 6 yarn muscles. FIG. 21C shows a round braided structure made from MWNT-coated SZ nylon 6 yarn muscles. FIG. 21D shows a plain-weave woven structure constructed by converting a commercially available silver-coated nylon 6,6 multi-filament fiber into a SZ nylon muscle. Eight such coiled SZ muscle fibers were incorporated in the warp direction of the plain weave textile, while cotton yarns were in the weft direction.

FIGS. 22A-22B are pictures of the non-actuated state ("off" state in FIG. 22A) and the electrothermally actuated state ("on" state in FIG. 22B) for a McKibben braid that is woven from polyethylene terephthalate polymer fibers. Electrothermal contractile actuation of the rounded braid nylon muscle of FIG. 21C (which consists of eight braided MWNT-coated SZ nylon muscles), which is located at she center of the McKibben braid, contracts the McKibben braid and opens its porosity. The pore area increase as a result of electrothermal actuation is 16%.

FIGS. 22C-22D show a shutter in the closed and opened positions, respectively, which were obtained by using one coiled, two-end-tethered, two-ply, SZ twisted, silver-coated nylon fiber muscle for noiseless, reversible electrothermal actuation. The shutter opens from the closed position (15° slat inclination with respect to the vertical direction in FIG. 22C) to 90° (the fully open position in FIG. 22D) during fiber actuation.

FIGS. 23A-23B shows the use of mandrel coiled nylon 6 monofilament fibers having a positive thermal expansion for the reversible opening and closing of shutters using changes in ambient temperature. FIG. 23A shows the shutter in closed position at room temperature and FIG. 23B shows the shutter in an opened, expanded state at a environmental temperature of approximately 80° C. (FIG. 23B). Intermediate temperature exposures provide intermediate degrees of shutter closing.

DETAILED DESCRIPTION

Figures 2A, 2B:
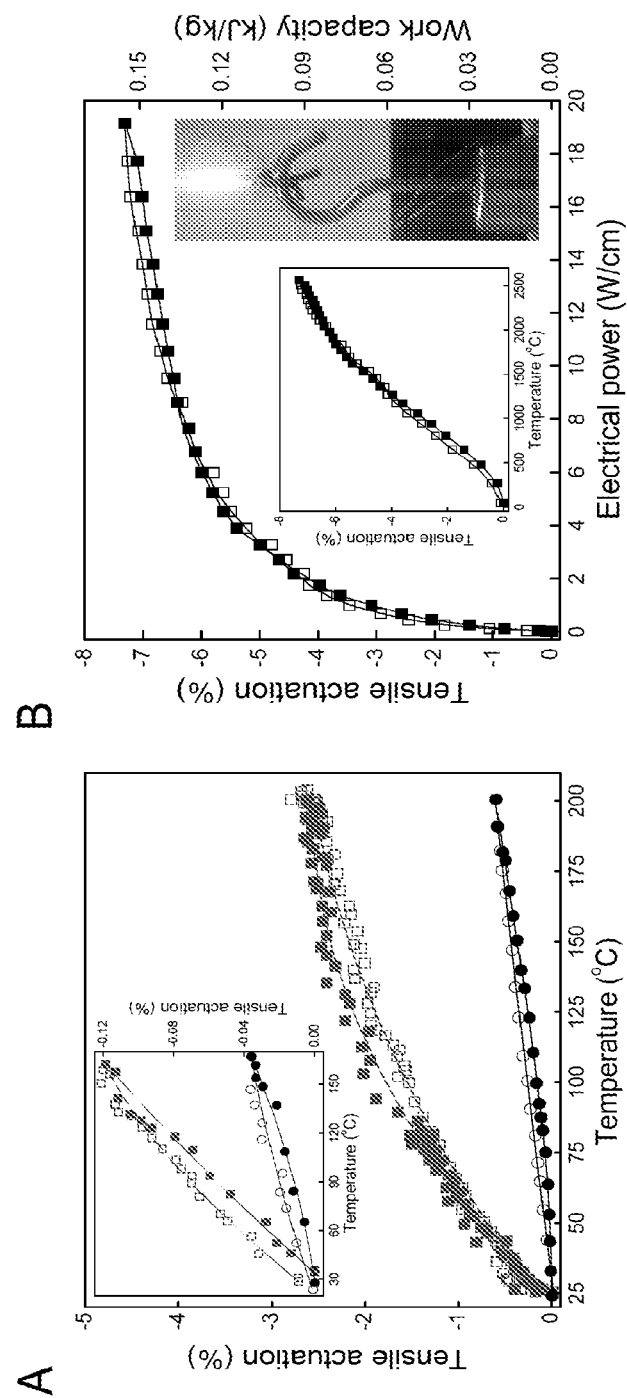
FIG. 2A shows (for the configuration of FIG. 1A) a graph of the measured dependence of tensile actuation strain on temperature before (black) and after (red) paraffin wax infiltration for a two-end-tethered, coiled, homochiral, dual-Archimedean yarn having 130 µm initial diameter, an inserted twist of approximately 4,000 turns/m (per length of the precursor sheet stack), and an applied stress of 6.8 MPa. Inset: Corresponding actuation data before (black) and after (red) paraffin wax infiltration for a non-coiled Fermat yarn having 16 µm initial diameter, approximately 20,000 turns/m twist, and an applied stress of 4.8 MPa. Closed and open symbols are for increasing and decreasing temperature, respectively.
FIG. 2B shows (for the configuration of FIG. 1A) a graph of electrothermal tensile actuation strain and work capacity during contraction in vacuum as a function of applied electrical power for a two-end-tethered, neat, coiled, homochiral, dual-Archimedean, carbon nanotube yarn having 115 µm diameter and ~4,000 turns/m of inserted twist. Insets: Tensile actuation versus estimated temperature for this yarn (left) and photograph of the incandescent yarn lifting a 10 g load. Closed symbols and open symbols are for increasing and decreasing temperature, respectively.

The present invention is directed to mechanical actuators comprising twist-spun nanofiber yarns or twist-inserted polymer fibers as the sole or the predominant actuation material. Unlike most conventional mechanical actuators, the property changes of an actuating material cause actuation. For this reason, and because of other similarities in operation, we call these mechanical actuators artificial muscles.

While artificial muscles have been of practical interest for over 60 years, few types have been commercially exploited. Typical problems include slow response, low strain/force generation, short cycle life, use of electrolytes, and low energy efficiency. We have designed guest-filled, twist-spun carbon nanotube yarns having useful topological complexity as electrolyte-free muscles that provide fast, high-force, large-stroke torsional and tensile actuation. Over a million reversible torsional and tensile actuation cycles are demonstrated, wherein a muscle spins a rotor at an average 11,500 revolutions/minute or delivers 3% tensile contraction at 1,200 cycles/minute. This rotation rate is 20 times higher than previously demonstrated for an artificial muscle and the 27.9 kW/kg power density during muscle contraction is 85 times higher than for natural skeletal muscle. Actuation of hybrid yarns by electrically, chemically, and photonically powered dimensional changes of yarn guest generates torsional rotation and contraction of the helical yarn host. Demonstrations include torsional motors, contractile muscles, and sensors that capture the energy of the sensing process to mechanically actuate.

The artificial muscles of invention embodiments comprise a twist-spun nanofiber yarn. For the purpose of invention embodiments, "nanofibers" are defined as fibers that have smallest lateral of below 1000 nm. Networks of electrically interconnected nanofibers having predominately smallest nanofiber lateral dimensions of either below 100 nm or below 10 nm can be especially useful for different invention embodiments. Nanoribbons are considered to be a specific type of nanofibers.

While the making and/or using of various embodiments of the present invention are discussed below, it should be appreciated that the present invention provides many applicable inventive concepts that may be embodied in a variety of specific contexts. The specific embodiments discussed herein are merely illustrative of specific ways to make and/or use the invention and are not intended to delimit the scope of the invention.

The Fabrication and Structure of Twist-Spun Nanofiber Yarns

The actuator material optimally comprises a network of twist-spun nanofibers that is in the form of a yarn or a material comprising a twist-spun nanofiber yarn, such as a woven textile or a braided or plied twist-spun yarn. Various nanofibers and nanofiber syntheses and fabrication processes can be usefully deployed, as can be mixtures of different nanofiber types and mixtures of nanofibers with other materials. As one important example, especially for hybrid actuating yarns, oriented nanofibers produced by electrostatic spinning can be twist-spun into yarns either during or after electrostatic spinning. As another important example, the nanotubes in forest drawn carbon nanotube sheets can be coated with another material as a template (such as a ceramic or metal), and then twist spun to make an actuating yarn (which can usefully be infiltrated with a guest to make a hybrid actuating yarn) [M. D. Lima et al., *Science* 331, 51-55 (2011)]. Depending upon the intended muscle deployment, the nanotube template for this process can optionally be removed either before or after twist spinning.

Because of their strength, electrical conductivity, and mechanical strength, carbon nanotubes (CNTs) are especially preferred for invention embodiments. Especially useful types of CNTs include carbon multiwalled nanotubes (MWNTs), carbon few-walled nanotubes (FWNTs), and carbon single-walled nanotubes (SWNTs). Such SWNTs and FWNTs are useful for invention embodiments even when the nanotube diameter is sufficiently large that the SWNTs or FWNTs collapse into ribbons.

Twist-spun nanofiber yarns that comprise nanoribbons of graphene sheets are especially useful for actuating for embodiments of the invention. One preferred method for making these graphene ribbons as high aspect ratio nanofibers is by unzipping carbon nanotubes [D. M. Kosynkin et al., *Nature* 458, 872-876 (2009)]. This unzipping process can be accomplished either before or after a CNT array (such as a CNT sheet) is twist spun into a yarn.

Both solid-state and liquid-state processing methods can be used to produce twisted nanofiber yarns that are useful for invention embodiments. Some examples of useful solution spinning methods are polymer-coagulation-based spinning and solution-based spinning methods that do not involve a polymer coagulant [B. Vigolo et al., *Science* 290, 1331 (2000); L. M. Ericson et al., *Science* 305, 1447 (2004); S.

Kumar et al., *Macromolecules* 35, 9039 (2002); and A. B. Dalton et al., *Nature* 423, 703 (2003)]. To provide twisted nanofiber yarns useful for invention embodiments, yarn twist must be inserted during or after yarn solution spinning. Additionally, for solution spinning using coagulants (such as a polymer) that remain in the yarn after solution spinning, it is typically useful to remove these coagulants before using these yarns to make twist-spun yarns of invention embodiments.

Because of these complications in using solution spinning to make twisted yarns, as well as CNT length degradation during CNT dispersion for solution spinning, chemical vapor deposition methods that directly result in nanotube assemblies that are suitable for spinning are preferred. Such spinning methods that do not involve dispersion of CNTs in a liquid are referred to as solid-state spinning, whether or not liquids are deployed during or after processing. The resulting yarns are generally stronger and able to accommodate higher twist insertion than neat yarns derived by solution spinning. The first such solid-state spinning method involved chemical vapor deposition (CVD) synthesis of nanotubes using a floating catalyst and subsequent yarn draw a twist insertion into a collected CNT aerogel [Y. Li, I. A. Kinloch, A. H. Windle, *Science* 304, 276 (2004)]. Later methods of twist-based spinning involved twist insertion into a nanotube aerogel sheet that has been drawn from a nanotube forest that has been synthesized on a substrate by CVD. Such twist insertion can be either during sheet draw from a CNT forest [M. Zhang, K. R. Atkinson, R. H. Baughman, *Science* 306, 1358-1361 (2004)] or after a sheet or sheet stack has been drawn from a CNT forest [M. D. Lima et al., *Science* 331, 51-55 (2011)].

Unless otherwise indicated, the artificial muscle yarns described in the Examples 1-9 were fabricated by first using the following methods to make twist-spun non-coiled and coiled CNT yarns. Drawable carbon MWNT forests for producing twist-spun yarns were grown by chemical vapor deposition on silicon wafers coated by iron catalyst using acetylene ($C_2H_2$) gas as the carbon precursor [M. Zhang, K. R. Atkinson, R. H. Baughman, *Science* 306, 1358-1361 (2004)]. Transmission and scanning electron microscope (SEM) images of the approximately 350 μm high forests indicate that the MWNTs have an outer diameter of approximately 9 nm, contain about 6 walls, and form large bundles. Thermogravimetric analysis indicates that the amount of non-combustible material in the drawn nanotubes is below 1 wt %, which places an upper limit on the amount of residual catalyst.

Small and large diameter yarns were fabricated in which twist insertion resulted in three different scroll geometries: Fermat, Archimedean, and dual-Archimedean [M. D. Lima et al., *Science* 331, 51-55 (2011)]. Small diameter yarns were made by symmetrical twist insertion during sheet draw from a forest or into a pre-drawn nanotube sheet suspended between either a forest and one rigid end support or two rigid end supports. Because of differences in end constraints, these methods provide Fermat scrolls (FIG. 1H) for the former cases of sheets connected to a forest and dual-Archimedean scrolls (FIG. 1I) for the latter case, where two rigid rod supports are used. The yarn diameter could be conveniently varied from about 10 μm to about 30 μm by changing the drawn forest width from about 0.5 cm to about 5 cm. Much larger diameter dual-Archimedean yarns were typically fabricated by stacking 20 to 40 MWNT sheets (1.0 cm to 2.5 cm wide and 5 to 17 cm long) between rigid rods and inserting twist using an electric motor, while one end of the sheet stack supported a 5 g weight that was tethered to prohibit rotation. Approximately 150 turns were necessary to collapse a 5 cm long sheet stack into a 4.5 cm long yarn having dual-Archimedean structure. Introduction of asymmetric stress during twist insertion can convert these Fermat and dual-Archimedean yarns to Archimedean yarns [M. D. Lima et al., *Science* 331, 51-55 (2011)].

Figures 3A, 3B, 3D:
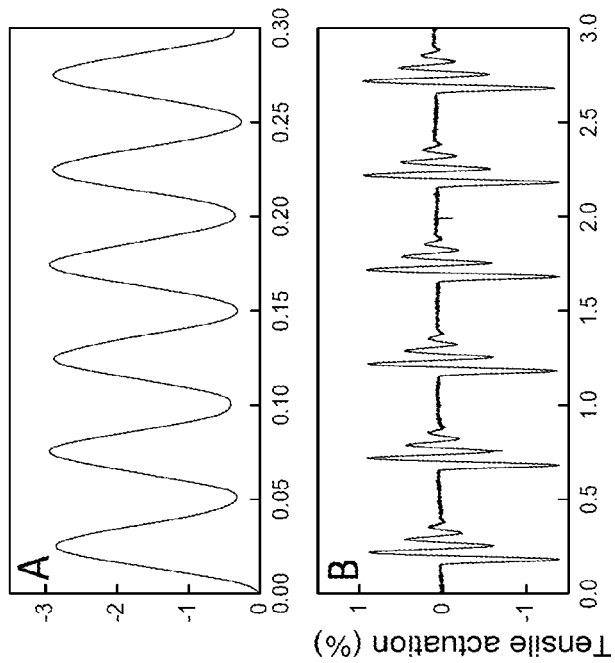
FIGS. 3A-3D show (for the configuration of FIG. 1A) graphs of electrothermal tensile actuation for two-end-tethered, homochiral, paraffin-wax-filled carbon nanotube yarns. The data in FIG. 3A show tensile actuation strain versus time after 1,400,000 reversible cycles for a 11.5 µm diameter, coiled Fermat yarn having approximately 25,000 turns/m twist that was driven at 50% duty cycle by a 18.3 V/cm, 20 Hz square wave voltage while lifting a load that provided a 14.3 MPa stress.
Figure 5:
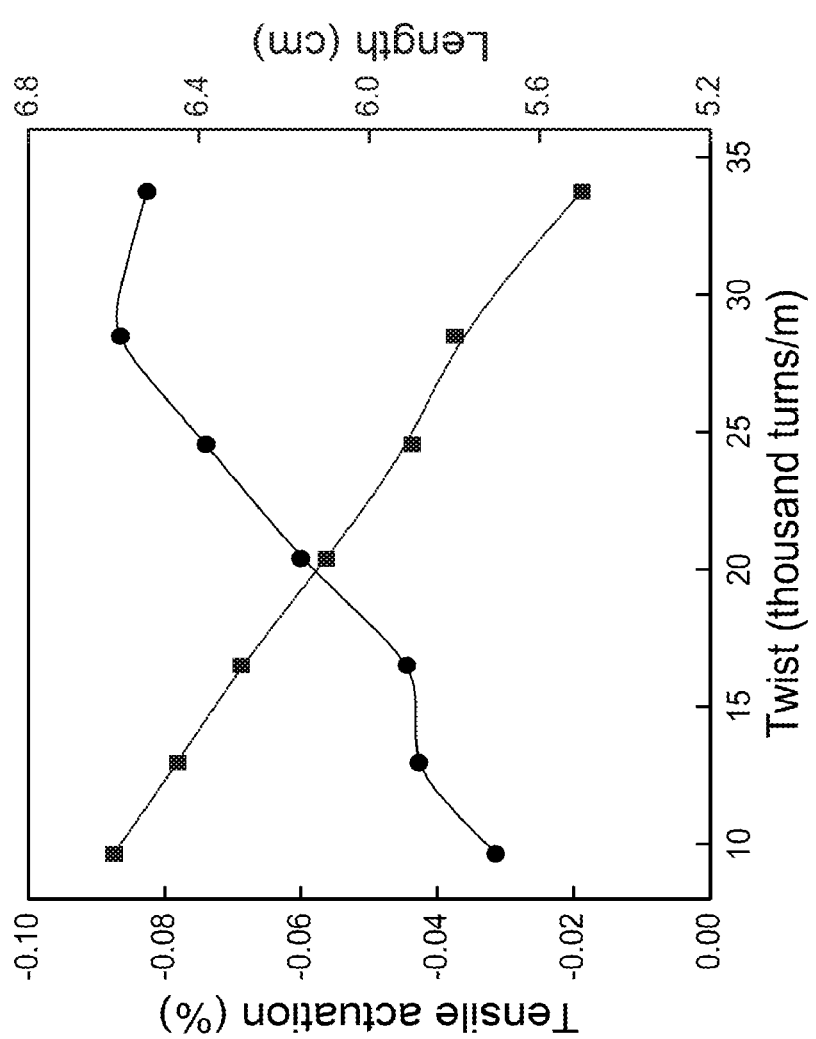
FIG. 5 shows a graph of tensile actuation as a function of inserted twist for a neat, homochiral, carbon nanotube, Fermat yarn in the configuration of FIG. 1A. The steady-state electrical power applied to obtain yarn contraction was constant (85±2.6 mW/cm) when normalized to the measured yarn length for each degree of twist, so the input power per yarn weight was also constant. Mechanical load was constant and corresponded to 72 MPa stress for the 13.5 µm yarn diameter measured by SEM for the untethered yarn. The lines are guides for the eyes.
Figures 6A, 6B:
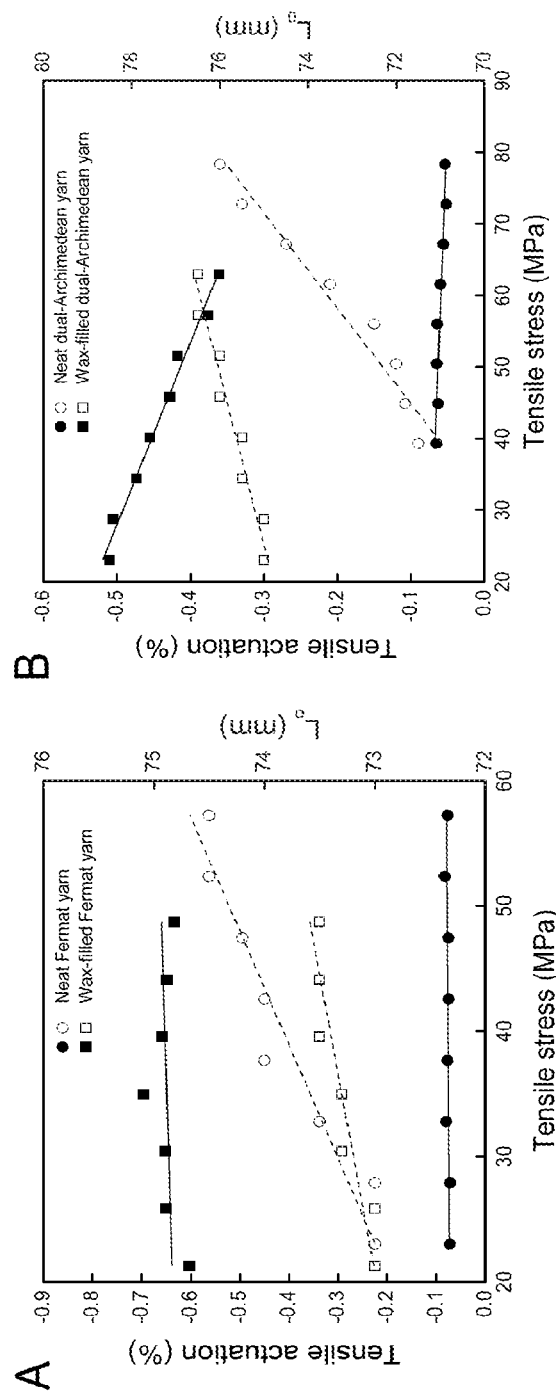
FIGS. 6A-6B show graphs of tensile actuation (left axis) and length (right axis) versus applied stress for a homochiral, non-coiled, carbon nanotube, Fermat (FIG. 6A) yarn and a dual-Archimedean carbon nanotube yarn (FIG. 6B) having 20,000±500 turns/m of inserted twist and about the same diameter before (17.5±0.5 µm and 16.4±0.9 respectively) and after paraffin wax infiltration (18.1±0.9 µm and 16.2±1.1 respectively). The configuration of FIG. 1A was used and the electric power per length was adjusted to be 35±2 mW/cm for each load, which provided actuation to far above the temperature (~83° C.) at which complete melting of the paraffin wax occurred. The lines are guides for the eyes.

Fermat yarns directly spun during sheet draw from a forest were used for immersion-driven torsional actuation; polydiacetylene hybrid yarn muscles; two-ply yarn muscles; and non-plied, wax-filled torsional muscles. The Fermat yarns of FIG. 2A inset; FIGS. 3A-3B; FIGS. 4A-4B; FIG. 5 and FIGS. 6A-6B; were fabricated by drawing a length of nanotube sheet from a forest, and then inserting twist into one end of the sheet via a motor and a rigid support, while allowing the other end to freely draw from the MWNT forest. Unless otherwise noted, inserted twist is normalized with respect to the final yarn length. For these other instances, where in most cases twist was inserted in a sheet stack to form a dual-Archimedean yarn, twist was normalized to the length of the sheet stack.

The amount of inserted twist per final yarn length (T) and the final yarn diameter (d) are important parameters, which for Fermat yarns determine the bias angle (α) between the nanotube orientation on the yarn surface and the yarn direction. Unless otherwise indicated, both d and α were measured by SEM microscopy on yarns that were two-end-tethered under tension to prohibit untwist. For Fermat yarns, the theoretical relationship $\alpha = \tan^{-1}(\pi dT)$ is consistent with observations, despite the complex nature of the realized yarn structure, which contains stochastic elements due to such processes as sheet pleating during twist insertion [M. D. Lima et al., *Science* 331, 51-55 (2011)]. In contrast, since the number of turns inserted by plying two Archimedean scrolls into a dual-Archimedean scroll (versus the initial number of turns that provide twist in each Archimedean scroll) is a consequence of yarn energetics, a strictly topological equation to predict α from only d and T does not exist. For the same reason, such a simple topological relationship, involving no added parameters, cannot be obtained for coiled twist-spun yarns of any type.

Figure 8:
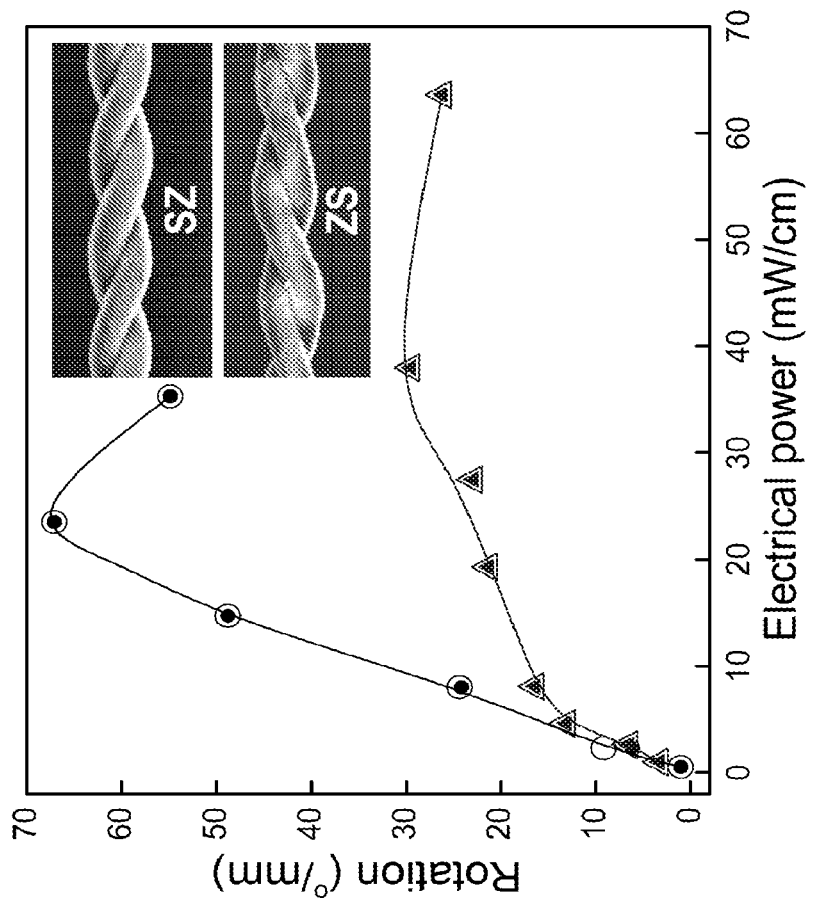
FIG. 8 shows steady-state torsional rotation as a function of electrical power for a neat, heterochiral, two-ply, Fermat yarn in vacuum (blue triangles) and the same yarn type in air after wax filling (black circles) on increasing and decreasing temperature (filled and open symbols, respectively). The insets are SEM micrographs showing the structure of SZ and ZS segments, which were knotted together to make the heterochiral SZ-ZS yarn. The paddle was located between SZ and ZS segments for the used two-end tethered configuration of FIG. 1D. The lines are guides for the eyes.

According to the direction of twist insertion, yarns are classified as S or Z yarns (for clockwise and anticlockwise twist insertion, respectively). If all segments in a yarn have the same chirality at corresponding structural levels, the yarn is called homochiral. This means, for instance, that a SZ two ply yarn (with S twist due to plying and Z twist within each ply) is homochiral. If the yarn has segments having different chirality at the same structural level, then the yarn is called heterochiral. For the heterochiral yarns presently described, different chirality yarn segments are essentially mirror image of each other (see inset of FIG. 8).

The presently used term "inserted twist" (which is sometimes called linking number) is the sum of internal yarn twist and the twist due to coiling. As done for other structural terms, "yarn diameter" refers to the diameter of the component yarn even when it is within a coiled or plied structure, and is thereby differentiated from the "coiled yarn diameter" or the "plied yarn diameter".

Over-twisting MWNT yarns, as for ordinary textile yarns, rubber bands, and DNA molecules, causes coiling (which is called "writhe"). Applicant has discovered that such coiling, as well as coiling in plied yarn, can be used to dramatically amplify tensile stroke and work capabilities compared with those for uncoiled yarn. Coiled yarns (FIG. 1E) were typically fabricated under constant load from non-coiled, twist-spun yarns by inserting additional twist until the yarn contracted to 30-40% of its original length. For a dual- Archimedean yarn made under 4 g load by twist insertion in a stack of 40 co-oriented, 9 mm wide, 15 cm long sheets, coiling started at approximately 580 turns and the yarn was completely coiled after approximately 620 turns. Twist insertion until complete coiling occurred (except in the vicinity of the yarn ends) produced a 60% contraction in yarn length.

Four-ply yarns (FIG. 1G and FIG. 1J) were fabricated by inserting S twist of plying into four identical, parallel-aligned, S-twisted, single-ply Fermat yarns. Two-ply yarns (FIG. 1F) were fabricated as follows: A ZS yarn was obtained by inserting about 30% extra S twist into a 11 µm diameter, Fermat S yarn having an initial twist of 20,000 turns per meter. This highly twisted yarn was then folded upon itself, so that part of the S twist was converted to Z twist due to plying. A SZ yarn was made analogously.

The term coiled yarn is used herein to generically refer to a yarn that has at least an approximately helical shape in some yarn portions, whether or not this coiling is a result of simple yarn overtwist (like in FIG. 1E) or such processes as yarn plying (FIG. 1F for two-ply yarn and FIG. 1G for four-ply yarn).

Depending upon application needs, nanofiber sheets used for fabrication of twist-spun nanofiber yarns can be optionally densified before twist insertion. Also, the nanofiber yarns produced by twist spinning can optionally be densified after or during twist insertion. A particularly convenient method for causing sheet densification is by using surface tension effects due to the process of liquid infiltration and subsequent liquid evaporation.

Electrospinning of nanofibers, and especially polymer nanofibers, provides a useful alternative route to twist-spun nanofiber yarns that provide useful hosts for hybrid yarn muscles. In one invention embodiment these nanofibers are first electrospun into oriented sheets of nanofibers using electrospinning methods described in the literature [L. S. Carnell et al., *Macromolecules* 41, 5345-5349 (2008); D. Li, Y. Xia, *Advanced Materials* 16, 1151-1170 (2004); P. Katta, M. Alessandro, R. D. Ramsier, G. G. Chase, *Nano Letters* 4, 2215-2218 (2004)]; S. F. Fennessey, R. J. Farris, *Polymer* 45, 4217-4225 (2004)]. Like for the case of carbon nanotube sheets, these nano-fiber sheets can be twist spun into yarns. Guests used for carbon nanotube muscles can be provided within the host yarn either by guest deposition on the sheets before twist spinning or by incorporation of the guest after twist spinning.

Various known methods of twist insertion can be used for introducing twist during spinning into yarns. Such methods include, but are not limited to, ring spinning, mule spinning, cap spinning, open-end spinning, vortex spinning, and false twist spinning technologies [See E. Oxtoby, Spun Yarn Technology, Butterworths, 1987 and C. A. Lawrence, Fundamentals of Spun Yarn Technology, CRC Press, 2002].

Twist-spun yarns that comprise nanofibers are especially useful for selected invention embodiments. One reason is in the giant interfacial energies that arise on the nanoscale enable the convenient confinement of molten guest in a hybrid yarn muscle. Consider, for example, that the molten wax in an actuated wax-filled yarn undergoes a fractional volume decrease $\Delta V_w/V_w$ when cooled. If this wax volume change occurred without decreasing yarn volume, nanotube-paraffin interfacial energies ($\gamma_{np}$) would be replaced by nanotube-air interfacial energies ($\gamma_{na}$) at an energy cost of $(\gamma_{na}-\gamma_{np})(\lambda V_w/V_w)A_n$, where $A_n$ is the gravimetric surface area of the nanotubes. Using $\gamma_{na}-\gamma_{np}\sim18$ mJ/m$^2$ [R. Zhou et al., *Nanotechnology* 21, 345701 (2010)], $A_n\sim97$ m$^2$/g [P. Nitschke, S. Pegel, M. Claes, D. Bonduel, *Macromol. Rapid Commun.* 28, 244 (2008)], and $\Delta V_w/V_w\sim0.2$, about 0.35 kJ/kg of energy is available to compress the nanotube yarn as the volume of the liquid wax decreases. During subsequent yarn actuation by heating and corresponding wax expansion, this elastic energy in the yarn is progressively released, thereby maintaining coincidence between molten wax and yarn volume over the entire actuation cycle—as is observed. This analysis correctly predicts that excess wax on the yarn surface, as well as wax evaporation, will decrease tensile stroke.

Both very large and very small diameter twisted nanofiber yarns are useful for embodiments of this invention. However, it should be recognized that (1) the rate of unassisted cooling in ambient air to reverse thermal actuation generally increases as the surface-to-volume ratio of the yarn decreases with increasing yarn diameter and (2) the load carrying capabilities of nanofiber yarns generally increase with increasing yarn diameter. Single-ply carbon nanotube yarn diameters of ~4 µm to ~50 µm can be directly twist spun from ~400 µm high carbon nanotube forests, and increasing forest height and increasing forest density increases the yarn diameter obtainable by spinning a given width of forest. Sheets from ~400 µm high carbon nanotube forests can be pre-drawn, stacked, and then twist spun to produce single-ply yarns have several hundred micron diameter. These diameters can be dramatically increased by yarn plying and by guest incorporation prior to twist insertion. By using specialized techniques, carbon nanotube yarn diameters down to ~100 nm can be twist spun from carbon nanotube forests [W. Li, C. Jayasinghe, V. Shanov, M. Schulz, *Materials* 4, 1519-1527 (2011)]. Also important for micron scale and smaller scale applications of invention embodiments, the self-twisting of two nanowires can produce a nanoscale plied yarn structure [X. Y. Ji, M. Q. Zhao, F. Wei, X. Q. Feng, *Appl. Phys. Lett.* 100, 263104 (2012)].

The investigated tensile and torsional actuators were subjected to at least 30 initial training cycles in order to stabilize the structure of the hybrid yarn, and thereby enable highly reversible operation during subsequent evaluation for sometimes over 2 million reversible actuation cycles. For the case of thermally powered muscles, these training cycles were typically to the maximum temperature where the muscle would be deployed.

Incorporation of Guest in Nanofiber Yarn Muscles

Methods for incorporating guest actuating material into a host yarn include, for example, melt and solution infiltration (which can be followed by in-situ polymerization) and biscrolling, where the guest is deposited on a MWNT sheet before twist insertion [M. D. Lima et al., *Science* 331, 51 (2011)]. Some of the methods used for making hybrid carbon nanotube yarns are described in Examples 1-4. Paraffin waxes are preferred guests because of high thermal stability; the tunability of transition widths and temperatures; the large volume changes associated with phase transitions and thermal expansion; and their ability to wet carbon nanotube yarns.

As applied in some invention embodiments, biscrolling methods [M. D. Lima et al., *Science* 331, 51-55 (2011) and M. D. Lima et al., PCT Patent WO2011005375 (A2)] involve deposition of the guest materials onto (1) a carbon nanotube sheet wedge that results from direct twist-based spinning from a forest or (2) a self-suspended nanotube sheet or sheet stack obtained by sheet draw from a forest. Various host nanofiber webs (i.e., sheets) can also be usefully deployed as described in Section 1.0 above. Deposition of guest materials can be accomplished using conventional methods that can result in a layered stack of guest and host.

More generally, nanofiber webs that are useful for invention embodiments can comprise nanofibers other than carbon nanotubes, and these webs can be produced by a process other that sheet draw, such as electrostatic spinning [L. S. Carnell et al., *Macromolecules* 41, 5345-5349 (2008); D. Li, Y. Xia, *Advanced Materials* 16, 1151-1170 (2004); P. Katta, M. Alessandro, R. D. Ramsier, G. G. Chase, *Nano Letters* 4, 2215-2218 (2004); S. F. Fennessey, R. J. Farris, *Polymer* 45, 4217-4225 (2004)].

In some embodiments of the present invention, liquid-free deposition is preferably used. Electrostatic deposition of guest onto the nanotube web (i.e., sheet or sheet wedge) from a carrier gas using an electrostatic powder coating gun is fast and controllable—attraction between charged guest particles and the grounded or oppositely charged target web helps formation of a uniformly deposited layer of guest particles over the deposition area.

Other liquid-free biscrolling processes involve deposition of the guest material by electron beam evaporation, sputtering, chemical vapor deposition, plasma-enhanced CVD, dry powder airbrush deposition, or deposition of gas-dispersed guest nanoparticles immediately after their formation by reaction of gases.

Liquid state and quasi-liquid-state guest deposition also work, such as electrophoretic deposition; solution filtration-based deposition using the nanotube sheet stack as a filter to capture guest nanoparticles; drop casting, and ink-jet printing.

Ink jet printing of guest is effective even for self-supported individual nanotube sheets having such low areal density as 1 μg/cm$^2$ and can be conveniently used to provide patterned depositions of one or more guest materials—thereby leading to engineered variation in guest composition along the yarn length and along the yarn diameter. Such non-uniform guest deposition can be used to vary actuation along yarn length.

In the filtration method, (a) solid-state-fabricated nanotube sheet strips were placed on top of filter paper; (b) liquid-dispersed nanoparticles/nanofibers were deposited on top of the nanotube strips by filtration; (c) the filter paper substrate was dissolved by a solvent; and (d) twist-based spinning on the bilayer ribbon stack was accomplished in a liquid bath [M. D. Lima et al., *Science* 331, 51-55 (2011)]. This method can be practiced for any guest nanomaterials that can be liquid dispersed, such as by ultrasonication.

When the uniform coating of guest on one side of a sheet or sheet wedge is replaced with a coating of guest that was only on a fraction of the sheet surface (such as adjacent to one sheet edge) and twist was applied asymmetrically so that formation of a single Archimedean scroll was macroscopically observed, a core-shell yarn structure results where the guest is only in the corridors of the core or shell (depending in part on the wedge half that was preferentially stressed) [M. D. Lima et al., *Science* 331, 51-55 (2011)]. By depositing a second guest on the sheet area that is not covered by the first guest, the second guest can occupy the yarn sheath, while the first guest occupies the yarn core. This core-sheath biscrolling technology [M. D. Lima et al., *Science* 331, 51-55 (2011)] is deployed in invention embodiments to make fuel-powered tensile and torsional muscles. A catalyst that enables fuel and oxidant reaction to produce heat is preferably in the yarn sheath and a guest that changes volume when heated is preferably in the yarn core.

Selection of volume changing guests for thermally, electrothermally, and photothermally powered twist spun muscles is made depending upon volume changes due to solid-state phase transitions, solid-melt phase transitions, and solid-state and liquid-state thermal expansion coefficients in temperature regions removed from phase transition regions. Paraffin waxes provide the advantage that both the temperature and sharpness of thermal-dimensional changes are highly tunable. Also these waxes are non-toxic. Other long chain molecules, like polyethylene glycols and fatty acids can also be usefully deployed. These molecules, and like molecules that are deployable for thermal energy storage [S. Mondal, *Applied Thermal Engineering* 28, 1536-1550 (2008)] can be used as guests in twist-spun muscles, since high enthalpies of phase transition are usually associated with large volume changes. Organic rotator crystals (of which some of these long chain molecules can be classified) are useful since rotational disorder is introduced by solid-state transitions that can have large associated volume changes [J. M. Pringle, P. C. Howlett, D. R. MacFarlane, M. Forsyth, *Journal of Materials Chemistry* 20, 2056-2062 (2010); G. Annat, J. Adebahr, I. R. McKinnon, D. R. MacFarlane, M. Forsyth, *Solid State Ionics* 178, 1065-1071 (2007); J. Font, J. Muntasell, E. Cesari, *Materials Research Bulletin* 30, 839-844 (1995)]. Because of low volatility, plastic crystals that are ionic crystals are especially useful. One example for actuation at relatively low temperatures is tetraethylammonium dicyanamide [J. M. Pringle, P. C. Howlett, D. R. MacFarlane, M. Forsyth, *Journal of Materials Chemistry* 20, 2056-2062 (2010); G. Annat, J. Adebahr, I. R. McKinnon, D. R. MacFarlane, M. Forsyth, *Solid State Ionics* 178, 1065-1071 (2007)], which undergoes a sharp 5.7% volume expansion at a solid-state phase transition that occurs between 17 and 20° C.

Figure 17:
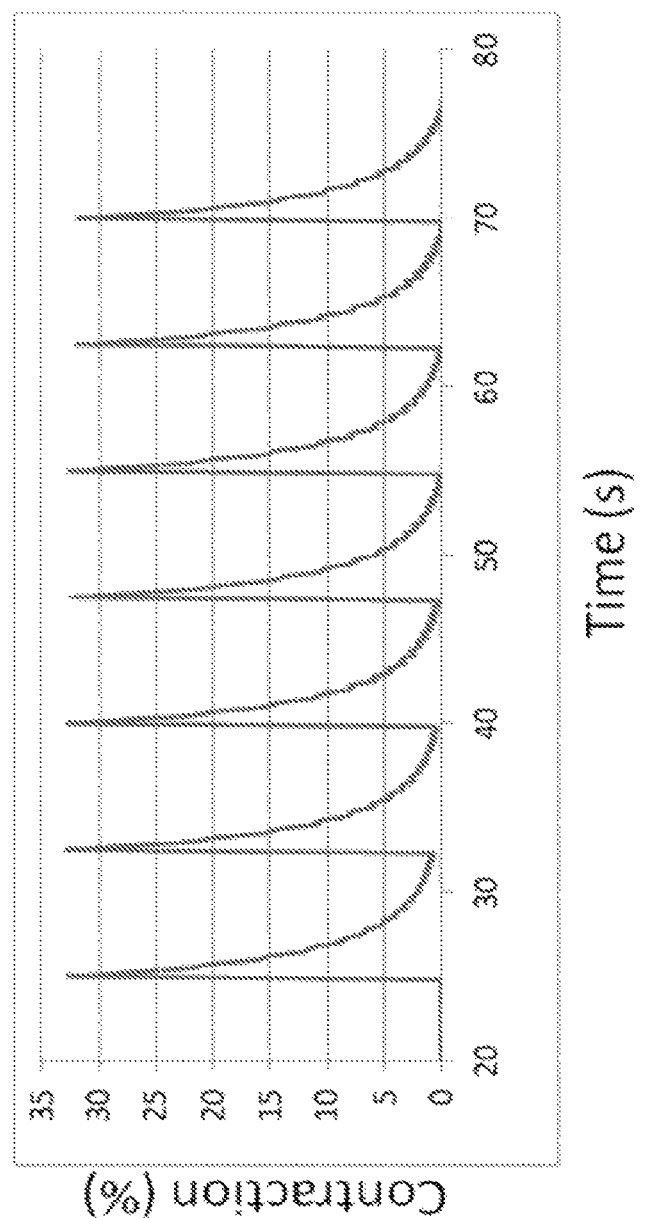
FIG. 17 shows actuation as a function of time for a coiled, dual-Archimedean, carbon nanotube hybrid yarn muscle, where the yarn guest is silicone rubber. Electrothermal actuation was obtained by using periodic electrical square-wave pulse heating and the muscle configuration of FIG. 1A was used.

In applications where the guest material can be prepared in liquid form and later solidified, it is useful to infiltrate the nanofiber yarn when it still has a low degree of inserted twist. This is advantageous because the low-twist nanofiber yarn is still not fully densified by twist insertion, so there is relatively large amount of void volume between the nanofibers. This large void volume (measured as percent of total yarn volume) enables the incorporation of a large volume percent of yarn guest, thereby amplifying actuation. This low-twist-infiltration method can be applied, for example, to nanofiber yarn guest that is imbibed into the twisted nanofiber yarn as a precursor liquid resin, and then polymerized, or to a polymer or polymer mixture that is infiltrated into a twisted nanofiber yarn while in the molten state and then solidified. After the resin cure or polymer solidification, if the guest-filled yarn still retains sufficient flexibility, more twist can be applied to the thereby obtained hybrid yarn in order to fully coil it. If the guest material is applied after coiling the host nanofiber yarn, much less void space would be available in the yarn and therefore less guest material can be incorporated. Dual-Archimedean yarns containing 95% of silicone rubber were prepared in this way (Example 21). Silicone rubber is very suitable as guest material for tensile actuators based on hybrid yarns, since it has a large useful working temperature range (−55° C. to 300° C.) and a large linear thermal expansion ($3 \times 10^{-4}$/K) for thermal, electrothermal, or photothermal actuation. Due to the high volume percent of guest material that can be incorporated using this low-twist-infiltration method, very large actuator strokes can be obtained. Using this low-twist-infiltration method, up to 34% tensile contraction under 5 MPa tensile load was obtained for electrical pulse heating of a coiled carbon nanotube yarn containing silicone rubber guest (FIG. 17).

Hybrid nanofiber yarn muscles can be optionally made by the process of (a) inserting less twist than required for coiling, (b) infiltrating a molten polymer or an uncured polymer resin, (c) solidifying the polymer or curing the polymer resin and (d) inserting twist sufficient to cause yarn coiling. In fact, the twist inserted before infiltrating a molten polymer or an uncured polymer resin can be all or mostly false twist, like obtained by twisting in one direction and then untwisting in the opposite direction.

The weight percent of silicone rubber thereby achieved for the uncoiled and coiled silicone rubber yarn was ~95%. For hybrid nanofiber yarns containing a guest having a density below 2 g/cm$^3$, the preferred volume loading with guest is above about 50% and the more preferred volume loading with guest is above about 85%. Also, in instances where a liquid guest or a liquid guest precursor is infiltrated into the host yarn the preferred volume loading with guest is above about 50% and the more preferred volume loading with guest is above about 85%. However, for instances in which the application need is for enhancement of hybrid yarn strength rather than enhancement of hybrid yarn stroke, lower volume percent loadings of guest can be usefully deployed. The volume weight can be changed according to application needs by varying the degree of twist that is inserted into the twisted host nanofiber yarn before the yarn guest is infiltrated.

The Effects of Actuating Yarn Configuration and Chirality on Tensile and Torsional Actuation Based on experiments conducted for this invention and theoretical analysis to explain experimental results, we can describe configurations that optimize either torsional or tensile actuation for yarns that are identical except that (1) guest infiltration is along the entire yarn or one-half its length, (2) the yarn is homochiral (one chirality) or heterochiral (with equal length segments having opposite chirality), and (3) all infiltrated yarn segments are exposed to the same actuating conditions. Using opposite chirality yarn segments (like S and Z), with a rotor at their interconnection (FIG. 1D), maximizes initial torque on the paddle, since these segments operate additively to provide rotation. The one-end-tethered configuration of FIG. 1C provides twice the torsional rotation of the FIG. 1D configuration, but one-half the initial torque, so both configurations provide equal torsional work capacity. Actuation of one segment in a two-end-tethered homochiral yarn (FIG. 1B) generates smaller rotation than for the heterochiral yarn of FIG. 1D because of the energetic cost of twisting the unactuated yarn as the actuating yarn untwists. Like for the FIG. 1C configuration, the FIG. 1D configuration with non-plied yarn does not provide reversible actuation unless internally constrained by a solid guest, to prevent S twist from cancelling Z twist in the other yarn segment. These same configurations can be usefully deployed for invention embodiments in which torsional or tensile actuation is provided by a polymer fiber in which twist has been inserted, especially including twist that results in yarn coiling.

More detailed analysis is first provided for torsional actuation. Consider that the actuating homochiral yarn in FIG. 1C generates a rotation per yarn length of $\Delta\theta$ (degrees/mm) when heated from the initial temperature to the final actuation temperature. The rotation at any distance x from the tethered end to the free yarn end is $\phi(x)=x\Delta\theta$, which is $\phi(L)=L\Delta\theta$ at yarn end, where the paddle is located. Paddle rotation at yarn midpoint for the heterochiral yarn with segment lengths L/2 in FIG. 1D will be one-half that for the paddle suspended at the end of the homochiral yarn of FIG. 1C. However, since both S and Z yarns provide equal torque on the paddle of FIG. 1D, the initial torque that accelerates paddle rotation in this configuration will be double that of the homochiral configuration of FIG. 1C. Nevertheless, since this torque disappears after $L\Delta\theta/2$ rotations for the heterochiral yarn of FIGS. 1D and $L\Delta\theta$ rotations for the homochiral yarn of FIG. 1C, the ability to accomplish torsional work is the same in both cases.

From a view point of combined torsional stroke and torsional work capability, the half-infiltrated homochiral yarn structure of FIG. 1B provides the poorest performance. One-half of the torsional rotation generated by untwisting of the actuating yarn segment must be used to up-twist the non-actuating yarn segment, so the paddle rotation produced by the L/2 actuating length during actuation is only $L\Delta\theta/4$, and net torque vanishes when this rotation occurs. Even though this half-infiltrated FIG. 1B configuration does not optimize torsional actuation below the guest melting point, this and similar configurations having a torsional return spring (which need not be a nanofiber yarn) are the only configurations for a single ply yarn that can provide both highly reversible torsional and tensile actuation when the temperature for complete melting of the guest is exceeded.

However, the combination of highly reversible torsional and tensile actuation can be obtained for the FIGS. 1C-1D configurations even when the guest fully melts if the yarn is two ply (where S twist in the yarn is accompanied by Z twist due to plying for a ZS yarn and the opposite is true for ZS yarn). The origin of this reversibility is that when a yarn actuates to provide increased twist due to plying, it simultaneously decreases twist in each of the plied yarns, thereby providing the returning force that acts to maintain reversibility.

Since present observations show that single-ply actuating yarn segments untwist as they contract during actuation, the yarn configurations that maximizes tensile contraction are not those that maximize torsional actuation. Consider a two-end tethered actuating yarn of FIG. 1A that provides a tensile contraction of VA. When untethered, as in FIG. 1C, the untwist of a homochiral yarn during actuation provides an elongation that partially cancels tensile contraction. This undesirable elongation can be largely avoided by using the two-end tethered, one-half infiltrated yarn of FIG. 1B, since expansion during untwist of the actuating yarn segment is compensated by contraction during up-twist of the unactuated yarn segment. The heterochiral yarn configuration of FIG. 1D has decreased tensile performance for a volume expanding guest, especially when yarn diameter and torsional rotation are large, since both yarn segments untwist during actuation, and thereby provide elongations that partially cancel the desired contraction during thermal actuation.

This undesirable partial cancellation of tensile contraction can be significant: experiments on Fermat yarn contraction during twist insertion under constant load show that the ratio of percent tensile strain to inserted twist (degrees per mm of length) near the end of twist insertion to produce a non-coiled, carbon nanotube yarn is −0.231 d %/mm°, where d is yarn diameter. These measurements, which are for yarn bias angle between 22 and 32° and yarn diameters between 9.6 and 15 μm, predict that actuating 10 and 100 μm diameter single-ply, Fermat yarn undergoing 100°/mm torsional rotation (in either the FIG. 1C or FIG. 1D configurations) would provide a degradative tensile expansion component due to untwist of 0.23 and 2.3%, respectively. Like the case for torsional actuation, for a single-ply, twist-spun yarn only the FIG. 1A and FIG. 1B configurations can maintain fully reversible tensile actuation when the guest becomes completely fluid during actuation.

The above assumptions of equal length yarn segments and the location of rotor (i.e., the paddle) at either yarn midpoint or yarn end were made to avoid any unnecessary complexity for the above discussion. Depending upon the application needs, the rotor need not be at yarn center. In fact, multiple rotors can be deployed along the yarn length. Additionally, since unactuated yarn lengths serve in many cases as only torsional return springs, these unactuated yarn lengths can be replaced by torsional return springs made of various materials, including yarns or fibers that do not comprise nanofibers. Finally, for cases where different yarn segments are actuated these yarn segments need not have opposite chirality or be even made of the same material. For example, one actuated two-ply yarn segment could have Z yarn twist and S twist of yarn plying while another actuated two-ply yarn segment can have S yarn twist and S twist of yarn plying. As another example, one actuated segment could be an n-ply yarn while another yarn segment could be an m-ply yarn (where n and m are different positive integers). In fact, an actuating yarn can optionally include actuating non-yarn segments, such as a thermally actuated shape memory polymer or a shape metal memory wire. Similarly, twisted polymer fiber muscles can be optionally combined with other muscle types.

While the configurations of FIGS. 1A-1D indicate a constant tensile load during actuation, in many practical applications the tensile load will vary during actuation. This will be the case, for example, when the attachment of the yarn muscle to the constant mechanical tensile load in these configurations is replaced by attachment of the yarn muscle to a spring whose opposite end is not free to translate. This spring can be of various types, including a cantilever spring.

Also, while the configurations of FIGS. 1A-1D are designed to enable torsional displacements of a rotor, tensile displacements, or a combination of these displacements, it should be understood that the yarn muscle can also be usefully deployed to provide torque or to generate forces without the necessity to provide torsional or translational displacements.

Performance of Nanofiber Yarn Muscles

The investigated tensile and torsional actuators were subjected to at least 30 initial training cycles in order to stabilize the structure of the hybrid yarn, and thereby enable highly reversible operation during subsequent evaluation for sometimes over 2 million reversible actuation cycles. With the exception of described use of actuating yarns as catapults (Example 12 and related characterization of maximum generated torque) and the results of Example 18 and Example 19, all actuator measurements were isotonic, meaning that a constant mechanical force was applied to the yarn during actuation. Reported gravimetric work and power capabilities are normalized with respect to the total weight of the actuated yarn. The actuator measurements results in Examples 5-19 and Example 21 are for twisted carbon nanotube yarns.

Example 5 showed that yarn coiling greatly enhanced thermal tensile contraction for all yarns, as did guest infiltration (paraffin wax in this example). Heating a neat coiled yarn from ambient to incandescent temperature (~2,560° C.) under 3.8 MPa tensile stress provided a reversible yarn contraction of 7.3% (FIG. 2B), corresponding to 0.16 kJ/kg work capability.

Example 6 showed that 1,200 cycles per minute and 3% stroke was demonstrated for over 1.4 million cycles (FIG. 3A) using a two-end-tethered, paraffin-wax-filled, coiled Fermat yarn that lifted 17,700 times its own weight during electrothermal actuation. Applying well-separated 25 ms pulses yielded 1.58% initial contraction and 0.104 kJ/kg of mechanical energy during this contraction at an average power output of 4.2 kW/kg, which is four times the power-to-weight ratio of common internal combustion engines.

Example 7 showed that the performance of the yarn muscle of Example 6 as a tensile actuator can be optimized by increasing the applied voltage and mechanical load, while reducing the pulse duration used for electrothermal actuation. FIG. 3B of this Example 7 showed a series of actuations wherein the yarn lifted 175,000 times its mass in 30 ms when 32 V/cm is applied for 15 ms. The work during contraction (0.836 kJ/kg) provided a power output of 27.9 kW/kg, which is 85 times the peak output of mammalian skeletal muscles (0.323 kW/kg) and 30 times the maximum measured power density of previous carbon nanotube muscles [J. Foroughi et al., *Science* 334, 494 (2011)].

Figure 3C:
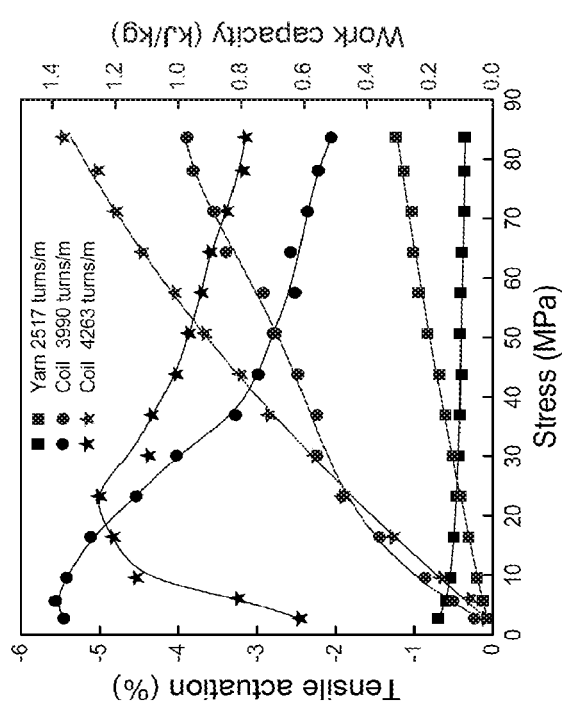

Example 7 and FIG. 3C showed that there is an optimal amount of coiling that maximizes either stroke or work during contraction for the wax hybrid yarn. A maximum contraction of 5.6% was observed at 5.7 MPa stress for a coiled Fermat yarn having intermediate twist. Adding 6.8% more twist to the coiled yarn increased the stress of maximum contraction (16.4 MPa for 5.1% strain) and the maximum measured contractile work (1.36 kJ/kg at 84 MPa), which is 29 times the work capacity of natural muscle. Contractions of 10% under 5.5 MPa stress were realized for a 150 μm diameter, partially coiled, dual-Archimedean yarn by applying well-separated 50 ms, 15 V/cm pulses (FIG. 3D). Since the cross-sectional area of this yarn was 170 times higher than for the yarn of FIG. 3A and FIG. 3B, passive cooling in ambient air was less effective: the cooling time increased from about 25 ms to about 2.5 s, resulting in a low contractile power density when both heating and cooling times are considered (0.12 kW/kg).

Example 8 for a neat Fermat yarn in the FIG. 1A configuration showed the importance of twist and resulting bias angle increase on electrothermal contraction (FIG. 5).

Example 9 demonstrated very fast, highly reversible torsional actuation for two million cycles for a 10 μm diameter, two-end-tethered, half-wax-infiltrated homochiral Fermat yarn that rotated a paddle at yarn midpoint (FIG. 1B configuration). The hybrid yarn accelerated a 16.5 times heavier paddle to a full-cycle-averaged 11,500 rotations per minute—first in one direction and then in reverse (FIG. 4A). Even though actuation temperature was far above the temperature of complete wax melting, this high cycle life resulted because of the presence of a torsional return spring (the unactuated yarn segment of FIG. 1B). FIG. 4B shows the dependence of torsional rotation on input electrical power and applied tensile load for a similar yarn that rotated a 150 times heavier paddle for a million highly reversible cycles. Increasing load increased rotation speed from an average 5,500 revolutions/minute to a maximum average of 7,900 revolutions/minute. Reversible torsional actuation (12.6°/mm) was also driven for a half-wax-infiltrated yarn by replacing electrical heating with heating using a light pulse from a 100 W incandescent lamp.

Example 10 characterized the effect of wax infiltration on torsional actuation for a two-end tethered homochiral yarn, wherein one-half of the yarn is actuated and the other half largely functions as a torsional return spring. The configuration for the wax containing yarn was exactly the same as for FIG. 1B, and that for the non-infiltrated yarn differs only in that the two yarn segments were equivalent except that electrical power was applied to only one-half of the yarn length. In these comparative examples the same mechanical load was applied and the voltage used to achieve actuation was identical. Although some torsional actuation rotation was observed for the neat yarn (4.9°/mm), this rotation was low compared to the 71.2°/mm electrothermal torsional actuation observed when one of the yarn segments was subsequently infiltrated with paraffin wax.

Example 11 demonstrated that use of two-ply heterochiral yarn (instead of a non-plied heterochiral yarn) enables reversible electrothermal torsional actuation for the FIG. 1D configuration. A SZ yarn was obtained by inserting about 30% extra twist into an 11 μm diameter, Fermat Z yarn having an initial twist of 20,000 turns per meter. This highly twisted yarn was then folded upon itself, so that part of the Z twist was converted to S twist due to plying. A ZS yarn was made analogously. Then these yarns were knotted together, and a paddle was attached at the position of the knot. The resulting two-ply SZ-ZS yarn structure was 20 μm in diameter. Steady-state measurements of torsional actuation as a function of input electrical power measurements (FIG. 8) showed that reversible torsional rotation results in the FIG. 1D configuration for heterochiral, two-ply Fermat yarn that is either (1) wax-filled and actuated to above the melting point of the wax or (2) neat and actuated to incandescent temperature in vacuum. The applied stresses for these experiments were 3.2 MPa for the neat yarn and 5.8 MPa for the wax-filled yarn. While the maximum torsional actuation achieved here for wax-filled SZ-ZS yarn (68°/mm) is about the same as for the half-infiltrated homochiral yarn of Example 10 in the FIG. 1B configuration (71.2°/mm), the neat SZ-ZS yarn in vacuum provided 30°/mm torsional actuation (versus the 4.9°/mm for the half-actuated, neat, homochiral yarn of Example 10 in air). Although low for nanotube torsional actuators, this 30°/mm of torsional actuation for the neat yarn is 200 times the maximum previously reported for shape memory alloys, ferroelectric ceramics, or conducting polymers. Torsional actuation was also investigated for this neat two-ply yarn when driven in vacuum to incandescent temperatures using 9.7 V/cm voltage pulses with 1 Hz frequency and 20% duty cycle. A 27°/mm rotation was observed with an average speed of 510 revolutions per minute. This reversible behavior contrasts with the lack of reversibility of actuation of heterochiral, single-ply yarn in the FIG. 1D configuration when the yarn does not contain solid guest at all points in the actuation cycle. In the latter case, permanent cancellation of the opposite twist in the two yarn segments occurs during actuation, thereby resulting in permanent elongation and reduction of torsional rotation during cycling.

Example 12 demonstrated that paraffin-wax-infiltrated, coiled carbon nanotube yarn can generate giant specific torque and that this torque can be used to hurl an object. The measured static specific torque versus applied electrical power for a 100 μm diameter, 6.4 cm long, fully-infiltrated, heterochiral, dual-Archimedean yarn having approximately 3,000 turns/m of inserted twist per stack length is shown in FIG. 4C. A maximum specific torque of 8.42 Nm/kg was generated for this 100 μm diameter yarn, which is five times higher than demonstrated for electrochemically driven nanotube yarns [J. Foroughi et al., *Science* 334, 494-497 (2011)] and slightly higher than for large electric motors (up to 6 Nm/kg).

Figure 7A:
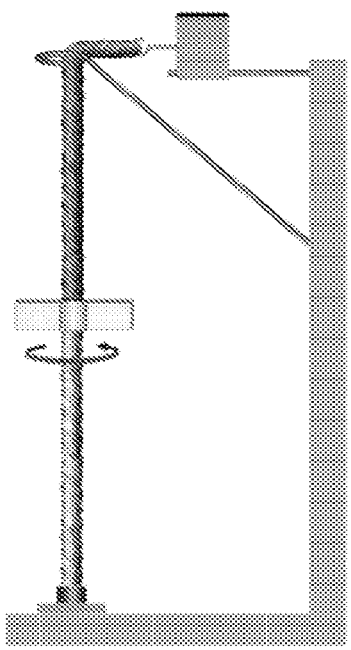
FIGS. 7A-7B are illustrations of horizontal configurations deployed for torsional actuators.

Example 13 demonstrated reversible, electrothermally powered torsional actuation for hybrid yarn containing an alternative volume-expanding guest to paraffin wax. This was demonstrated for $CH_3(CH_2)_{11}C\equiv C-C\equiv C(CH_2)_8COOH$, which was infiltrated into twist-spun Fermat yarn (d=9 μm and α=26°) and photopolymerized by 1,4-addition to produce a polydiacetylene (PDA), as described in Example 2. For the first investigated horizontal configuration (FIG. 7A, which is analogous to the FIG. 1B configuration) the two-end-tethered homochiral Fermat yarn supported a constant load (2 MPa, when normalized to the cross-section of the unactuated yarn). When 13 mW/cm input power was applied, a reversible paddle rotation of 100°/mm was produced as the actuated yarn untwisted during Joule heating. Highly reversible actuation was demonstrated for over 5,000 on-off cycles, which were the maximum investigated. Additional Example 13 results for a one-end-tethered configuration indicated that the polydiacetylene inside the yarn functions as an internal torsional spring to enable torsional actuation to reverse when yarn volume decreases during cooling. Since the corresponding neat yarn does not have a return spring, it did not provide reversible torsional actuation. Due to a few percent volume increase at this blue-red phase transition and a larger volume change from melting incompletely polymerized monomer at 63° C., reversible torsional rotation of 100°/mm was obtained for actuation to below 80° C. for the two-end-tethered, half-infiltrated yarn configuration of FIG. 1B. Actuation to higher temperatures was poorly reversible, likely because of an irreversible phase transition.

Example 14 demonstrated actuation powered by absorption for the palladium hybrid carbon nanotube yarn of Example 4. The configuration of FIG. 1D was deployed for characterization of torsional actuation using 0.022 MPa applied tensile stress. Reversible torsional actuation was powered by the absorption and desorption of hydrogen on a 60 nm thick palladium layer on nanotube bundles within a dual-Archimedean yarn that rotated at its free end a thousand times heavier paddle during hydrogen absorption. Injection of 0.05 atm $H_2$ into a vacuum chamber containing the actuator caused 1.5 paddle rotations within ~6 s, which was fully reversed on a similar time scale during repeated cycling between hydrogen exposure and vacuum. Cantilever-based actuators exploiting the dimensional changes of a 10 μm thick Pd alloy layer have been previously demonstrated [M. Mizumoto, T. Ohgai, A. Kagawa, *J. of Alloys and Compounds* 482, 416-419 (2009)], but the response time was in tens of minutes. The yarn's 100-fold faster response rate resulted from yarn porosity and the thinness of the Pd coating. Such yarn actuators can be used as intelligent muscles that rapidly close an inlet when a targeted hydrogen pressure is exceeded.

Figures 9A, 9B:
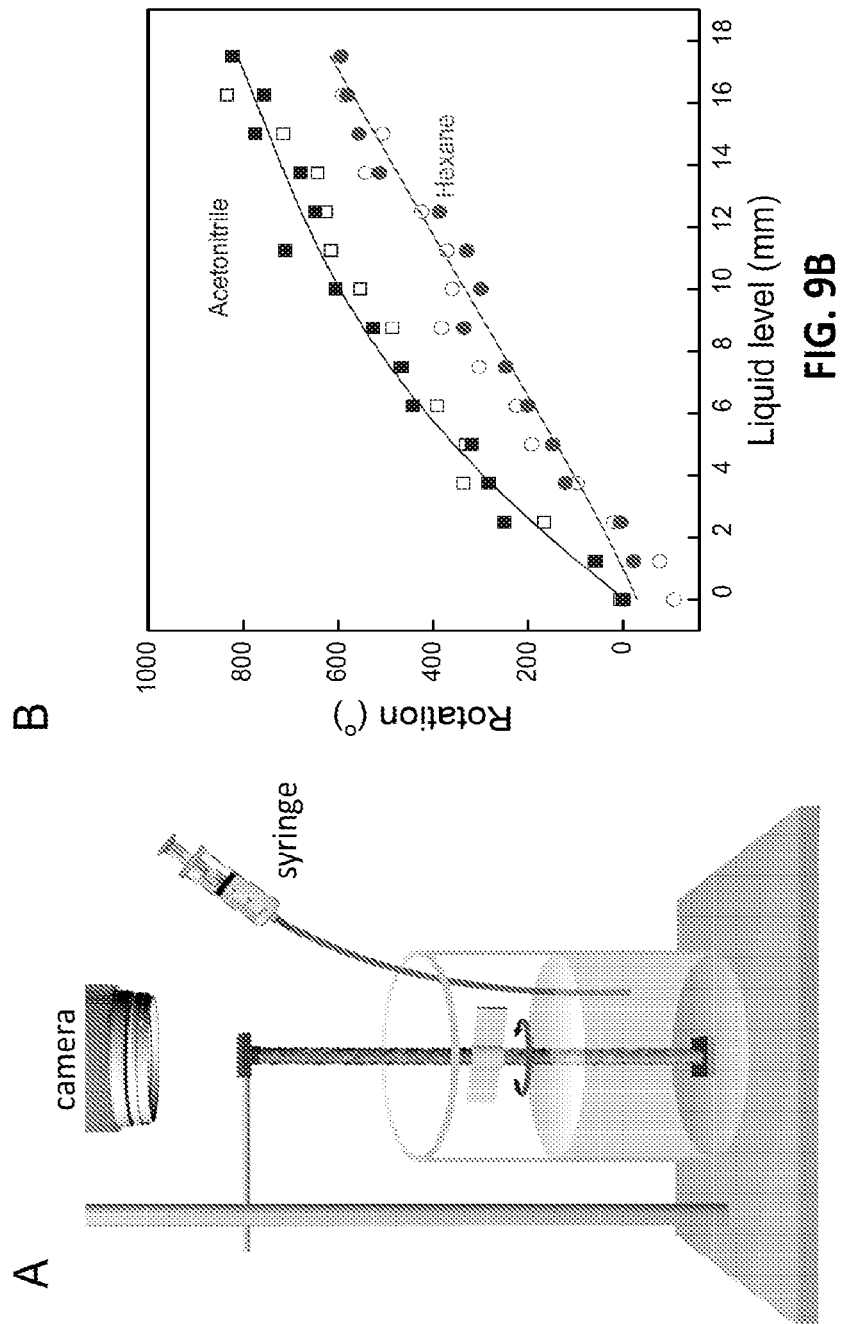
FIGS. 9A-9B show measurement apparatus (FIG. 9A) and a graph of the observed dependence of paddle rotation angle on yarn immersion depth (FIG. 9B) in acetonitrile and in hexane for an 8 µm diameter, homochiral, Fermat, carbon nanotube yarn having 25,000 turns/m of inserted twist. Closed and open symbols are for liquid filling and removal, respectively. The lines are guides for the eyes.

Example 15 demonstrated, using the actuator test configuration of FIG. 9A, that liquid absorption and desorption can also drive actuation, as shown in FIG. 9B, where torsional actuation of a two-end-tethered Fermat yarn is shown as a function of immersion length in liquid. Largely reversible torsional rotation was obtained by varying the immersion depth of a two-end-tethered homochiral yarn in a wetting liquid. After an initial training period, the data in FIG. 9B shows that the paddle rotation angle (ϕ) is a function of yarn immersion depth, with approximate slopes of 49.6±3.4 and 35.3±1.7 degree/mm for acetonitrile and hexane, respectively.

Example 16 experimentally demonstrated torsional actuation for a two-end-tethered, homochiral, non-coiled Fermat yarn that was partially infiltrated with polyethylene glycol (PEG), using the method described in Example 3. PEG was chosen as guest in the carbon nanotube yarn since it expands volume by 10% during melting [L. J. Ravin, T. Higuchi, *J. Am. Pharm. Assoc.* 46, 732-738 (1957)]. Using the FIG. 1B configuration, actuation to above the melting temperature of the PEG was produced by applying a 2.4 mA square wave current pulse (3.4 Hz frequency and 25% duty cycle) along the entire yarn length. The corresponding power during actuation was 16 mW/cm and the tensile stress applied during actuation was 23 MPa (when normalized to the cross-section of the non-actuated yarn). Using this pulsed electrical power input, a maximum rotation speed of 1,040 revolutions per minute and a torsional rotation of 37°/mm were obtained (during an actuation cycle where the infiltrated yarn segment first untwists during heating and then retwists during unaided cooling). No degradation in actuation was observed up to the maximum number of observed cycles (100,000 cycles).

As an alternative to electrical heating, Example 17 demonstrated that torsional and tensile actuation of paraffin-containing carbon nanotube hybrid yarns can be produced by incandescent heating from a 100 W white-light lamp that was manually switched on (1.6 to 2 s) and off (0.3 to 0.5 s). Using the FIG. 1B configuration, reversible torsional actuation of 12.6°/mm was obtained for a two-end tethered homochiral Fermat yarn (~15 µm diameter with ~20,000 turns/m of inserted twist) that was half-infiltrated with paraffin wax. Reversible tensile contraction occurred simultaneously with untwist of the paraffin-containing yarn segment during torsional actuation caused by photonically heating this yarn segment.

Examples 18 and 19 demonstrated the use of lever arms and cantilever arms, respectively, to achieve amplified strokes as high frequencies. A two-end-tethered, homochiral, coiled Fermat yarn that was fully infiltrated with paraffin wax provided actuation. Using a rigid lever arm and a 73 mm long wax hybrid muscle, displacements of 10.4 mm at 6.7 Hz and 3.5 mm at 10 Hz were demonstrated. Using a wire cantilever and the same wax hybrid muscle, a cantilever displacement of 3.4 mm was achieved at 75 Hz. Relevant to the use of these hybrid twist-spun yarns to achieve flight for micro-air vehicles, note that these frequencies are in the range used for insect flight (typically 5 to 200 Hz).

In addition to enabling high cycle life non-electrochemical torsional and tensile muscles that provide high rate and high specific work and power capabilities, invention embodiments improve the performance of prior-art artificial muscles that operate by double layer charge injection [J. Foroughi et al., Science 334, 494-497 (2011)]. These improvements include replacement of the non-coiled yarns used for electrochemical double-layer charging with yarns that are coiled as a result of writhe produced by over twist or coiled as a result of yarn plying. This coiling increases the tensile actuator stroke that is obtainable for the electrochemically double-layer charged artificial muscles. While these previous electrochemical muscles could not be reversibly operated using either one-end-tethered configurations or heterochiral configurations because of permanent untwist during actuation, present invention embodiments show that reversible actuation can be obtained in both cases (the configurations of FIG. 1C and FIG. 1D). This latter improvement results from the present discovery that suitably plied yarns can be deployed to obtain reversible actuation even when a liquid inside the actuating yarn is providing the volume changes that produce actuation. Such suitably plied yarns (like SZ and ZS yarns) are ones in which yarn uncoiling is associated with increase in twist within the yarns that are plied. This balance between twist due to coiling and twist within the yarns acts like a torsional return spring to enable reversibility for one-end-tethered and heterochiral configurations.

Fabrication of Twist-Inserted, Non-Coiled and Coiled Polymer Fiber Muscles

Though polymer fibers used as precursors for making twist-inserted, non-coiled and coiled polymer fiber muscles can be specially made using well known methods, advantage has been found in using commercially available high-strength fibers (either single filament or multifilament)—most often those used as fishing line or sewing thread. The reason for this present choice is cost, which is decreased by the fact that these fibers are already extensively used commercially for many applications. Also, though the applicants have converted various commercially available fibers to artificial muscles that provide over 10% reversible contraction when heated, high molecular weight polyethylene (PE) and nylon 6 or nylon 6,6 fibers having high mechanical strength are especially preferred as muscle precursors because of their high strength, especially high realizable contractions during actuation, and commercial availability at relatively low cost.

Like for the carbon nanotube yarn muscles of invention embodiments, twist is inserted into these high strength polymer fibers. This twist makes the fibers chiral, which enables them to function as torsional artificial muscles. Most importantly, in order to maximize actuator tensile stroke, the applicants have inserted such a large amount of twist (measured in turns per meter of initial fiber length) that some of this twist is converted to fiber coiling. This coiling is much more compact than the coiling used to amplify the stroke of shape memory metal wires. In some preferred invention embodiments the spring index, the ratio of mean coil diameter (i.e., the average of inner and outer coil radius) to fiber diameter is less than about 1.7, whereas for NiTi springs this ratio exceeds 4. In fact, attempts to twist NiTi shape memory wires to lower diameter ratios resulted in wire failure. The non-coiled shape memory metal wires contract when heated to above the martensitic to austenitic phase transition, which is reflected in thermal contraction for coiled shape memory wires, while the studied non-twisted polymer fibers have either a positive or negative fiber-direction thermal expansion coefficient. Independent of the sign of the thermal expansion coefficient for the investigated highly-oriented fibers, after twist insertion that results in automatic coiling in the same direction for both fiber twist and fiber coiling, the coiled fiber contract when heated unless adjacent coils are in contact. In this latter case, the coiled fiber can expand as a result of a temperature increase during actuation.

Twist is most simply inserted into the polymer fibers by attaching the upper fiber end to the shaft of a rotary electric motor and attaching the lower fiber end to a weight whose rotation is blocked. Fiber coiling generally nucleates at one or more locations along the fiber length and then propagates throughout. The weight applied is important, and is adjustable over a narrow range for a given fiber—too little weight and the fiber snarls during twist insertion and too much weight and the fiber breaks during twisting. In this range of applied weights, adjacent fiber coils are in contact. Since such coil contact would interfere with contraction during actuation, larger weights are applied during actuation to separate the coils. Alternatively, lower weights can be applied if the fiber is intentionally partially untwisted to separate the coils, which usually occurs without decreasing the number of coils. The as-coiled fibers will partially uncoil if relative end rotation is allowed. Though thermally annealing can heat-set the coiled fiber, subsequent application of substantial tensile stress will still cause coiling to disappear if end rotation is permitted. While it is possible to apply sufficiently high load at low temperatures to a two-end-tethered fiber that the number of coils decreases by coil-to-twist conversion, this is less successful at high temperatures because the fiber breaks. As an example, for a 130 µm diameter nylon 6 (0.005 size monofilament from Coats and Clark) under constant 30 g load, the inserted twist density before the start of fiber coiling is 2046 turns/meter±3%, the total inserted twist before the end of coiling is 3286 turns/meter±4%, and a total inserted twist of 3653 turns/meter±3% causes the coiled fiber to break.

Figure 10:
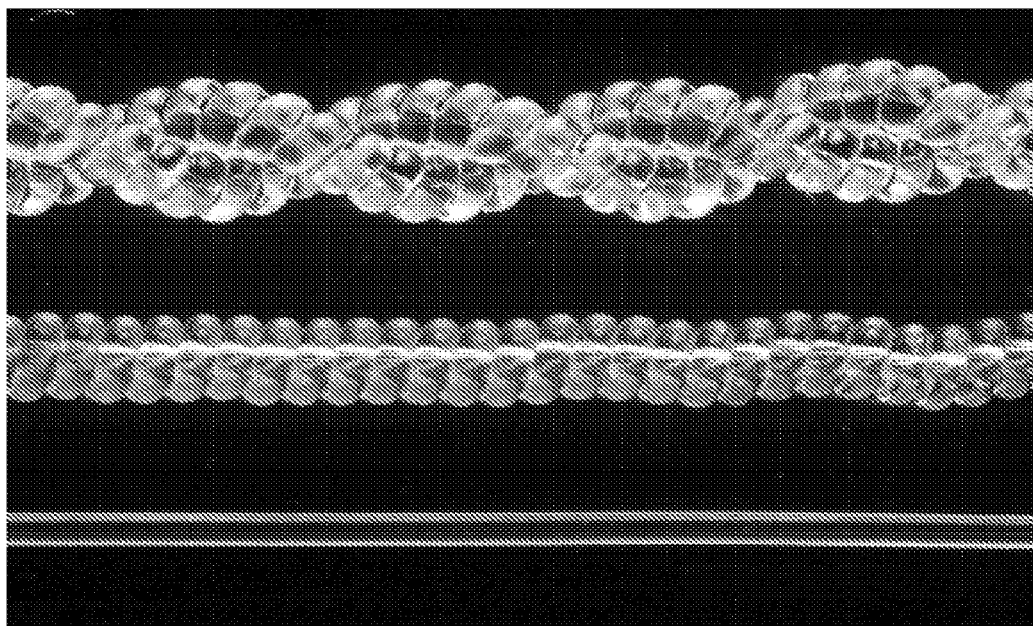
FIG. 10 shows optical images of a non-twisted monofilament nylon fiber (left), this fiber after twist insertion to provide complete coiling (middle), and this coiled fiber after SZ plying (right).

FIG. 10 (middle) shows an optical image of a highly coiled nylon 6 artificial muscle fiber. In order to stabilize this fiber with respect to uncoiling by providing a torque-balanced structure, two fibers having the same twist direction (such as right-handed Z twist) were plied together by using an opposite direction of twist for plying (S twist). A thereby torque stabilized SZ nylon yarn fiber muscle is shown in FIG. 10 (right). Once thereby stabilized, the plied, highly-coiled fibers can be easily woven into a textile or a braid. These fiber muscles have hierarchal structures on fiber, plied fiber, and woven structure levels. Hierarchal structure exploitation extends down to the complex molecular arrangement within the fibers, which can produce a negative thermal expansion in the fiber direction that is ten times more negative than in the chain direction of polymer crystallites [C. L. Choy, F. C. Chen, and K. Young, *J. of Polym. Sci.; Polym. Phys. Ed.* 19, 335-352 (1981)].

Optical micrographs of fibers immediately below the onset for fiber coiling show helical surface features (derived from lines in the fiber direction in the initial fiber), whose bias angle with respect to the fiber direction is $$\alpha = \tan^{-1}(2\pi rT),$$

where r is the distance from fiber center and T is the inserted twist in turns per fiber length.

As an alternative processing method for producing polymer fiber muscles, a twisted polymer fiber can be helically wrapped around a capillary tube or any like cylindrical or non-cylindrical mandrel, and subsequently and optionally released from this mandrel. It has been found that actuation during heating for the thereby obtained coiled fibers can be either a contraction or an expansion, depending upon the relative directions of polymer fiber twist and polymer fiber coiling about the mandrel. If polymer fiber twist density is above a critical level and fiber twist and fiber coiling are in the same chiral direction (either S twist or Z twist) heating can provide coil contraction, but if in opposite chiral directions heating can provide coil expansion.

Figures 18A, 18B, 18C:
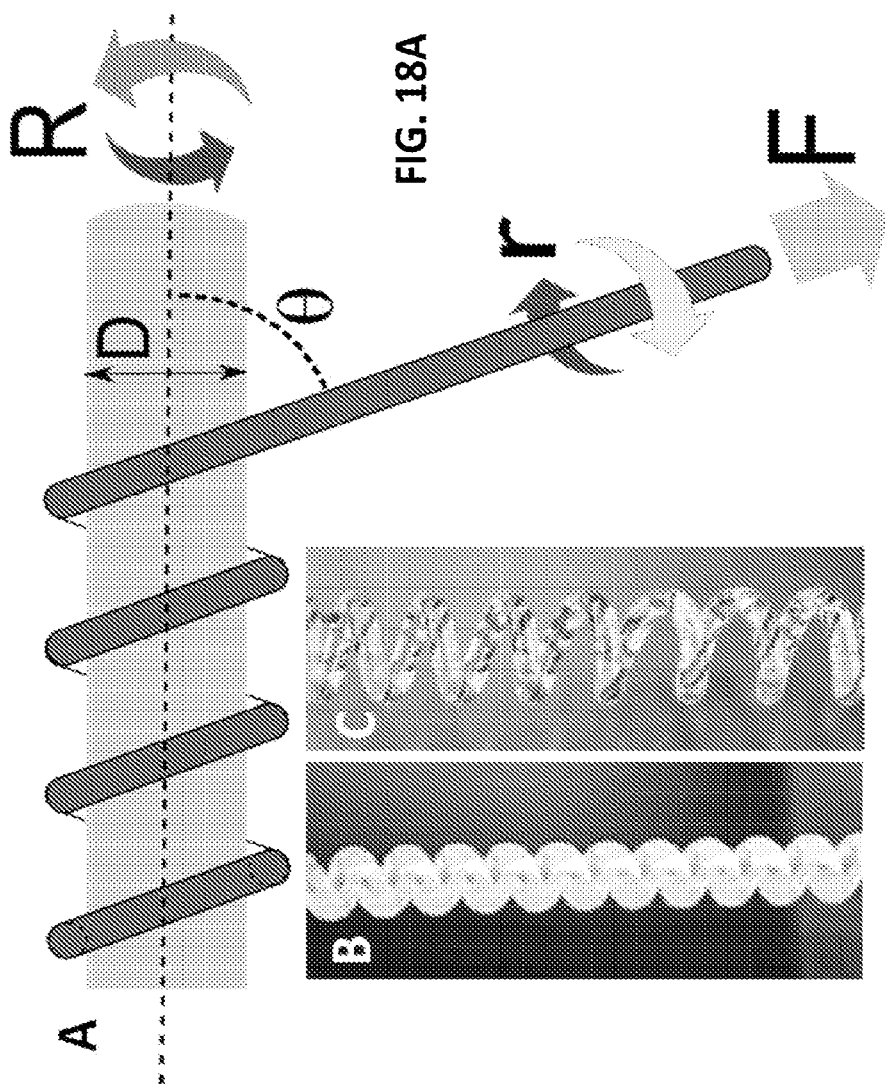
FIG. 18A shows a schematic illustration of an apparatus for fiber coiling about a mandrel and the main process variables: the mandrel diameter (D), the turns/length applied to the fiber (r), the twist/length of coiling applied on the mandrel (R), the force applied to the fiber (F) and the angle between the fiber and axis of the mandrel (θ).
FIG. 18B shows an optical micrograph of an 860 µm diameter nylon 6 monofilament that has been coiled by wrapping on a 0.4 mm diameter mandrel.
FIG. 18C shows an optical micrograph of an 860 µm diameter nylon 6 monofilament that has been coiled by wrapping on a 2.7 mm diameter mandrel.

FIG. 18A schematically illustrates a process for simultaneously introducing polymer fiber twist and fiber coiling around a mandrel and FIGS. 18B-18C show examples of coiled polymer fibers made by mandrel wrapping. The exact coil shape and the degree and direction of twist both for the coil and fiber can be controlled and the geometry of the coil can be set by thermal annealing. The main variables of mandrel coiling are the diameter of the mandrel (D), the turns/length applied to the fiber (r), the twist/length for the coil applied to the mandrel (R), the force applied to the fiber (F) and the angle between the fiber and the axis of the mandrel (θ). These process variables allow control of coil diameter, the spacing between coil turns, and the bias angle and chirality of the coiled polymer fiber muscle. Large diameter coil will produce higher stroke, but reduced lift capacity. Examples 27 and 28 provide methods for critically changing the structure of the coiled yarn, so that either negative or positive coil thermal expansion is obtained, and the performance of the mandrel coiled muscles when they do work during either contraction or expansion.

In the above described mandrel coiling process, it is possible to independently select the twist directions for the fiber and for the coil. This is not possible when twist is applied under load to an otherwise unconstrained fiber. The fiber twist and coiling can be in either the same or in opposite directions and that will determine the direction of the coil displacement upon heating: when both the fiber and the coil have the same direction of twist they will produce a coil that contracts during heating if the inserted yarn twist density is above a critical level. When the coil and the fibers have opposite chiralities the coil will expand during heating. This coil expansion can also be used for tensile actuation, where work is accomplished during the coil expansion part of the work cycle. Again, the larger the diameter of the coil, the higher will be the stroke, as described in Example 27.

While an electrically conductive muscle component is not required for polymer fiber muscles or hybrid nanofiber yarn muscles that are driven chemically, photonically, electromagnetically (by microwave absorption) or by ambient temperature changes, a conductor is needed to provide electrothermal actuation unless the polymer fiber or nanofiber yarn is itself an electronic conductor (like an intrinsically electronically conducting organic polymer metal or a carbon nanofiber yarn). This conductor can be, for example, a conducting coating (like a metal or carbon coating) on a high-strength polymer fiber; metal wire or wires; electronically conducting nanofibers that are helically wrapped about an non-twisted polymer fiber muscle, a coiled polymer fiber muscle, or a twisted but non-coiled polymer fiber muscle; an electronic conductor that is external to the muscle fiber (like metal wires woven into an actuating textile); or an electronic conductor that is interior to a muscle array (like interior to actuating polymer fiber braids). Commercially available high strength polymer fibers that include an electrically conducting coating can be deployed, like presently evaluated Shieldex Fiber (which is a silver-coated nylon 6,6). The low resistance per fiber length enables fast heating during electrothermal actuation while applying very low voltages. Additionally, polymer fibers that are coated with an electronically conducting carbon or carbon composite can be usefully deployed.

Electronically conducting pastes and inks can be optionally deployed as coatings to enable electrothermal actuation, such as those containing silver powder (optionally comprising silver nanofibers or silver flakes) in a binder or forms of electronically conducting carbons in a binder (including carbon nanotubes and graphene flakes). For the preparation of electronically conducting coiled polymer fibers, these electronic conductors can be applied to either the non-twisted fiber, the fiber that is twisted but not coiled, or the coiled fiber.

Figure 11:
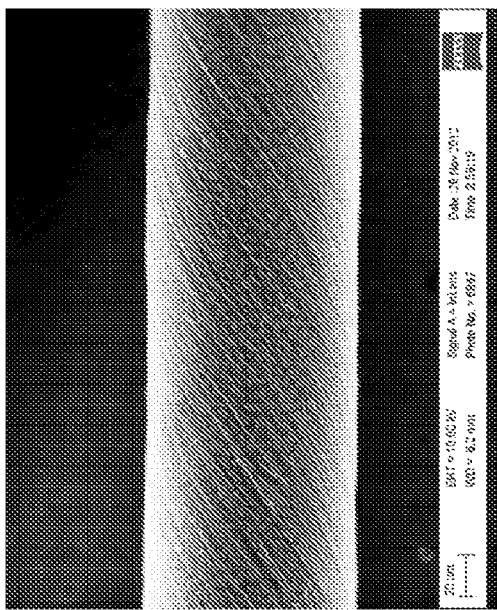
FIGS. 11-12 show scanning electron microscope (SEM) images of a monofilament nylon fiber that has been helically wrapped with a forest-drawn MWNT sheet strip (FIG. 11) and then twist inserted to provide a highly coiled nylon fiber that is wrapped with the MWNT sheet strip (FIG. 12).
Figure 12:
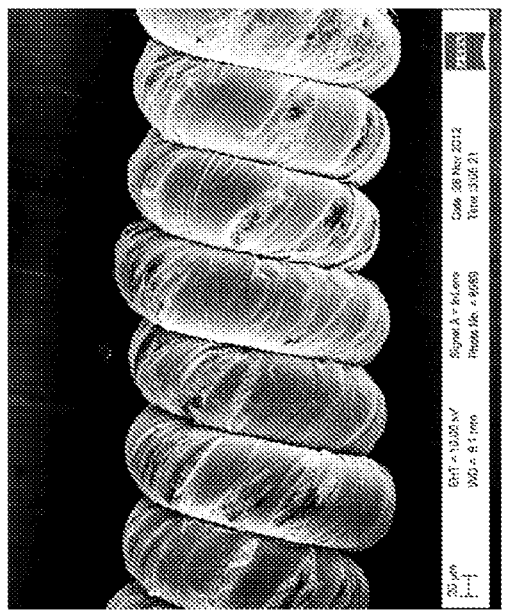
Figures 15A, 15B:
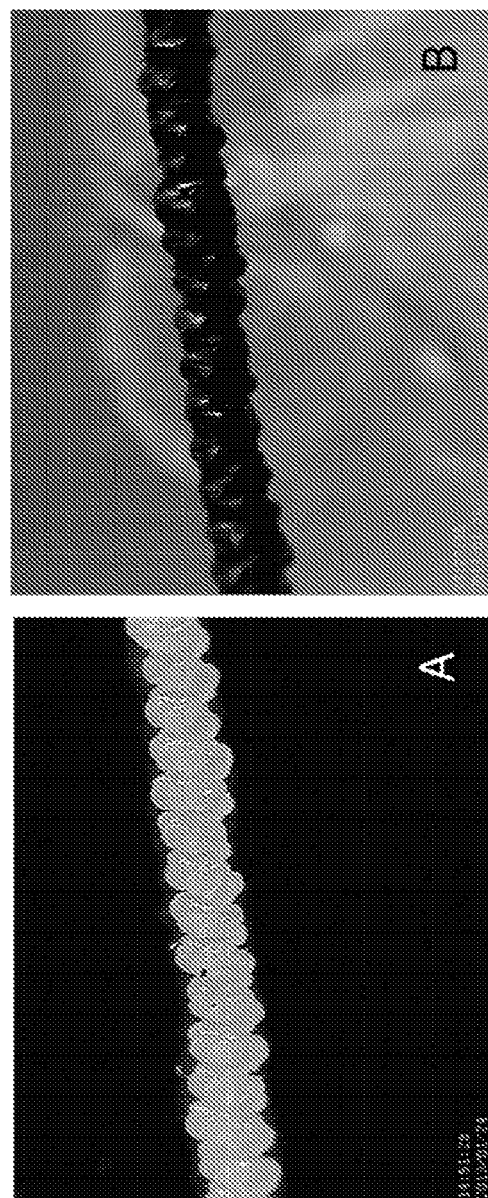
FIGS. 15A-15B provides optical micrographs for a coiled nylon fiber before (FIG. 15A) and after (FIG. 15B) dual helical wrapping with forest-drawn MWNT sheet strips.
Figure 16:
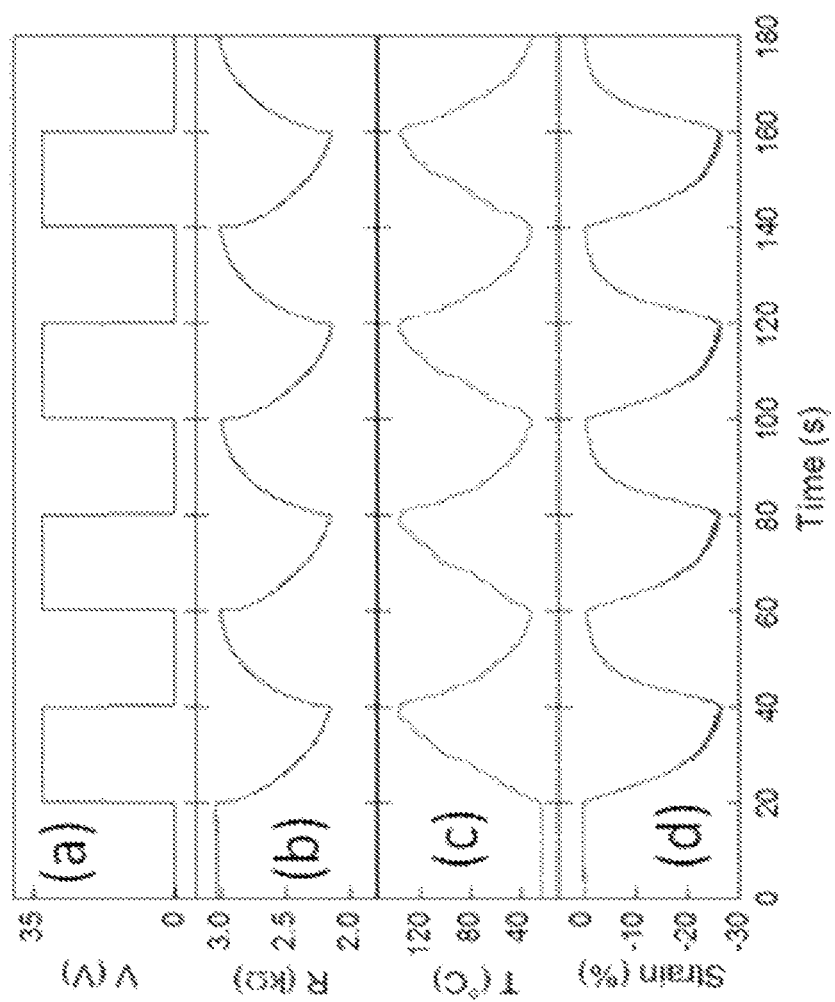
FIG. 16 shows for the MWNT wrapped coiled nylon fiber of FIG. 15B the time dependences of applied voltage (a), electrical resistance (b), temperature (c) and generated strain (d) when this coiled nylon fiber muscle loaded is under 21.7 MPa tensile load. The muscle configuration of FIG. 1A was used. The fiber time response is slow because of the large fiber diameter, the low power applied during heating, and the slow cooling for this large diameter fiber when special passive or active means are not deployed for fiber cooling.

The preparation of electrothermally actuated or photothermally actuated polymer fiber muscles by the wrapping of highly conducting nanofibers about the non-twisted polymer fiber or about twisted or coiled polymer fibers is a useful invention embodiment. It is especially useful to deploy carbon nanotubes as the wrapped nanofibers. These carbon nanotubes can be optionally drawn as sheet ribbons from a carbon nanotube forest and helically wrapped on the polymer muscle fiber. FIG. 11 shows a SEM image of a monofilament nylon fiber that has been helically wrapped with a forest-drawn MWNT sheet strip. FIG. 12 shows a SEM image of this MWNT-sheet-coated nylon fiber after twist insertion to provide a highly coiled nylon fiber that is wrapped with the MWNT sheet strip. FIG. 15A-15B provides optical micrographs for a coiled nylon fiber before (FIG. 15A) and after (FIG. 15B) helical wrapping with forest-drawn MWNT sheet strips. In this case MWNT sheet wrapping has been made on the coiled yarn in two helical wrapping directions. FIG. 16 shows the electrothermal actuation obtained for the MWNT wrapped coiled nylon fiber of FIG. 15B. Choice of a high thermal conductivity electronic conductor (as well as high porosity for this electronic conductor, for enhancing heat transport to the environment) can be usefully deployed to decrease the time needed for the cooling that reverses actuation.

Although non-twisted polymer fiber muscles generally provide smaller actuator contractions than coiled polymer fiber muscles, these non-twisted polymer fiber muscles are useful for electrothermally actuated muscles if the polymer fiber has a large negative thermal expansion coefficient (preferably above about $-10^{-4}/°$ C.) and the non-twisted polymer fiber is wrapped with an electronically conducting nanofiber sheet ribbon. This nanofiber ribbon sheet is preferably a carbon nanotube ribbon sheet, and this carbon nanotube ribbon sheet is preferably drawn from a carbon nanotube forest. Independent of the origin of the carbon nanotube ribbon sheet, the optical absorption of the carbon nanotubes can use usefully deployed to enhance photothermal actuation.

Especially preferred polymers for both non-twisted and twisted polymer fiber muscles are high strength, mechanically drawn nylon 6; nylon 6,6; polyethylene, especially gel-spun polyethylene; and polyvinylidene fluoride. Because of their high strengths, all of these suitable polymer fibers are often used for fishing lines or sewing threads. These polymer fibers that are suitable for conversion to polymer fiber artificial muscles include fibers that are monofilament, multifilament (with optional welding or other method of bonding between filaments), and hollow-core multifilament polymer fibers. The polymer multifilament fibers can optionally comprise polymer filaments having nanoscale diameters, such as those fabricated by electrospinning or centrifugal spinning. Also, the yarn multifilaments can optionally be of different polymers.

Importantly, in order to generate maximum power output during the work part of an actuator cycle, a coil with a positive thermal expansion should preferably be operated to do mechanical work during expansion and a coil with a negative thermal expansion should preferably be operated to do mechanical work during expansion. The reason is that heating rate (which is controlled by power input) can be much higher than cooling rate (which is controlled by ambient conditions). However, when the application mode does not require optimization of power density, work during either expansion or contraction or their combination can be used to realize performance goals, such as the change in porosity of a textile as a result of a temperature change.

To maximize heating rate (and therefore power output during the work part of the actuation cycle), while still avoiding local overheating, it can be useful to deploy profiled applied voltages, currents, or power input during actuation. The strategy here is to maximize heating rate at the start of actuation, where there is no danger of local overheating, and then reduce it when overheating can pose a problem.

Investigated tensile and torsional actuators for highly reversible, long cycle life operation were subjected to most usually at least 30 initial training cycles in order to stabilize the structure of the hybrid nanofiber yarn or polymer fiber structure, and thereby enable highly reversible operation during subsequent use for millions of reversible actuation cycles. For the case of thermally powered muscles, these training cycles were typically to the maximum temperature where the muscle would be deployed.

Performance of Twist Inserted and Coiled Polymer Fiber Muscles

Thermal actuation. Unless otherwise indicated, here and elsewhere, force normalization to obtain stress is with respect to the fiber diameter and the fiber diameter is that of the initial non-twisted fiber. This was done since the coil diameter and fiber diameter in the coiled fiber are difficult to accurately measure and since most of the reported measurements are isobaric (constant applied weight), so fiber stress varies during actuation.

Figures 20A, 20B:
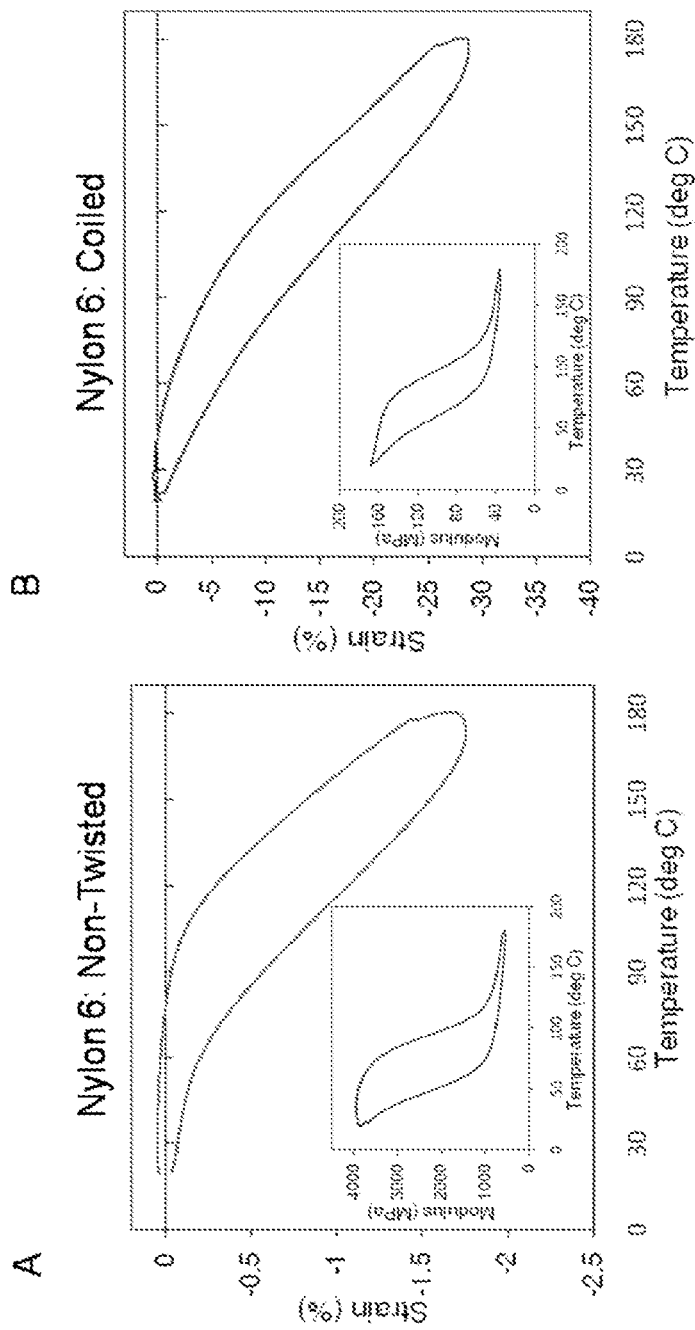
FIGS. 20A-20B are thermomechanical analysis (TMA) graphs of the actuation performance of non-twisted (FIG. 20A) and coiled (FIG. 20B) nylon monofilament.

Thermomechanical analysis measurement results for fiber thermal expansion before and after coiling are shown in FIGS. 20A and 20B, respectively, for a 305 µm diameter nylon 6 monofilament sewing thread (The Thread Exchange, 12 mil). The lack of superposition of increasing and decreasing temperature scans is not due to hysteresis, but is instead the result of the large temperature scan rate (10° C./minute) and the corresponding lag between fiber temperature and the temperature measured by the thermocouple of the TMA.

The reversible thermal contraction between 20 and 200° C. for the above nylon 6 fiber increased from 2% to 30% as a result of fiber coiling, providing a stroke amplification factor of 15. This stroke amplification factor (SAF) is the ratio of actuator stroke in percent after twist insertion to that before twist insertion for the same change in ambient and load conditions. A coiled multifilament nylon 6,6 fiber contracts by a similar amount (23%) when using the wider temperature range (20 to 220° C.) enabled by the higher temperature where nylon 6,6 is dimensionally stable, thereby providing a SAF of 10. While the maximum temperature of useful dimensional stability of the gel-spun polyethylene polymer fiber is much lower (approximately 130° C.), the higher modulus and strength of these fibers is especially useful as a thermally powered artificial muscle that lifts heavy loads, and provides increased energy efficiency. The non-coiled and coiled Spectra polyethylene provided thermal contractions between 20 and 130° C. of 1.4% and 19%, respectively, corresponding to a SAF of 14.

For polymer fiber muscles coiled in the free state (i.e., without use of a mandrel) a SAF of above about 5 is preferred and a SAF of above about 10 is more preferred. It is also preferred that polymer fiber muscles coiled in the free state have a negative thermal expansion coefficient in the polymer fiber direction before twist insertion.

While other investigated fibers had either a positive or negative longitudinal thermal expansion coefficient before coiling, when twist is inserted under constant tensile load, they all provided a negative thermal expansion coefficient in the coil axis direction when coiled as long as fiber twist and fiber coiling are in the same chiral direction. Large diameter (640 µm) nylon 6 monofilament fishing line (Berkeley Trilene 30 lb test) had an initial average radial thermal expansion of $1.8 \times 10^{-4}/K$ (between 25 and 130° C.) when twisted under 16 MPa load, which slightly increased to $2.2 \times 10^{-4}/K$ at the onset of fiber coiling (where the twist was 540 turns/m and only 1% of the initial fiber length was coiled). The length contraction factor (LCF), which is ratio of the initial fiber length to the final length of coiled or non-coiled fiber, was 1.16 for this only slightly coiled polymer fiber.

Figure 13:
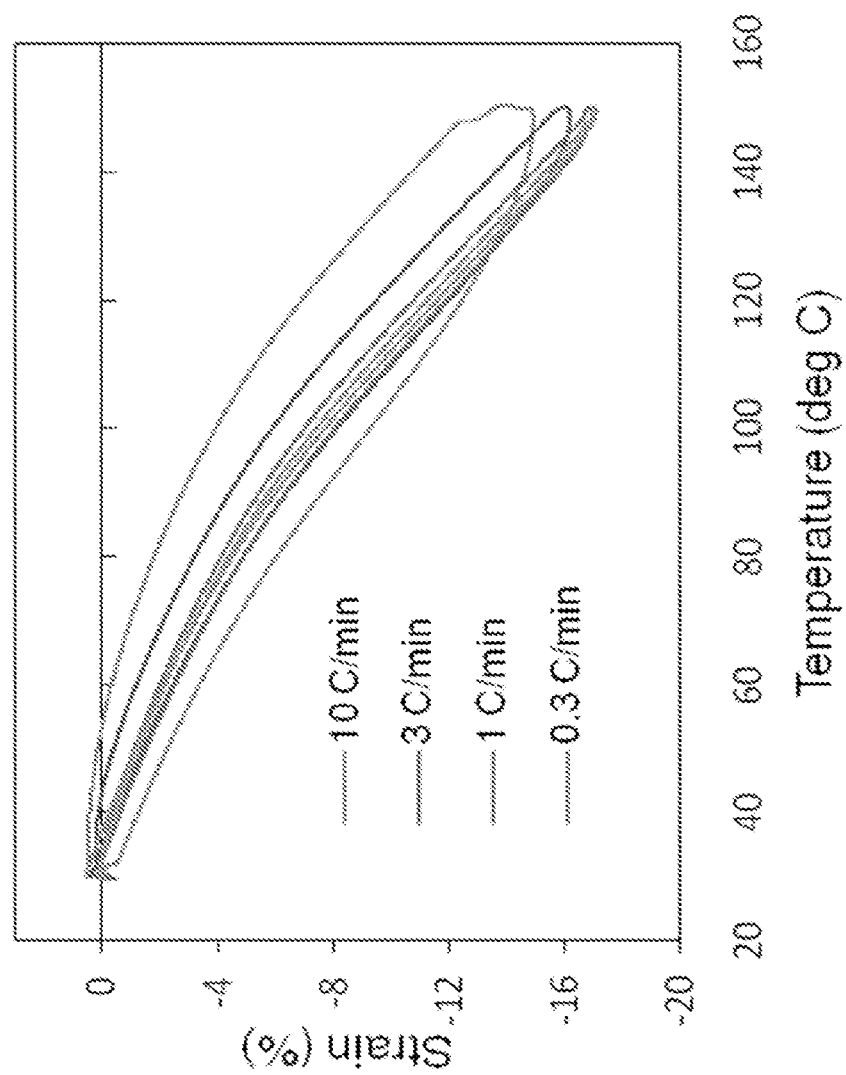
FIG. 13 shows that thermal mechanical analysis (TMA) during a low-scan-rate temperature indicates little or no hysteresis for a coiled nylon fiber muscle in the FIG. 1A configuration, which suggests that the apparent hysteresis at high scan rates is an artifact, due to temperature lag between polymer fiber and thermocouple temperature sensor.

A key advantage of our thermal-expansion-based muscles over muscles that use first order phase changes, like shape memory muscles, is the obtainable substantial absence of hysteresis. This hysteresis can easily exceed 20° C. for NiTi shape memory wires, which greatly complicates actuator control. As shown in FIG. 13, although our measurement apparatus introduces artificial hysteresis due to differences in fiber temperature and recorded temperature, reducing scan rate to minimize this effect indicates that the hysteresis of nylon actuator is small or non-existent. At a 0.3° C./min scan rate, less than 2° C. hysteresis is observable. This absence of hysteresis, combined with the far more linear response to temperature compared with that for shape memory wires, makes these coiled polymer fiber muscles well suited for robotics and artificial prosthetics applications, where a continuous range of control is desired.

Figure 14:
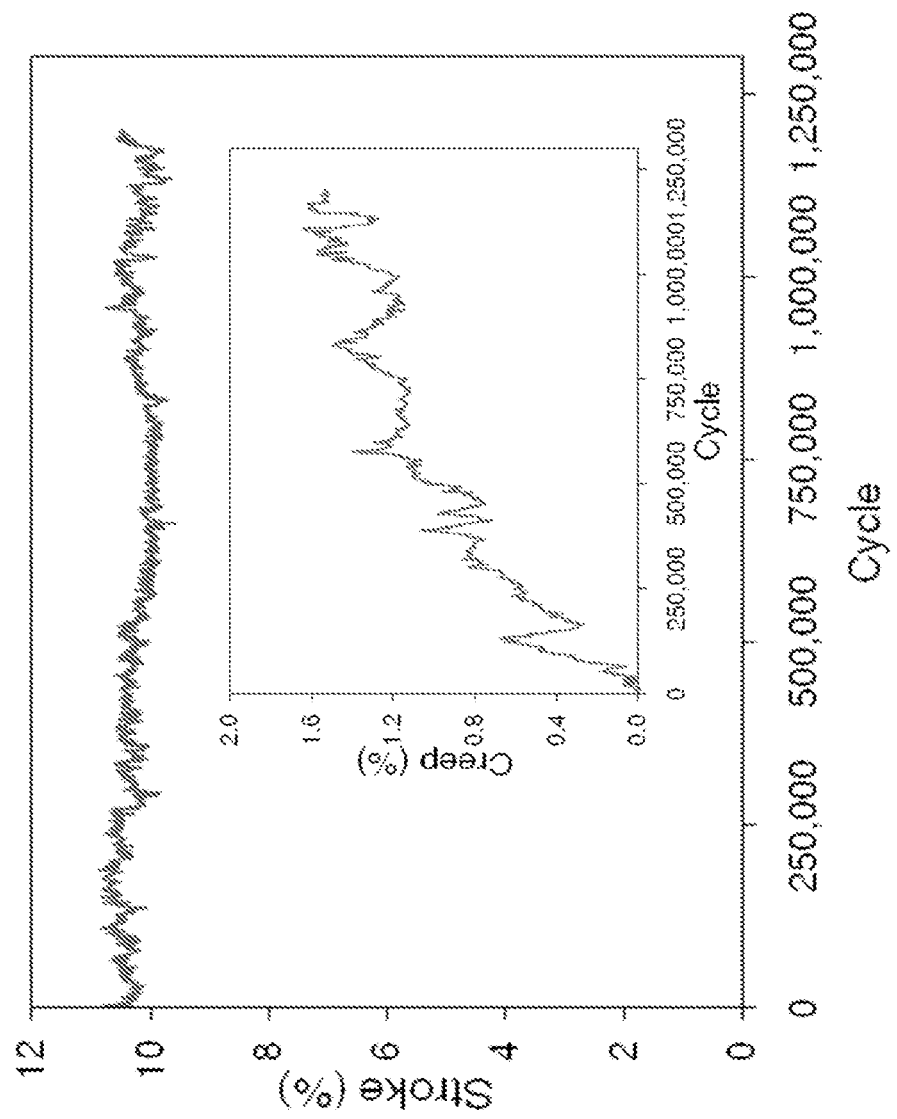
FIG. 14 shows that there is no significant change in actuator stroke after more than a million cycles for a coiled nylon fiber muscle that is being electro-thermally heated using a MWNT sheet that is wrapped around the muscle. The fiber has the structure shown in FIG. 12 and the actuator configuration of FIG. 1A was used. The graph depicts the stroke versus cycle number when the two-end-tethered coiled yarn was actuated at 1 Hz when lifting a 21.5 MPa load. The inset shows that there is irreversible polymer creep under this applied load, and that this creep decreases with increasing cycle number. Each point represents the average of 1,000 cycles.

Electrothermal tensile actuation. The first described results on electrical actuation are for a 76 µm diameter nylon 6 monofilament sewing thread (The Thread Exchange, Inc., size 003, 5 Tex) that was helically wrapped with a forest-drawn [M. Zhang, S. Fang, A. A. Zakhidov, S. B. Lee, A. E. Aliev, C. D. Williams, K. R. Atkinson, and R. H. Baughman, *Science* 309, 1215-1219 (2005)] carbon nanotube sheet strip and then coiled to a LCF of 4.5. A 1 Hz square wave potential of volt/cm and 20% duty cycle was applied to obtain periodic actuation. The data in FIG. 14 show that this coiled fiber can contract by 10% for over a million cycles when the fiber stress is 22 MPa. Although the coiled fiber did undergo creep (see figure inset), this creep was less than 2% over the 1 million cycles, the rate of creep decreased with increased cycling, and there was no noticeable irreversibility in stroke.

When the applied load on a thermally contractile, highly coiled polymer fiber muscle is reduced to low levels, so that neighboring coils start to make contact during tensile contraction, the stroke reduces in magnitude and eventually becomes positive, and approximately equal to the radial direction thermal expansion of the fiber. If the amount of twist in the coiled fiber is decreased by twist removal, the minimum load needed for tensile contraction during actuation is correspondingly reduced.

The work done during contraction typically increases up to mechanical loads where the coiled fiber muscle breaks. The observed gravimetric work during contraction (Example 30) was 5.5 times that obtainable [D. R. Peterson, J. D. Bronzino, *Biomechanics: Principles and Applications* (CRC Press, Boca Raton, 2008)] for natural muscle. Even more impressive, the average output power (25.5 kW/kg) was 79 times the peak output of mammalian skeletal muscles (0.323 kW/kg) [D. R. Peterson, J. D. Bronzino, *Biomechanics: Principles and Applications* (CRC Press, Boca Raton, 2008)].

Muscle cycle rate for these electro-thermally powered artificial muscles is limited by the time required for muscle cooling. Like for all other thermally or electrochemically driven artificial muscles, this cycle time increases with increasing diameter of the actuating fiber. While this response time is unimportant when thermal cycling times are long, like when using ambient temperature changes to harvest energy from slowly varying temperature changes or to provide clothing textiles that change porosity to provide wearer comfort, it is important when maximizing output power during a full cycle of electrothermally powered actuation.

By employing various active or passive cooling methods, cycle times can be dramatically reduced. For instance, a 2-ply, coiled, silver-plated fiber (with an initial non-twisted diameter of 170 µm) produced about 10% stroke at 5 Hz under 10.8 MPa stress when immersed in water. Similarly, passive operation in helium or active cooling by forced convection can allow high-rate actuation of thick fibers.

Photothermal tensile actuation. Thin coiled fibers provide fast tensile actuation when driven photothermally using light. For instance, a coiled 76 µm diameter, monofilament nylon 6 fiber (The Thread Exchange, Inc. 3 mil, having 5000 turns/m of post-purchase-inserted twist) contracted by 7% in one second to lift a 26 MPa load when illuminated by a 250 W incandescent lamp located 2.5 cm from the fiber. The coils were non-contacting at this stress and the LCF was 2.5.

Chemically powered tensile actuation. By wrapping nylon 6 fiber with CNT sheet containing a deposition of catalytic platinum-black particles and then introducing fiber coiling, a chemically powered muscle was produced. This muscle can be powered by the heat released by various thermal chemical reactions, like the heat released by combining fuel with oxidant or the heat produced by chemical transformation of a single fluid component (like for Pt catalyzed conversion of hydrogen peroxide in a 30% $H_2O_2$ aqueous solution to water).

Electrothermal torsional actuation. For initial measurements, a paddle was attached to the free-end of a vertically suspended polymer thread that had been twisted to either just below the start of fiber coiling or after completion of fiber coiling. In both cases torsional actuation was observed when powered either thermally, electrothermally, photonically, or chemically. However, in this present absence of a torsional return spring, actuation was poorly reversible—torsional actuator stroke during heating, which corresponded to fiber untwist for non-coiled fiber and untwist of coiling for the fully coiled fiber, rapidly decreased during cycling.

To provide highly reversible torsional actuation for the fishing lines and sewing threads (and other like polymer fibers) even in the absence of two-end-tethering, fiber coiling was provided in a torque balanced structure by plying two Z twisted fibers using S coiling to produce a SZ two-ply fiber. Highly reversible torsional actuation was obtained since the sum of fiber Z twist and the S twist of fiber plying must be conserved—coiling during reversal of actuation acts as a torsional return spring for reversing twist release within the fibers. To maximize obtainable torque, a fiber comprising equal length SZ and ZS segments was deployed, with a rotor attached at their midpoint. The thereby generated gravimetric torque was in the 2.5 to 6 N·m/kg range that is typical for large commercial electric motors.

Applications of Twisted and Coiled Nanofiber Yarns and Twisted and Coiled Polymer Fibers Since the realized tensile strokes and work and power densities are so high for coiled hybrid yarns, these high-cycle-life muscles can be used for diverse applications. The major competing NiTi shape memory metal actuators have a highly hysteretic actuator stroke, so control of actuator displacement is greatly complicated by the dependence of actuation on prior history within a cycle. This history dependence is small for the wax hybrid yarn results of FIG. 2A, and can be negligible for cycling a neat yarn or any wax-filled yarn between molten states. Also, this hysteresis can be small for twist-inserted polymer fibers, including those that are coiled.

While shape memory metals have been exploited as torsional actuators, the torsional actuation (0.15°/mm) [A. C. Keefe, G. P. Carman, *Smart Mater. Struct.* 9, 665 (2000)] is much smaller than demonstrated here for wax hybrid yarns (71°/mm in Example 10) and polydiacetylene hybrid yarns (100°/mm in Example 13) or for twist-inserted polymer fibers. Improved control and large rotational actuation, along with potentially longer cycle life, indicate the utility of nanofiber yarn muscles and twist-inserted polymer fiber muscles in medical devices, robots, and shutters, for which shape memory alloys are currently employed, as well as extension to microvalves, mixers, smart phone lenses, positioners and toys. Example 22 demonstrates the use of a single coiled, two-ply, SZ twisted, silver-coated nylon fiber as a noiseless actuator for controlling the opening of window shutters and FIG. 22C-22D provide photographs of shutters that have been reversibly actuated between closed and opened positions.

Example 38 and FIGS. 23A-23B show the use of two mandrel-coiled nylon 6 monofilament fibers for the opening and closing of shutters in response to ambient temperature changes. As a consequence of opposite directions of twist insertion in the nylon yarn and mandrel coiling, this coiled nylon fiber muscle has a positive thermal expansion coefficient. Operating to do work under compressive load, these nylon muscles progressively open the shutter as temperature increases. The shutters configurations of Example 22 and Example 38 can be used to control either air flow or the passage of light.

The nanofiber yarn muscles and the twist-inserted polymer fiber muscles can also be used as macro- or micro-sized pumps, valve drives, and fluidic mixers. These mixers will be useful for "chemical laboratories on a chip" where chemical analysis or chemical synthesis is efficiently done in an extremely small area device. Unlike for previous electrochemically-powered carbon nanotube yarn micro-fluidic mixers [J. Foroughi et al., *Science* 334, 494 (2011)], no counter-electrode or electrolyte is required for the yarn torsional muscles or the polymer fiber muscles of present invention embodiments. On the microscale or smaller scales, the demonstrated torsional actuation can be used for rotating electrodes used in highly sensitive electrochemical analyte analysis, thereby eliminating need for much larger and much more expensive ordinary motors.

The twist-spun yarn muscles and the twist-inserted polymer fiber muscles can additionally be used to eliminate the bulky electromagnets used to provide actuation for conventional electronic relays and for such purposes as actuating the locks on car doors.

The flexibility of twist spun yarn muscles and twist-inserted polymer fiber muscles can be exploited to amplify the stroke realized for a given length of nanofiber yarn or polymer fiber assembly (in which a much longer length of actuating yarn is contained). This amplification can be achieved by simply wrapping the actuating yarn (or twisted polymer fiber) about two parallel stationary pins, anchoring one yarn end, and using the opposite yarn end to transmit tensile actuation. However, to minimize friction, these pins can support independent yarn on fiber size pulleys.

Yarn and fiber flexibility and knottability can also be exploited by using these tensile-actuating nanofiber yarns and twist-inserted polymer fibers to enable the morphing of tensegrity structures. In this case nanofiber hybrid yarns or twist-inserted polymer fibers can provide end-to-end connectivity between the rods used for the tensegrity structures, so as to enable structural morphing. Alternatively, by using hollow rods in these structures, and connecting the actuating nanofiber hybrid yarns or twist-inserted fibers at opposite rod ends from where the yarns or fibers emerge to connect to another rod, the amplitude of morphing for the tensegrity structures can be increased. Either the reversible actuation or the irreversible actuation of polymer fiber muscles or nanofiber yarn muscles can be used to provide actuation for various other morphing structures, like those folded into origami folded shapes and those based on compliant mechanisms (Handbook of Compliant Mechanisms, L. L. Howell, S. P. Magleby, and B. M. Olsen, eds., John Wiley and Sons, Inc., 2013). The coiled polymer fiber muscles and coiled nanofiber yarn muscles can be used for either reversibly or irreversibly opening or closing structures that are folded to make them more compact—like folded solar cell arrays that are opened when deployed in space. This deployment can be accomplished electrothermally or by exploiting changed in ambient temperature or exposure to light.

The tensile actuation of twist-spun nanofiber muscles and twist-inserted polymer fiber muscles can conveniently be deployed on micro and macro scales for peristaltic pumps by configuring independently actuate-able nanofiber yarn or twisted polymer fiber segments about collapsible tubing that contains the fluid to be pumped, and sequentially actuating these yarn or polymer fiber segments to obtain pumping.

Optical device applications provide other invention embodiments. Examples are twist-spun nanofiber yarn and yarn assemblies and twist-inserted fibers and fiber assemblies that provide ultra-fast optical shutters (by torsional rotation of a paddle), translation of light diffusers for laser speckle reduction, means for the translation or rotation of other optical elements, or means to change the focal length of lenses (such as by mechanical deformation of a compliant lenses). Either tensile or torsional actuation of a nanofiber yarn or a twist-inserted polymer fiber muscle can be used to change the pixels on signs by either rotating these pixels to reveal a different color or by a translation that achieves the same effect.

The nanofiber yarn muscles and twist-inserted polymer fiber muscles can also be used in haptic devices, wherein actuator displacement provides tactile information. This tactile feedback can be through the user's hands or fingers, such as in gloves worn by a surgeon while remotely conducting surgery using robotic devices. In another application, these artificial muscles can be used to depress spring-loaded pins in a refreshable Braille display.

Both torsional and tensile actuation of hybrid twist-spun yarns and twist inserted fibers can be deployed for actuating smart surfaces on local and larger scales. For instance, tensile actuation can reversibly retract spring-loaded pins (which can optionally be cylindrical, blade shaped, or of other more complicated shapes), thereby changing surface roughness. One or more cycles of pin extension and retraction can be used to remove marine organisms from the surface of marine vehicles. Rotation of micron size or larger paddles can also be utilized for changing surface roughness. These actuating surfaces with controlled roughness can be used to affect the boundary layers in fluids, thereby enabling more efficient and/or controlled motion, such as for marine, air, and land vehicles. Such actuation, like the torsional rotation of a paddle so that either hydrophilic or hydrophobic paddle surface is exterior, can also be used to change surface energy. Such surface energy changes can also be usefully accomplished by the reversibly extension and contraction of pins.

Like natural muscle and thermal shape memory metal muscles, the thermally actuated nanofiber muscles and twist-inserted polymer fiber muscles require energy input to maintain muscle contraction and corresponding tensile force generation. For the thermal muscles this maintenance energy corresponds to that needed to keep muscle temperature constant when the temperature exterior to the muscle is lower than the actuated muscle. A similar problem exists for dielectric muscles and electrochemical muscles, but in these cases the maintenance energy needed is to replace electrical energy due to electrical self-discharge. This problem of maintenance energy does not arise when actuation is reversed as soon as the work of contraction is accomplished, and can be avoided by using a latch to maintain the force or extent of contraction. Such latch mechanisms have been described in the literature, including inch-worm actuator mechanism that can increase actuator stroke by an arbitrarily large amount by combining the actuator strokes of multiple actuator cycles ["Fuel Powered Actuators and Methods of Using Same", R. H. Baughman, V. H. Ebron, Z. Yang, D. J. Seyer, M. Kozlov, J. Oh, H. Xie, J. Razal, J. P. Ferraris, A. G. MacDiarmid, W. A. Macaulay, U.S. Pat. No. 8,096,119 B2].

While small diameter hybrid yarn muscles provide giant gravimetric power densities even when the work of contraction is normalized to the entire cycle time (a demonstrated 4.2 kW/kg, from Example 6, which is four times the power-to-weight ratio of common internal combustion engines), the absolute work and power output is low unless yarn diameter is increased or many yarns are placed in parallel. However, Example 7 shows that dramatically increasing yarn diameter decreases cooling rate in ambient air. This problem can be ameliorated for both the nanofiber yarn and twist-inserted polymer fiber muscles by using active cooling to reverse actuation or by using surrounding ambient temperature media that rapidly absorb the heat of actuation. Water is one such useful media for cooling. Other useful choices for passive cooling are high thermal diffusivity gases, like hydrogen and helium. Cooling using ambient hydrogen provides a natural fit for twist-spun muscles that are powered by hydrogen/air mixture, since injection of hydrogen during the cooling part of the actuation cycle accelerates cooling, in preparation with subsequent mixture of the hydrogen with air (or oxygen) to provide forward actuation.

Hybrid nanofibers yarn muscles and twist-inserted polymer fiber muscles are useful as intelligent sensors that detect environmental conditions and provide either a reversible or non-reversible tensile or rotary response (depending upon the design). One example is the reversibly-actuating hydrogen-sensing actuator of Example 14. Biologically functionalized guests in biscrolled yarns can respond to analytes for self-powered sensing and/or control purposes. Choice of the guest within hybrid nanofiber muscles can be designed to provide either reversible actuation or the irreversible actuation needed for actuating sensors that integrate exposure, like integrated time-temperature exposure or integrated exposures to radiation or chemicals in the environment. Since the range of possible guests to meet particular sensor needs is enormous, it is possible to optimize performance for both reversible and irreversible (i.e., integrating) sensing that provides mechanical actuation. Relevant for choice of guest, the literature describes a host of materials that undergo either reversible or irreversible volume changes as a function of temperature or temperature history or chemical or radiation exposures.

Irreversible time-temperature-dependent actuation of polymer fiber and nanofiber hybrid yarn muscles can be used to hinder the opening of packaging for products that have been thermally over-exposed, like vaccines and other pharmaceutical products. Yarn or fiber volume expansion can be used to provide the friction that hinders opening of the container top of a pharmaceutical product. Alternatively, this actuation can release a pin, which interferes with the opening of a twist top.

The coiled polymer fiber muscles and nanofiber yarn muscles can be used for the actuation of smart packaging materials, like cardboard boxes that open and close porosity in response to ambient temperature (so as to regulate the temperature of products).

The ability of coiled neat carbon nanotube yarns to provide a demonstrated 7.3% reversible contraction (Example 5 and FIG. 2B) upon electrothermal heating from room temperature to an incandescent temperature (~2,560° C.) in an inert atmosphere indicates the utility of these muscles to perform at temperatures where no other high strength muscle can operate. These muscles can be self-powered by changes in ambient temperature to directly act as an intelligent material to provide actuation, such as opening or closing a valve. As shown in Example 10, Example 11, and FIG. 8, changes in temperature can also provide torsional actuation for neat carbon nanotube yarns (up to 30°/mm during static measurements in vacuum for the SZ-ZS yarn in Example 11), which is useful for both temperature measurement and control purposes. Electrical pulse measurements to incandescent temperatures for neat two-ply carbon nanotube yarn in vacuum provided 27°/mm rotation and an average rotational speed of 510 revolutions per minute (Example 11).

Though the achievable muscle torsional and tensile strokes will usually be relatively smaller, the dimensional changes of the coiled neat yarns and the twist-inserted polymer fibers at below room temperature can be used to both indicate temperature and directly provide a functional response, like opening or closing a valve. This valve control can be obtained in any temperature range by using the nanofiber yarn muscles or polymer fiber muscles to provide tensile actuation, torsional actuation, or a combination thereof.

Instead on using changes in ambient temperature, heating due to absorption of radiation (and especially light) can provide torsional actuation of twisted polymer fiber muscles or twist-spun nanofiber yarn muscles. Since carbon nanotubes are nearly perfect black body absorbers, optical heating readily occurs. Example 9 demonstrated a reversible torsional actuation of 12.6°/mm when a half-wax-infiltrated Fermat yarn was actuated by heating using a light pulse from a 100 W incandescent lamp. Reversible torsional and tensile photoactuation can also be obtained by reversible photoreaction of either nanofiber yarn host or guest (or a combination thereof) within a hybrid twist-spun nanofiber yarn muscle or the polymer in twist-inserted polymer fiber muscles. Reversible tensile and torsional photoactuation (using photo-thermal heating, photoreaction, or a combination thereof) can be used for automatically controlling solar lighting for such spaces as homes and offices, green houses, and solar cell farms. Most simply, reversible tensile actuation of hybrid nanofiber yarn muscles or twist-inserted polymer fiber muscles can be used to open and close window blinds or shutters. Since a thermally powered muscle can span nearly the entire widow dimension, and stroke can be amplified using pulleys, small temperature changes can be used to progressively open and close blinds and shutters without making any sound or consuming electrical energy, which is not the case for presently used expensive motors that open and close blinds and shutters. Additionally, such photo-mechanical actuation can be used to provide actuation for micro- and macro-optical devices.

Thermal-actuation through changes in ambient temperature, photo-actuation by changes in light exposure, and chemo-mechanical actuation using changes in ambient chemical environment (including ambient moisture) can be used to generate mechanical energy by nanofiber yarn or twist-inserted polymer fiber actuation. This mechanical energy can be harvested as electrical energy by using such means as causing the rotation of a permanent magnet in an arrangement of electrical coils or the application of muscle generated strains to piezoelectric or ferroelectric elements. This harvested energy can be used for example, for powering wireless sensors.

Since polymer fiber and hybrid yarn muscles can be highly absorbing in the near infrared region where light is transported through tissue and blood (such as by incorporation of carbon nanotubes), this energy harvesting could be accomplished in the human body as long as overheating of blood and tissue are avoided (such as by separating the energy harvester from blood and tissue, but still using blood circulation for cooling).

Actuation of nanofiber yarns within clothing can provide variable porosity, wherein expanding or contracting guest materials would alter yarn length, yarn diameter, and/or coil diameter to open or close textile pores, thereby increasing comfort or providing protection against chemical or thermal threats. This opening and closing of textile porosity can also be accomplished by the rotation of micron-size paddles attached to the actuating yarn and embedded in the textile, so that paddles are either parallel-to or perpendicular-to the textile surface. Since the teachings of invention embodiments provides nanofiber hybrid yarns and twist-inserted polymer fibers that either expand or contract with temperature increase, textile design using conventionally available weaves is facilitated, so that the textile either opens porosity or closes with temperature increase. The use of suitably heat-set coiled polymer fiber muscles in which inserted fiber twist is in opposite direction than that in the coil is the most convenient means to provide fibers that increase length when heated, since achieving such performance for hybrid nanofiber yarns requires either the use of guests having a large negative volumetric expansion coefficient (which is rare for materials) or the use of opposite direction twist insertion for nanofiber twist and coiling and the use of a frozen-in guest structure that avoids irreversible actuation by partial cancelation of hybrid nanofiber twist and the opposite twist due to nanofiber yarn coiling. Guest materials like paraffin wax can simultaneously provide the well known function of moderating against temperature change by absorbing energy when temperatures become too hot and releasing this energy when temperatures are decreased.

Nanofiber yarn muscles and twisted polymer fiber muscles in textiles can be either actuated as a result of changes in ambient temperature, changes in chemicals in the environment, or by exposure to light or other radiations (so they are self-powered) or they can be actuated electrically by resistive heating. Such electrically powered actuation of yarns in textiles can be optionally controlled by detecting an ambient condition (such as too high a temperature for fire fighters or an unsafe chemical or biological environment). While shape memory wire muscles can be deployed to provide tensile contraction in textiles, their cost and uncomfortable feel has limited realization of textiles and other woven structures. In contrast, spools of both conductive and non-conductive nylon are cheaply obtainable, widely used in clothing, and easily processed by invention embodiments into high stroke artificial muscles that provide either a contraction or an expansion upon actuation.

Twist-spun hybrid yarn muscles or twist-inserted polymer fibers can be woven or sewn into textiles for actuator applications. The nanofiber yarn or twisted polymer fiber muscles can constitute either a majority or a minority of yarns or fibers in the textiles. Depending upon the desired anisotropy of actuation in the textile, these actuating yarns or fibers can be located largely in one textile direction (like a weft or warp directions of a plain weave textile) or in all yarn and fiber directions. Different twist-spun yarns or twist-inserted polymer fibers can be optionally deployed in a textile for such purposes as providing to the textile the ability to actuate in response to exposure to differing agents in the environment, light, or different ambient temperatures.

This actuation of nanofiber yarn or polymer fiber muscles in textiles can be used to reversibly or irreversibly open or close textile pores in response to environmental thermal or chemical conditions, thereby enabling clothing derived from these textiles to be used dynamically to enhance wearer comfort or safety. Since the warp direction fiber in a plain weave textile can be essentially straight, while the weft direction fiber goes up and down (above and under the weft fiber), the deployment of the actuating fiber in the warp direction can be preferred when the goal is to use the actuating fiber array to do mechanical work (while at the same time benefiting from the high yarn cooling rate that can result from deployment of parallel thermally actuating fibers that minimally thermally interact together). On the other hand, deployment of actuating polymer fibers or nanofiber yarns in both weft and warp directions of a plain weave textile (and for the diversity of directions for more complicated weaves, like for three-dimensional textiles) can be usefully deployed for such purposed as making textiles that change porosity in response to thermal or chemical environmental conditions. In addition to use in clothing, textiles that change porosity in response to temperature can be used for comfort adjusting tents.

The dimensional changes caused by polymer fiber or nanofiber yarn muscle actuation can be deployed in close-fitting garments to enable convenient entry to these garments, whether close-fitting clothing, a suite for underwater diving, or a space suite. Various mechanisms can be deployed for such purposes, such as photo-expansion (which later relaxes when the suit is entered) or thermal contraction when the suite reaches body or other use temperature.

Actuating twist-spun nanofiber yarns and twist-inserted polymer fibers can also be braided, which can serve the useful purpose of increasing thermal contact with surrounding liquids, surrounding ambient air, or other surrounding gas. Such increased thermal contact can be used to increase the rate of nanofiber yarn or polymer fiber cooling to reverse actuation. Additionally, hollow braided twist-spun nanofiber yarn muscle structures and twist-inserted polymer fiber muscle structures can be usefully deployed to obtain accelerated cooling that reverses thermal actuation. One means to accomplish this is to pass cooling liquid or gas through the core of the braided structure. Another means is to use the core of the hollow braid as a heat pipe—evaporation of a liquid from contact with the heated muscle to a liquid condensation site on the heat pipe will accelerate reversal of actuation. In fact, the hollow braid can comprise segments that are independently actuated. In this case, transfer of heat from one braid segment during reversal of actuation to another braid segment that is about to be electro-thermally actuated can reduce the electrical energy needed to actuate the second braid segment. Wicking means are needed for the operation of these heat pipes, which can be provided by either a porous, wet-able material in part of the braid core or the location of grooves within the hollow braid that can provide wicking.

Additionally, hollow braid structures can be deployed for fuel-powered actuation of twist-spun yarns in the braid. In this case the fuel and oxidant (like air and either hydrogen or methanol) are transported to the braid core, where the catalyst used for combustion is located. Alternatively, the optionally catalyzed exothermic chemical transformation of single chemical component or multiple chemical components that are optionally non-interacting or minimally interacting can power chemo-thermal actuation. More generally, an artificial muscle yarn or a twist-inserted polymer fiber muscle can be actuated using a fuel, whether or not it is acting individually or as part of an array, such as in a woven, knitted, or braided structure.

The polymer fiber muscle and hybrid yarn muscles can be usefully deployed to provide attractive facial gestures for humanoid robots, such as those used for companion robots for the elderly. Thirty facial muscles are required to express ordinary human emotions (happiness, surprise, sadness, fright, etc.) and present motors used for robotics cannot do the job.

More generally, there are over 630 muscles in the human body and presently used motors or hydraulic devices cannot provide their functionality for either humanoid robots or prosthetic devices. On the other hand, the present coiled polymer fiber and nanofiber yarn muscles can be as be as thin as a human hair, can provide giant strokes, and can be easily arrayed in parallel to do work. When using very thick thermally powered polymer muscle fibers or nanofiber yarn hybrid muscles, problems in obtainable fast cooling rates can be addressed by using many fibers in an array and selectively actuating only some of these fibers, while others are allowed to naturally cool. Alternatively, surrounding fluid (like water) or a gas (like helium) can be used to accelerate cooling rate (as can active cooling).

As another application embodiment, polymer muscle fibers or nanofiber yarn hybrid muscles in tight fitting clothing can be used like an exoskeleton to provide an amplified mechanical response to the feeble movements of the infirm.

While many applications require highly reversible actuator responses, other applications exploit irreversible tensile or torsional actuation. One example of the latter is time-temperature indicators used to monitor the thermal exposure conditions of perishable products. By matching the irreversible time-temperature response characteristics of an indicator material to the degradation rate of a perishable product that is in the same thermal environment, time-temperature indicators can be used to signal that a perishable product (such as a vaccine) has been exposed to a thermal history that results in unacceptable product degradation. Irreversible muscles can use the irreversible dimensional changes of guest material in a nanofiber yarn to provide an irreversible torsional rotation or tensile actuation response. For instance, the tensile actuator response of a hybrid yarn can deflect the hand of a thermal exposure clock to indicate the severity of thermal exposure on product quality (such as denoting the remaining usable life of a vaccine). Alternatively, the yarn-driven torsional rotation of a pointer can provide the indicator response. A "use or don't use" response can be provided in this case by confining an indicating paddle so that one paddle side (with one color) is visible until a critical torque results from guest dimensional change, which flips the paddle so that a differently colored paddle side is visible. Since the kinetics of polymerization of thermally polymerizable diacetylenes match those of many important perishable products (like vaccines) [U.S. Pat. No. 3,999,946] and since selected diacetylenes can provide large dimensional changes during polymerization (4.9% in the polymerization direction for the symmetric diacetylene with substituent groups $-CH_2OSO_2C_6H_5CH_3$) [R. H. Baughman, *J. Chem. Phys.* 68, 3110-3117 (1978)]), these diacetylenes are useful as guests for these yarn-based time-temperature indicator devices.

Since the quality of many types or products depends on whether or not the product has been frozen (and the number of times that a product has been frozen) hybrid nanofibers yarn muscles or twist-inserted polymer fibers can be similarly deployed as self-powered freeze indicators. For example, using a paraffin-wax-infiltrated nanotube yarn to provide reversible actuation (at a temperature selected by choice of the paraffin) the arm of a "freeze clock" can count the number of freeze-defrost exposures of a product.

Changes in yarn resistance during actuation can be used to provide an additional mechanism for providing an indicator response, as well as more generically providing a means for the control of stroke for reversible actuators. More specifically, for time-temperature history applications or sensing temperature or chemicals, irreversible resistance changes of actuated hybrid nanofiber yarns can be used in RFID (radio frequency identification) tags to provide a remotely electronically readable indicator response. Alternatively, tensile or torsional actuation can be used to change the resistance or capacitance of the antenna on a RFID tag, to thereby provide a remotely readable response.

Like for the case of the hybrid nanofiber yarn muscles, twist-inserted polymer fibers can provide irreversible tensile or torsional actuation that is useful for integrating time-temperature indicator devices or devices that integrate chemical or radiation exposures and thereby provide an irreversible mechanical response. To realize such applications, the polymer in the twist-inserted polymer fiber can be chosen to be unstable in the thermal, irradiation, or chemical exposure conditions that are of indicator interest. For example, polymers containing conjugated diacetylene groups are known that further polymerize by 1,4-addition reaction when exposed to either suitably high temperatures or actinic radiation (like UV, γ-ray, x-ray, or ionizing particles). The dimensional changes associated with this reaction can provide the needed irreversible indicator response, which can be either tensile actuation or actuation by torsional rotation.

More generally, twist can be inserted in a polymer fiber at temperatures that are much lower that the temperatures that are of interest for monitoring in a time-temperature indicator. If muscle training that provides reversible muscle thermal response is avoided (like annealing of fiber mechanical strains by heating to the temperatures of interest for time-temperature monitoring), subsequent exposure of the yarn to these temperatures can provide the irreversible actuation that provides the indicator response. Likewise, for integrated detection of chemicals in the environment that react with multiple bonds, the twist-inserted polymer fiber can be chosen that contains such bonds (like olefinic and acetylenic groups). Since coiling of nanofiber yarn and twist-inserted polymer fiber can amplify both reversible and irreversible tensile actuation, such coiled nanofibers and twist-inserted polymer fibers are preferred for irreversible exposure-integrating muscles used to provide tensile actuation. One end tethering for a twisted nanofiber yarn muscle or a twist-inserted polymer fiber muscle that provides reversible torsional actuation only when two end tethered is an especially convenient means for providing an exposure integrating muscle that provides a torsional indicator response.

Yarn thermal actuators can be fuel powered, like for previous fuel-powered shape memory metal actuators that were capable of only tensile actuation ["Fuel Powered Actuators and Methods of Using Same", R. H. Baughman, V. H. Ebron, Z. Yang, D. J. Seyer, M. Kozlov, J. Oh, H. Xie, J. Razal, J. P. Ferraris, A. G. MacDiarmid, W. A. Macaulay, U.S. Pat. No. 8,096,119 B2]. One invention embodiment for providing fuel-powered twist-spun hybrid muscles is to provide a yarn that contains volume-changing guest in the yarn core and catalytic particles (like Pt or a Pt alloy) in the yarn shell for generating heat by combining fuel and oxidant (like hydrogen or methanol with air). The biscrolling process [M. D. Lima et al., *Science* 331, 51-55 (2011)] can be conveniently used for providing twist-spun muscles having such a sheath-core structure. This is accomplished by depositing the volume-changing host material on one extended area side of a forest drawn sheet or sheet stack, and the catalyst particles on the remaining sheet area, and then asymmetrically inserting twist so that the catalyst is in the yarn sheath and the volume-changing guest is in the yarn core. Similarly, such asymmetric deposition of volume-changing guest and catalyst can be deposited in the sheet wedge that is formed during twist insertion during direct spinning of a nanotube yarn from a nanotube forest. As shown in Example 25, chemically driven reversible actuation can be changed to irreversible actuation by selecting a muscle configuration and/or muscle type that provides irreversible actuation. The configuration used in Example 25 to provide irreversible actuation for a single-ply, coiled nylon muscle is one-end tethering.

Prior-art work [J. Foroughi et al., *Science* 334, 494 (2011)] suggested that the previously described electrochemical nanotube yarn muscles could be driven in reverse to convert torsional mechanical energy to electrical energy. Instead of using an electrochemical process to convert mechanical energy to electrical energy, a quite different approach is used in invention embodiments for hybrid nanofiber yarn and polymer fiber artificial muscles. The applicants harvest energy associated with fluctuations in ambient temperature, in incident light intensity, or in chemical environment (including humidity) to cause torsional and or tensile actuation of hybrid nanofiber yarn or polymer fiber artificial muscles. They then harvest this mechanical energy as electrical energy by such processes as using tensile or torsional actuation to deform a piezoelectric or ferroelectric that has contacting electrodes, to deform an electric-field-biased, elastomeric-material-based capacitor, or by using the torsional actuation of the artificial muscle to rotate a permanent magnet relative to surrounding electric coils (or the inverse process where electric coils are rotated with respect to a static magnetic field). Since means for converting mechanical energy to electrical energy are diverse and well known, the novelty of the present technology is in the use hybrid twist-spun nanofiber yarn or twisted polymer fiber artificial muscles to generate mechanical energy from these fluctuations in the ambient.

Actuation provided by twist-spun yarns and twisted polymer fibers can be used to affect the thermal expansion and compliance of yarn and polymer fiber assemblies, such as yarn and fiber tows and ropes, and other structures. For instance, in many applications it is desirable to compensate the positive thermal expansion of one structural material with the negative thermal expansion of another structural material, The present discovery that inserting coiling enables the negative thermal expansion of neat twist-spun nanofiber yarns to be controllably increased in magnitude by a factor of about 10 or higher enables the matching of positive and negative thermal, so that desired thermal expansion can be obtained (including one that is near zero). Since infiltration of a material like paraffin into a twist-spun yarn can make thermal expansion even more negative, hybrid twist-spun yarns are also especially useful for this application. Moreover, since twist-inserted polymer fibers provide large controllable negative thermal expansion, which can be tuned and greatly enhanced by yarn coiling, these twist-inserted polymer fiber yarns are especially useful for such application in which a near-zero thermal expansion is sought for fiber assemblies (and yarn and fiber assemblies) or for composites.

Melting of solid guest within a twist-spun hybrid yarn causes yarn tensile modulus to reversibly decrease (and, correspondingly, the yarn compliance to increase). Hence, this type of actuation can be used for various purposes, like varying the stiffness of wings on a micro-air vehicle or the stiffness of an artificial muscle.

More generally, combinations of different types of actuating nanofiber hybrid yarns and different types of twist-inserted polymer fibers can be combined for in-parallel operation or operation within a given actuator length to provide engineered responses in terms of overall stroke and compliance. In the case of electro-thermal actuation, independent electrical connections to different segments in an actuator length or for different in-parallel actuator lengths can be used to tune stroke and compliance according to application needs, such as for a humanoid robot that is catching a ball. Such combinations also enable response tuning for environmentally powered artificial muscles.

The observed low degree of hysteresis in muscle stroke when the nanofiber yarn and polymer fiber muscles are actuated under fixed load, which contrasts with that for shape memory metal muscles, facilitates control of muscle stroke. This is demonstrated in Example 23, were a conventional proportional-integral-derivative controller (PID controller) is used to minimize positioning error. This low or absent hysteresis is used in Example 33 to provide two-dimensional displacement of a load by using an arrangement of non-parallel coiled polymer fiber or hybrid nanofiber yarn muscles or muscle segments.

By using an electrical heating element for electrothermal actuation that is mechanically coupled to a hybrid nanofiber yarn muscles or a polymer fiber muscle, the resistance of the heating element can be deployed for determining muscle stroke by measuring the resistance of this heating element. For such applications, the resistance of the electrical heating element is preferably insensitive to temperature, but sensitive to muscle strain. An example of such a suitable electrical heating element is a carbon nanotube sheet that is wrapped around a polymer fiber muscle or a hybrid nanofiber yarn muscle. Similarly, such a wrapped carbon nanotube sheet or like element can be used to measure muscle stroke for non-electrically powered muscle actuation, such as that provided by photo-thermally or chemically powered actuation or powered by changes in ambient temperature or chemical environment (including environmental humidity).

Polymer fiber muscles or nanofiber yarn muscles of invention embodiments can also be used to thermoacoustically generate sound when driven electrically or photo-thermally, as shown in Example 24. For such application, the sound generating element (such as a carbon nanotube sheet wrapped about a polymer fiber muscle, a hybrid nanofiber yarn muscle, or a neat nanofiber yarn muscle) should have high porosity and sufficiently low thermal inertia that it can heat and cool at acoustic frequencies. This sound can be optionally detected so as to provide a means to sense muscle activity. As for the case of Example 24, the frequency at which the nanofiber conducting layer is driven can be much higher than the frequency at which a nanofiber-wrapped, twist-inserted polymer fiber muscle is electrothermally actuated, since the nanofiber layer can heat and cool much faster than can the typically much more massive underlying polymer fiber muscle. For example, instead of applying a DC square-wave voltage pulse, an audio signal voltage at much higher frequencies (but with similar root-mean-square amplitude) can be applied to produce the Joule heating needed for electrothermal muscle actuation. Taking into account for acoustic signal processing the frequency doubling that occurs if the nanofiber sheet is initially unheated and the rising temperature of this sheet during muscle actuation, a muscle-supported nanofiber sheet could broadcast an acoustic message (saying, for instance: "The muscle is actuated").

Additionally, elements having the configuration of a polymer fiber or nanofiber yarn muscles can be used to generate sound even when not deployed as muscles. Such thermoacoustically sound generating fiber or yarn elements can be operated in-parallel or non-parallel yarn or polymer arrays to provide increased sound intensity, and to provide directional steering of sound generation (by varying the relative phases of the electrical signal inputted to the different yarns or fibers in an array).

Such sound generating fiber or yarn elements can also be used for cancellation of ambient noise when operated out-of-phase with respect to this ambient noise.

A direct current bias can be optionally applied to these thermal-acoustic nanofiber yarn or polymer fiber elements, so that sound generation is at the same frequency as an input alternating current—thereby avoiding the doubling of output sound frequency with respect to the input frequency that occurs when no dc bias is applied. Even when the function of interest is exclusively mechanical actuation, such direct current bias can be usefully applied to provide oscillation of actuator stroke about a desired actuator stroke.

As a further application embodiment, the tensile or torsional actuation of twisted polymer fiber muscles and twist-spun nanofiber yarn muscles can be used to cancel unwanted translational or rotary movements. This embodiment operates by the application of muscle generated torque or tensile force that counteracts the unwanted translational or rotary movements.

Additional information of the present invention is included in M. D. Lima et al., "Electrically, Chemically, and Photonically Powered Torsional and Tensile Actuation of Hybrid Carbon Nanotube Yarn Muscles," *Science*, 338, 928-932 (2012), which is incorporated herein by reference in its entirety.

EXAMPLES

The examples provided herein are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

Example 1

This Example 1 described the fabrication of yarn muscles containing paraffin wax guest. Though we obtained similar results for other commercially obtained waxes (like those used for canning and candles), unless otherwise indicated the described results are for a wax more likely to be readily available to future researchers (Sigma-Aldrich 411671 wax), which comprises a mixture of alkanes. Results in Section 3 show that this wax fully melts at 83° C., expands by ~20% between 30 and 90° C. during solid-state transitions and melting, and provides ~10% additional volume expansion between 90 and 210° C.

MWNT yarns were typically infiltrated with paraffin wax using the "hot wire method", wherein a two-end-tethered, twist-spun yarn, under constant tensile load was electrically heated to above the melting point of the paraffin wax and then contacted with a small amount of solid paraffin. Upon touching the heated yarn with flakes of solid paraffin or droplets of molten paraffin, the paraffin quickly spread through the yarn. For a 100 μm diameter MWNT yarn, an applied voltage of about 3 V/cm was sufficient to enable infiltration of the Aldrich paraffin wax. Since excess paraffin on the yarn surface degraded actuation, the yarn was electrically heated to above the evaporation temperature of the paraffin (~233° C.) until no excess paraffin was observed on the yarn surface. The need for this second step can be avoided by multiple applications of molten droplets to the heated yarn, and stopping this process before excess paraffin accumulates on the yarn surface. Another wax infiltration method, which was used for all Fermat yarns that were directly twist spun during forest draw, is to slowly immerse a two-end-tethered, as-spun yarn into melted paraffin (about 0.1 cm/s) under constant tensile load (~10% of the failure stress). SEM microscopy of the yarn cross-section indicate that porosity of the neat yarn has been largely eliminated by wax infiltration using the above slow immersion method.

Example 2

This Example 2 described the fabrication of yarn muscles containing polydiacetylene guest. The utilized diacetylene (DA) was 10,12-pentacosadiynoic acid [$CH_3(CH_2)_{11}C\equiv C-CC(CH_2)_8COOH$], which was purchased from Alfa Aesar Co., Ltd and used as received. An as-spun, two-end-tethered, Fermat yarn (9 μm in diameter, with 20,000 turns/m of inserted twist) was first immersed in 8 M DA tetrahydrofuran solution for an hour, and then the DA infiltrated yarn was removed from the solution and dried overnight at room temperature while maintaining tethering. UV light (254 nm from a 30 W UV lamp) was used to in situ polymerize the DA into a polydiacetylene (PDA). The polymerization time was typically around 3 minutes, which caused the yarn to develop a dark blue color. However, polymerization was incomplete, in part because nanotube and diacetylene absorption prevents deep penetration of the UV light inside the yarn.

Example 3

This Example 3 described the fabrication of a hybrid yarn muscles containing polyethylene glycol guest. Polyethylene glycol (PEG), $H(OCH_2CH_2)_nOH$, with an average molecular weight of ~6000 and a melting temperature range of 60 to 63° C., was obtained as flakes from Sigma Aldrich (Bio-Ultra 6000) and used as received. The PEG was infiltrated into the lower half of a 13 μm diameter Fermat yarn (containing 15,000 turns/m of inserted twist) by immersion of this yarn segment in a molten bath of PEG for 30 minutes at about 100° C. Then the two-end-tethered yarn was removed from the PEG bath and allowed to cool to room temperature. The diameter of the PEG-filled yarn segment was 17 μm and the bias angle was 31°.

Example 4

This Example 4 described the fabrication of yarn muscles containing palladium guest. Using e-beam deposition (CHA-50 e-beam evaporator), individual nanotubes and nanotube bundles within a stack of two co-oriented MWNT sheets, supported by rigid rods, were coated first with a ~5 nm thick Ti buffer layer (to ensure uniform Pd deposition) and then with a 60, 80, 120, or 140 nm thick Pd layer, where the layer thicknesses are nominal values that correspond to the layer thickness of depositions on a planar substrate that is in the same environment. Then, the sheets stack was twist spun (100 to 200 turns/m) to obtain a 144 µm diameter yarn having dual-Archimedean structure. A 60 nm Pd layer was sufficient to obtain reversible actuation of the yarn and a thicker coating undesirably increased the difficulty of inserting yarn twist.

Example 5

This Example 5 showed that yarn coiling dramatically increases tensile actuation for both neat and paraffin wax infiltrated carbon nanotube yarns. Tensile contraction versus temperature for coiled dual-Archimedean yarn, before and after wax infiltration, is compared in FIG. 2A with corresponding data (figure inset) for non-coiled Fermat yarn. Wax infiltration greatly enhanced tensile contraction for all yarns, as did yarn coiling. Despite a difference in the load dependence of actuation, similar tensile strokes were obtained for non-coiled, Fermat and dual-Archimedean yarns having similar diameter and twist angle (FIG. 6). Heating the neat coiled yarn from ambient to incandescent temperature (about 2,560° C.) under 3.8 MPa tensile stress provided a reversible yarn contraction of 7.3% (FIG. 2B), corresponding to 0.16 kJ/kg work capability. Since yarn coiling greatly enhanced tensile actuation stroke, coiled yarns (FIG. 1E) are the focus of most of the below studies on tensile actuation.

Example 6

In this Example 6, tensile actuation at a remarkable 1,200 cycles per minute and 3% stroke was demonstrated for over 1.4 million cycles (FIG. 3A) using a two-end-tethered, paraffin-wax-filled, coiled Fermat yarn that lifted 17,700 times its own weight. This high-rate was produced by applying a 20 Hz, 18.3 V/cm square wave voltage at 50% duty to a 3.8 cm long yarn weighing 2.25 µg/cm. Fast passive cooling in 25 ms resulted from the small yarn and coil diameters (11.5 µm and 20 µm, respectively). Applying well-separated 25 ms pulses yielded 1.58% initial contraction and 0.104 kJ/kg of mechanical energy during this contraction at an average power output of 4.2 kW/kg (four times the power-to-weight ratio of common internal combustion engines).

Example 7

This Example 7 showed that the performance of the yarn of Example 6 as a tensile actuator can be optimized by increasing the applied voltage and mechanical load, while reducing the pulse duration. FIG. 3B shows a series of actuations wherein the yarn lifts 175,000 times its mass in 30 ms when 32 V/cm is applied for 15 ms. The work during contraction (0.836 kJ/kg) provided a power output of 27.9 kW/kg, which is 85 times the peak output of mammalian skeletal muscles (0.323 kW/kg) and 30 times the maximum measured power density of previous carbon nanotube muscles [J. Foroughi et al., *Science* 334, 494 (2011)]. However, the high applied electrical power reduces cycle life by causing excessive heating and slow paraffin evaporation.

Actuator stroke and work capacity during contraction can be independently maximized by optimizing the applied load, though in general they cannot be simultaneously maximized. FIG. 3C shows the stress dependence of actuator stroke and work capacity for different amounts of twist insertion in a wax-infiltrated, 150 µm diameter, dual-Archimedean yarn that is two-end tethered. Reversible contraction, which is greatly enhanced for yarn having sufficient twist to cause coiling, resulted from steady-state electrical heating to just below the wax vaporization temperature. Applying high stress decreases stroke, due to the yarn's lower Young's modulus in the contracted state (containing molten wax) and correspondingly larger elastic elongation under load than the initial state (where the solid wax provides structural reinforcement for both tensile and torsional deformations). The stroke for highly coiled yarn decreases at low stresses (FIG. 3C), which is consistent with the close proximity of adjacent coils hindering contraction.

FIG. 3C showed that there is an optimal amount of coiling that maximizes either stroke or work during contraction for the wax hybrid yarn. A maximum contraction of 5.6% was observed at 5.7 MPa stress for a coiled Fermat yarn having intermediate twist. Adding 6.8% more twist to the coiled yarn increased the stress of maximum contraction (16.4 MPa for 5.1% strain) and the maximum measured contractile work (1.36 kJ/kg at 84 MPa), which is 29 times the work capacity of natural muscle. Subsequently reducing twist by 41% eliminated coiling and reduced maximum contraction and contractile work to low values (0.7% and 0.31 kJ/kg, respectively). Contractions of 10% under 5.5 MPa stress were realized for a 150 µm diameter, partially coiled, dual-Archimedean yarn by applying well-separated 50 ms, 15 V/cm pulses (FIG. 3D). Since the cross-sectional area of this yarn was 170 times higher than for the yarn of FIG. 3A and FIG. 3B, passive cooling in ambient air was less effective: the cooling time increased from about 25 ms to about 2.5 s, resulting in a low contractile power density when both heating and cooling times are considered (0.12 kW/kg).

Example 8

In this Example 8, experimental data on tensile actuation versus twist insertion for a neat Fermat yarn in the FIG. 1A configuration shows the importance of twist and resulting bias angle increase on thermal contraction (FIG. 5). With increase of inserted twist from approximately 9,650 turns/m to approximately 28,130 turns/m, tensile actuation at constant applied power increased about 2.8 times (from about 0.03% to about 0.086%). However, when the start of coiling was first observed (at 33,800 turns/m) there was about 4.5% decrease in thermal contraction, which might be due to the predominance of non-coiled yarn segments in providing contraction when there is little coiling and the effect of introduced coiling on decreasing modulus.

Example 9

In this Example 9, very fast, highly reversible torsional actuation was demonstrated for two million cycles for a 6.9 cm long, 10 µm diameter, two-end-tethered, half-wax-infiltrated homochiral Fermat yarn that rotated a paddle at yarn midpoint (FIG. 1B configuration). The hybrid yarn accelerated a 16.5 times heavier paddle to a full-cycle-averaged 11,500 rotations per minute—first in one direction and then in reverse (FIG. 4A). Even though actuation temperature was far above $T_{mf}$, this high cycle life resulted because of the presence of a torsional return spring (the unactuated yarn segment of FIG. 1B). FIG. 4B shows the dependence of torsional rotation on input electrical power and applied tensile load for a similar yarn that rotated a 150 times heavier paddle for a million highly reversible cycles. Increasing load increased rotation speed from 5,500 revolutions/minute to a maximum of 7,900 revolutions/minute. Reversible torsional actuation (12.6°/mm) was also driven for a half-wax-infiltrated yarn by replacing electrical heating with heating using light pulse from a 100 W incandescent lamp.

Example 10

This Example 10 characterizes the effect of wax infiltration on torsional actuation for a two-end tethered homochiral yarn, wherein one-half of the yarn is actuated and the other half largely functions as a torsional return spring. The utilized 16 µm diameter Fermat yarn had 15,000 turns/m of inserted twist and a bias angle of 35°. The configuration for the wax containing yarn was exactly the same as for FIG. 1B, and that for the non-infiltrated yarn differs only in that the two yarn segments were equivalent except that electrical power was applied to only one-half of the yarn length. In these comparative examples the same mechanical load was applied and the voltage used to achieve actuation was identical (11.6 V/cm). Although some torsional actuation rotation was observed for the neat yarn (4.9°/mm), which may be due to small difference in torsional and tensile moduli between the low and high temperature yarn segments, this rotation was low compared to the 71.2°/mm torsional actuation observed when one of the yarn segments was subsequently infiltrated with paraffin wax.

Example 11

This Example 11 demonstrated that use of two-ply heterochiral yarn (instead of a non-plied heterochiral yarn) enables reversible electrothermal torsional actuation for the FIG. 1D configuration. A SZ yarn was obtained by inserting about 30% extra twist into an 11 µm diameter, Fermat Z yarn having an initial twist of 20,000 turns per meter. This highly twisted yarn was then folded upon itself, so that part of the Z twist was converted to S twist due to plying. A ZS yarn was made analogously. Then these yarns were knotted together, and a paddle was attached at the position of the knot. The resulting two-ply SZ-ZS yarn structure was 20 µm in diameter.

Steady-state measurements of torsional actuation as a function of input electrical power measurements (FIG. 8) show that reversible torsional rotation results in the FIG. 1D configuration for heterochiral, two-ply Fermat yarn that is either (1) wax-filled and actuated to above the melting point of the wax or (2) neat and actuated to incandescent temperature in vacuum. The applied stresses for these experiments were 3.2 MPa for the neat yarn and 5.8 MPa for the wax-filled yarn. While the maximum torsional actuation achieved here for wax-filled SZ-ZS yarn (68°/mm) is about the same as for the half-infiltrated homochiral yarn of Example 10 in the FIG. 1B configuration (71.2°/mm), the neat SZ-ZS yarn in vacuum provided 30°/mm torsional actuation (versus the 4.9°/mm for the half-actuated, homochiral yarn of Example 10 in air). This latter difference shows, at least in part, the actuation enhancement for neat yarn that results from actuation to high temperatures (which are presently enabled at the same power as for wax-filled yarn by using vacuum to eliminate convective energy loss for the porous neat yarn). Although low for nanotube torsional actuators, this 30°/mm of torsional actuation for the neat yarn is 200 times the maximum previously reported for shape memory alloys, ferroelectric ceramics, or conducting polymers. Torsional actuation was investigated for this neat two-ply yarn when driven in vacuum to incandescent temperatures using 9.7 V/cm voltage pulses with 1 Hz frequency and 20% duty cycle. A 27°/mm rotation was observed with an average speed of 510 revolutions per minute.

This reversible behavior contrasts with the lack of reversibility of actuation of heterochiral, single-ply yarn in the FIG. 1D configuration when the yarn does not contain solid guest at all points in the actuation cycle. In the latter case, permanent cancellation of the opposite twist in the two yarn segments occurs during actuation, thereby resulting in permanent elongation and reduction of torsional rotation during cycling.

Example 12

This Example 12 demonstrated that paraffin-wax-infiltrated, coiled carbon nanotube yarn can generate giant specific torque and that this torque can be used to hurl an object. The measured static specific torque versus applied electrical power for a 100 µm diameter, 6.4 cm long, fully-infiltrated, heterochiral, dual-Archimedean yarn having approximately 3,000 turns/m of inserted twist per stack length is shown in FIG. 4C. A maximum specific torque of 8.42 Nm/kg was generated for this 100 µm diameter yarn, which is five times higher than demonstrated for electrochemically driven nanotube yarns [J. Foroughi et al., Science 334, 494-497 (2011)] and slightly higher than for large electric motors (up to 6 Nm/kg). This torque was determined using a digital microbalance to measure the force exerted by a metal paddle (23 mm long) attached to the central junction point of the heterochiral yarn. The paddle was in the horizontal position, pressing against the plate of the microbalance during force measurement. So that no force was applied to the microbalance when the actuating voltage was zero, at the beginning of the experiment the wax in the yarn was melted (by electrical heating) and re-solidified while the metal paddle was in contact with the plate of the microbalance. This same paraffin-wax-infiltrated heterochiral yarn was used to hurl a projectile by rotating the arm of a miniature Greco-Roman style catapult (FIG. 4C, lower inset) by 300° Though the maximum torsional actuation temperature was above the temperature at which wax melting was complete, reversible operation of the catapult was achieved.

Example 13

In this Example 13, Applicant has also demonstrated reversible, thermally powered torsional actuation for hybrid yarn containing other volume-expanding guests. This is presently demonstrated for $CH_3(CH_2)_{11}C{\equiv}C{-}C{\equiv}C(CH_2)_8COOH$, which was infiltrated into twist-spun Fermat yarn (d=9 µm and α=26°) and photopolymerized by 1,4-addition to produce a polydiacetylene (PDA), as described in Example 2. Like for a related polydiacetylene used to make color-changing carbon nanotube yarns [H. Peng et al., Nature Nanotech. 4, 738 (2009)], the produced polydiacetylene is polychromatic, providing a blue-to-red phase transition at ~57° C. that is reversible unless too high a temperature is reached. However, the partial degree of polymerization is a complication, since the unpolymerized monomer melts at ~63° C., and produces additional yarn expansion.

For the first investigated horizontal configuration (FIG. 7A, which is analogous to the FIG. 1B configuration) the two-end-tethered homochiral Fermat yarn supported a constant load (2 MPa, when normalized to the cross-section of the unactuated yarn). The PDA-containing yarn segment used for torsional actuation was 3 cm long and the total yarn length was 7 cm, of which 6 cm was located before the wire eye hole support and the rest of the yarn length vertically supported a slotted weight, which was not free to rotate (but was free to move vertically as the actuating yarn segment contracted and expanded). Hence, the non-infiltrated yarn length acts as a torsional return spring. Both for this and the second described configuration, Joule heating was by applying a voltage between the yarn end and the metal eye hole support. When 2 mA DC current was applied to the yarn (corresponding to 13 mW/cm input power), reversible paddle rotation of 100°/mm was produced as the actuated yarn untwisted during Joule heating. Highly reversible actuation was demonstrated for over 5,000 on-off cycles, which were the maximum investigated.

Figure 7B:
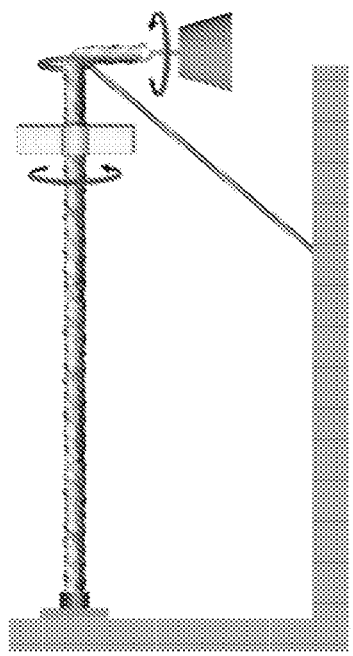

Even when in a one-end-tethered configuration (FIG. 7B, which is analogous to the FIG. 1C), the fully infiltrated, PDA-hybrid yarn can provide reversible torsional rotation even when heated to above the melting point of unpolymerized monomer. When 2 mA DC current was applied to the 3 cm long diacetylene-infiltrated yarn segment, the paddle rotated in the direction that corresponds to untwist of the actuating yarn, and this rotation was then reversed when electrical heating was stopped. This indicates that the polydiacetylene inside the yarn functions as an internal torsional spring to enable torsional actuation to reverse when yarn volume decreases during cooling. Since the corresponding neat yarn does not have a return spring, it does not provide reversible torsional actuation.

Due to a few percent volume increase at this blue-red phase transition and a larger volume change from melting incompletely polymerized monomer at 63° C., reversible torsional rotation of 100°/mm was obtained for actuation to below 80° C. for the two-end-tethered, half-infiltrated yarn configuration of FIG. 1B. Actuation to higher temperatures was poorly reversible, likely because of an irreversible phase transition.

Example 14

This Example 14 demonstrated actuation powered by absorption for the palladium hybrid carbon nanotube yarn of Example 4. The configuration of FIG. 1D was deployed for characterization of torsional actuation using 0.022 MPa applied tensile stress. Reversible torsional actuation was powered by the absorption and desorption of hydrogen on a 60 nm thick palladium layer on nanotube bundles within a dual-Archimedean yarn. Since this 144 μm diameter yarn contained 90 wt % palladium, the resulting high torsional rigidity restricted twist insertion to up to 200 turns/m. Nevertheless, a one-end-tethered yarn rotated at its free end a thousand times heavier paddle during hydrogen absorption. Injection of 0.05 atm $H_2$ into a vacuum chamber containing the actuator caused 1.5 paddle rotations within ~6 s, which was fully reversed on a similar time scale during repeated cycling between hydrogen exposure and vacuum. Cantilever-based actuators exploiting the dimensional changes of a 10 μm thick Pd alloy layer have been previously demonstrated [M. Mizumoto, T. Ohgai, A. Kagawa, *J. of Alloys and Compounds* 482, 416-419 (2009)], but the response time was in tens of minutes. The yarn's 100-fold faster response rate resulted from yarn porosity and the thinness of the Pd coating. Such yarn actuators might be used as intelligent muscles that rapidly close an inlet when a targeted hydrogen pressure is exceeded.

Example 15

This Example 15 demonstrated that liquid absorption and desorption can also drive actuation, as shown in FIG. 9, where torsional actuation of a two-end-tethered Fermat yarn is shown as a function of immersion length in liquid. Largely reversible torsional rotation was obtained by varying the immersion depth of a two-end-tethered homochiral yarn in a wetting liquid. The actuator test configuration of FIG. 9A was deployed, where the total yarn length was 80 mm, the paddle used for recording actuation was approximately at yarn midpoint, the top end of the yarn was attached to a flexible rod support and the bottom yarn end was rigidly attached to the bottom of a stationary 20 mm diameter glass vial. The investigated Fermat yarn contained approximately 25,000 turns/m of inserted twist and the initial yarn diameter and bias angle were 8 μm and 32°, respectively. The Mylar paddle was 3.5 mm wide, 2 mm tall and 0.1 μm thick and weighed 1.0 mg, which is ~100 times heavier that the total yarn.

The actuator response was trained by first injecting about 4 $cm^3$ of test liquid into the glass, which provided a yarn immersion depth of about 12 mm. After the paddle rotation stopped, indicating torque balance, the liquid was removed at about 0.1 mL/s, which corresponded to a 0.3 mm/s decrease in yarn immersion depth. The liquid filling/removal procedure was repeated 3 times to ensure a degree of reversibility for the dependence of paddle rotation angle on yarn immersion. After this training period, the data in FIG. 9B shows that the paddle rotation angle (d)) is a function of yarn immersion depth, with approximate slopes of 49.6±3.4 and 35.3±1.7 degree/mm for acetonitrile and hexane, respectively.

Example 16

This Example 16 experimentally demonstrated torsional actuation for a two-end-tethered, homochiral, non-coiled Fermat yarn that was partially infiltrated with polyethylene glycol (PEG), using the method described in Example 3. PEG was chosen as guest in the carbon nanotube yarn since it expands volume by 10% during melting [L. J. Ravin, T. Higuchi, *J. Am. Pharm. Assoc.* 46, 732 (1957)]. The yarn diameter, amount of inserted twist, and bias angle were 17 μm, 15,000 turns/m, and 31°, respectively. The total yarn length was 5.2 cm, a 2.6 cm long section at one yarn end was infiltrated with PEG, and the paddle was at the junction between infiltrated and non-infiltrated yarn segments, like in FIG. 1B. This paddle, which is 92 times heavier than the infiltrated yarn segment, was a rectangular Kapton tape strip (3.7 mm long, 1.1 mm wide, and 130 μm thick). Torsional actuation was recorded using a high speed movie camera (240 frames/s), and data was obtained by frame-by-frame analysis of the time dependence of paddle rotation angle.

Using the FIG. 1B configuration, actuation to above the melting temperature of the PEG was produced by applying a 2.4 mA square wave current pulse (3.4 Hz frequency and 25% duty cycle) along the entire yarn length. The corresponding power during actuation was 16 mW/cm and the tensile stress applied during actuation was 23 MPa (when normalized to the cross-section of the non-actuated yarn). Using this pulsed electrical power input, a maximum rotation speed of 1,040 revolutions per minute and a torsional rotation of 37°/mm were obtained (during an actuation cycle where the infiltrated yarn segment first untwists during heating and then retwists during unaided cooling). No degradation in actuation was observed up to the maximum number of observed cycles (100,000 cycles).

Example 17

As an alternative to electrical heating, this Example 17 demonstrated that torsional and tensile actuation of paraffin-containing carbon nanotube hybrid yarns can be produced by incandescent heating from a 100 W white-light lamp that was manually switched on (1.6-2 s) and off (0.3-0.5 s). Using the FIG. 1B configuration, reversible torsional actuation of 12.6°/mm was obtained for a two-end-tethered homochiral Fermat yarn (about 15 µm diameter with approximately 20,000 turns/m of inserted twist) that was half-infiltrated with paraffin wax. Reversible tensile contraction occurred simultaneously with untwist of the paraffin-containing yarn segment during torsional actuation caused by photonically heating this yarn segment.

Example 18

This Example 18 demonstrated the use of a lever arm to achieve high frequency, large stroke, tensile actuation for a two-end-tethered, homochiral, coiled Fermat yarn that was fully infiltrated with paraffin wax (using the method described in Example 1). The yarn diameter within the coil and the coil diameter were about 22 µm and about 37 µm, respectively. The total yarn length was 7.3 cm when a stress of about 15.2 MPa was applied. The rigid lever arm was a 50 mm long aluminum tube (0.159 cm outer diameter and 0.088 cm inner diameter) weighing 0.196 g that was free to pivot about one rod end. The force generated by the actuating yarn was applied a distance of 3 mm from the pivot point (using an aluminum ring attached to yarn end) to provide a mechanical advantage of 0.06. Actuation to above the melting temperature of the paraffin was produced by applying about 13 V/cm voltage (at 5-10 Hz frequency and 50% duty cycle) along the entire yarn length. Using this pulsed electrical power input, a maximum vertical displacement of 11.9 mm was obtained for an applied frequency of 5 Hz. Applying the force of actuation at 5 mm from the pivot point (corresponding to a mechanical advantage of 0.1) and using higher applied frequencies of 6.7 and 10 Hz, this displacement decreased to 10.4 mm and 3.5 mm, respectively.

Example 19

This Example 19 demonstrated amplified, high frequency tensile actuation for a two-end-tethered, homochiral, coiled Fermat yarn that was fully infiltrated with paraffin wax. The yarn muscles and the yarn configuration (like in FIG. 1A) were the same as for Example 18. Like for this example, one end of the actuating yarn was attached by knotting to an aluminum ring. However, in this Example 19 the force generated by the yarn muscle was applied (via the attached aluminum ring) to a 254 µm diameter and 60 mm long tempered wire cantilever that had a linear density of about 0.04 g/cm. Since the attachment point to the wire was 20 mm from the cantilever base, the mechanical advantage was 0.33. Actuation to above the melting temperature of the paraffin wax in the yarn muscle was produced by applying about 13 V/cm voltage (at 75 Hz frequency and 50% duty cycle) along the entire yarn length. Using this pulsed electrical power input, a maximum vertical displacement of the cantilever tip by 3.43 mm was obtained at 75 Hz.

Example 20

This Example 20 experimentally and theoretically relates the volume change of a yarn guest to the volume change of an actuated yarn. Movies recorded by optical microscopy were used to characterize yarn structure changes as overall yarn length change was measured during isotonic electro-thermal tensile actuation. A wax-filled, non-coiled, dual-Archimedean yarn was two-end-tethered in the FIG. 1A configuration. This 150 µm diameter yarn had a bias angle of about 35° and contained 2,500 turns/m of inserted twist per stack length. The applied load was 13.4 MPa and 123 mW/cm of electrical power was applied to cycle between actuated and non-actuated steady states. We observed that yarn diameter increased by 4.06±1.87% as total yarn length contracted by 0.585±0.003%, thereby indicating that the yarn volume increased by 7.7±2.6% during actuation. As expected because of nanotube volume, this percent yarn volume change from ambient temperature to about 210° C. was much smaller than the percent volume change of the wax, which is about 30%.

For comparison with the above result, the percent volume change for the yarn during actuation ($\Delta V_y/V_y$) was calculated from the density of bundled nanotubes ($\rho_b$), the initial density of the wax before actuation ($\rho_w$), the fraction of yarn weight that is wax ($F_w$), and the fractional change in wax volume during actuation ($\Delta V_w/V_w$). The result is:

$$\Delta V_y/V_y = (\Delta V_w/V_w)(1+(\rho_w/\rho_b)((1-F_w)/F_w))^{-1}.$$

A nanotube bundle density of $\rho_b=1.65$ g/cm$^3$ was calculated by approximating that a typical bundle contains hexagonally close-packed, 9 nm diameter nanotubes having six walls. Using 0.9 g/cm$^3$ for the density of the solid wax, $\rho_w/\rho_b=0.54$. For the measured weight fraction of wax in a 180 µm diameter, dual-Archimedean yarn (0.28) and the measured $\Delta V_w/V_w$ between 30 and 210° C. (30%), the calculated yarn volume change is 12.6%, which is within two standard deviations of the above measured value (7.7±2.6%).

Example 21

This Example 21 demonstrates the use of polymer-filled, coiled carbon nanotube yarns as tensile actuators, as well as the enhancement of tensile stroke by resin infiltration in a low-twist yarn state, subsequent polymerization of this resin and then insertion of the high twist needed to produce yarn coiling. A 300 µm diameter host dual-Archimedean carbon nanotube yarn was produced by inserting 100 to 200 turns/m of twist (under 5 g load) into a stack of four forest-drawn MWNT sheets that were 2.5 cm wide and 15 cm long. This low-twist host yarn was then infiltrated with silicone rubber resin (bi-component SiLicone cps 1200 from Silicones, Inc.). After the silicon rubber was cured (for ~24 hour at room temperature) the composite yarn was twisted under about 0.2 MPa tension until it was fully coiled. The final diameter of the yarn was about 270 µm. This low-twist-infiltration method allows a coiled hybrid yarn to be fabricated that contains a very high weight and volume percent of guest material. For the above described silicone rubber/carbon nanotube yarn the weight percent of silicone rubber was about 95%. As a result of this high yarn loading with guest, the large thermal expansion of the guest, and the post-infiltration use of coiling, giant tensile contraction resulted during electrothermal actuation. Upon electrical heating (using 0.2 second square-wave pulses of 5V/cm), the coiled hybrid nanotube yarn reversibly contracted by up to 35% under a stress of 5 MPa (FIG. 10).

Example 22

This Example 22 demonstrates the use of a single coiled, two-ply, SZ twisted, silver-coated nylon fiber as a noiseless actuator for controlling the opening of window shutters, which is pictured in FIGS. 22C-22D. The precursor non-twisted 200 um diameter silver-coated fiber was commercially obtained and the inserted twist was 990 turns/meter. The nylon muscle was two-end tethered. The operating voltage used to open and close the blinds during a 25 second cycle was a 15 V square wave (7 seconds on and 18 seconds off) for the 28 cm long coiled fiber. The length change of the coiled fiber was a 2 cm contraction (7.1% contraction) under an applied load of 200 g, which was used to return the shutter to closed position. Using this contraction the shutter opens from closed position (15° slat inclination with respect to the vertical direction) to 90° (the fully open position) during fiber actuation. Deployment of this thermal actuation by use of ambient temperature changes could deploy a pulley configuration to amplify stroke for the relevant changes in ambient temperature. If an increase in generated force is needed, multiple coiled fibers can be deployed that operate in parallel.

Example 23

This Example 23 demonstrated precise control of actuator position via a control loop. The controller used was a proportional-integral-derivative controller (PID controller), which is like controller types widely used for industrial control systems. This PID controller calculates an "error" value as the difference between a measured process variable (presently position) and a desired set point. The controller attempts to minimize the error in positioning by adjusting the process control inputs, which is presently the applied voltage, current, or power.

Although the hysteretic behavior of shape memory actuators complicates control systems, this problem did not arise for the investigated coiled polymer fiber. A simple PID loop was implemented that accurately controlled the displacement of a coiled, carbon-nanotube-sheet-wrapped nylon actuator. Displacement was measured by an Omega LD701 non-contact displacement sensor, and input/output connected to a computer via a NI PCI-6040E acquisition card. A Labview-based PID loop controlled displacement to within 0.1 mm. This system was robust enough to accurately produce user-defined sine-waves at up to 2 Hz.

Example 24

In this Example 24, the CNT wrap covering a polymer wire muscle was shown to produce sound via the thermoacoustic effect during electrothermal actuation. A CNT-sheet wrapped, coiled nylon actuator (127 μm Coats and Clark D67 transparent nylon) was prepared. Instead of applying a DC voltage, a 5 kHz AC sine wave voltage of similar root-mean-square (RMS) amplitude was applied to induce actuation. Due to the high surface area and low heat capacitance of the CNT sheet, thermal actuation of the polymer wire muscle produced an audible sound at 10 kHz. The output frequency was double that of the input frequency due to Joule heating at both positive and negative voltages.

Example 25

This Example 25 demonstrated the irreversible response of a one-end-tethered nylon fiber actuator to a chemical fuel. A 127 μm Coats and Clark D67 nylon filament was wrapped with a CNT sheet containing deposited Pt-black catalyst particles (Alfa Aesar 12755). The filament was then twisted until fully coiled. This process caused significant plastic deformation of the nylon, such that even when all elastically-stored twist was removed, the filament retained its coiled shape. When placed (while unrestrained at one muscle end) over a beaker of methanol, the reaction of methanol vapor and oxygen on the platinum surface heated the actuator. This caused irreversible untwist of the coiled structure, indicative of the temperature attained.

Example 26

This Example 26 demonstrates two-end-tethered tensile actuation for a nylon fiber that was fully coiled by twist insertion and then wrapped with helical windings of carbon MWNT sheet strips that have an oppositely directed bias angle with respect to the axis of the coil. Optical micrographs of the coiled nylon fiber before and after such dual helical wrapping with MWNT sheet strips are shown in FIGS. 15A-15B.

A coiled nylon fiber muscles were prepared from ~230 μm diameter commercially-available, multi-filament nylon sewing thread (Coats & Clark) by using a two-step process. First, a coiled, twist-inserted nylon fiber (FIG. 15A) capable of retaining its shape when non-tethered was fabricated. To accomplish this, a length of the precursor sewing thread was loaded with 35 MPa stress and twisted until the thread was fully coiled. The initial polymer fiber length was 4-5 times longer than the length of the coiled structure. In order to stabilize the shape of this coiled structure, the coiled thread was heated with a hot air heat gun to above the nylon glass transition temperature for about 5 min. Such prepared polymer fiber retained the coiled structure after untethering and removal of load.

In a second preparative step, the coiled fiber was wrapped with several layers of forest-drawn MWNT sheet strip. In this procedure, the fiber was rotated at a constant speed as a MWNT sheet was drawn from a stationary forest and translated along the fiber length. MWNT sheet strip wrapping on the coiled nylon fiber (thread) wrapping was performed two times in forward direction and then two times in the reverse direction to provide helically wrapped sheet ribbons that are symmetrically plied with respect to the axis of the coiled fiber yarn. Optical microscope images of coiled fiber before and after wrapping with MWNT sheet are shown in FIGS. 15A and 15B, respectively.

For two-end-tethered actuation measurements, one end of the prepared polymer fiber muscle was attached to a stationary metal rod, which served as one electrical connection, and the opposite muscle end was connected to a thin, flexible metal wire, which served as the second electrical connection provided the second yarn tether. After loading the polymer muscle with a weight that provides 21.7 MPa, when normalized with respect to the cross-section of the initial non-twisted thread, the polymer fiber muscle was actuated by Joule heating using a square-wave voltage of variable amplitude that was applied between the stationary rod and metal wire. The surface temperature of the muscle during actuation was recorded as a function of time during the actuator cycle using a thermocouple. Also, the resistance of the MWNT joule heater during actuator cycles was recorded using a Keithley source meter. The actuation of the polymer fiber muscle induced by Joule heating was detected with a microscope equipped with a video camera. Typical time dependences of applied voltage, electrical resistance, temperature and generated strain for the muscle loaded with 21.7 MPa stress are shown in FIG. 16. The muscle reversibly contracted by up to 26% when heated.

Example 27

This Example 27 describes the tensile actuation of two-end-tethered, mandrel-coiled thermal polymer fiber muscles having a negative thermal expansion in the coil direction. In order to prepare this polymer fiber artificial muscle, an 860 µm diameter nylon 6 monofilament was first twisted to just before the on-set of coiling under a load of 200 g. Then it was wound around a mandrel in the same direction as the fiber twist. The coiled polymer fiber was then thermally annealed at 150° C. for 20 min in order to set the structure. The polymer coil made using a 0.4 mm diameter mandrel delivered 29% contraction under 3.5 MPa load when heated to 140° C. (using hot air from a heat gun). By increasing the diameter of the coil, using a 2.7 mm diameter mandrel, a contraction of up to 49% at 140° C. was achieved under a 1 MPa load.

Example 28

This Example 28 describes a thermally powered artificial muscle that uses a coiled polymer fiber yarn having a positive thermal expansion, as a result of the method used for coiling on a mandrel. This muscle operates to do mechanical work when expanding, rather than when contracting. An 860 µm diameter nylon 6 monofilament fiber was first twisted under 200 g load to just before the on-set of coiling. Then this twisted fiber was wound around a 2.7 mm diameter mandrel in an opposite direction to the inserted fiber twist. This coil was positioned, under a compressive load of 50 g (which was supported by a cantilever beam), by using a glass rod at coil center as coil guide (FIGS. 19A-19B). Heating to provide actuation was provided by using the hot air from a heat gun. The coiled polymer muscle was two-end tethered by friction with the lower and upper surfaces. A thin thermocouple, which was positioned inside the muscle coil, was used to monitor the temperature of the actuating muscle. Upon heating to approximately 140° C. the coiled polymer fiber muscle showed a reversible expansion, while lifting the 50 g load, that exceeded 55% of the coiled muscle length.

Example 29

This Example 29 demonstrated high-rate actuation enabled by immersion in a water bath. Silver-plated nylon 6,6 (Shieldex Trading, Inc., 117/17-2ply, product number: 206121011717) was coiled and two-plied to form a stable, high-stroke SZ muscle. A 100 g load of 10.8 MPa was applied and the actuator and load were both submersed in a bath of de-ionized water. In these conditions, a resonance was found wherein the rapid passive cooling allowed electrothermal actuation at rates of 5 Hz and strokes of around 7%.

Example 30

This Example 30 measured the efficiency and specific power during contraction for a coiled polyethylene actuator. Polyethylene fiber (SpiderWire Stealth Braid 6 lb test) was wrapped with CNT sheet and twisted until fully coiled. A 10 cm long sample weighing 8.5 mg was used. When heated with a rapid pulse of 390 V for 10 ms to limit heat dissipation, the actuator consumed 166 mJ. In response, the actuator lifted a 600 g weight by 0.37 mm, representing 2.18 mJ of work against gravity (0.26 kJ/kg). This amounts to an energy efficiency of 1.32% and a specific power of 25.6 kW/kg during contraction.

Example 31

This Example 31 demonstrated actuators based on polymer fibers other than nylon and polyethylene. Kevlar, Nomex, polyvinylidene fluoride (PVDF) and polyester were measured via TMA (TA Instruments Q400EM) by cyclic heating and cooling between room temperature and an actuation temperature. Kevlar and Nomex both have negative thermal expansion coefficients. Before twisting, Kevlar contracted by 0.3% upon heating to 300° C., while Nomex exhibited almost no contraction (<0.02%) when heated to 280° C. When coiled, Kevlar and Nomex contracted by 10% and 3.5% when heated to 350° C. and 280° C., respectively. In contrast, PVDF and polyester do not universally exhibit negative thermal expansion across all temperatures. Before twisting, PVDF expanded up to 0.2% in length when heated to 70° C., and subsequently contracted by 0.9% of its original length by 135° C. Polyester exhibited purely positive thermal expansion, expanding by 0.4% when heated to 230° C. However, when coiled, both materials contracted with heating, providing 10% and 16% stroke upon heating to 135° C. and 230° C., for PVDF and polyester, respectively. All coiled samples were two-end-tethered to prevent rotation.

Example 32

This Example 32 demonstrated methods to helically wrap CNT sheet strips around fiber substrates. For samples of a finite length, the fiber was supported between two motors. A CNT sheet drawn from a spinnable CNT forest was attached at a specific feed angle, which was varied depending on the required wrap thickness. By rotating the fiber and translating either the fiber or the forest along the fiber's length, an even coating of CNT sheet strip was applied with a constant feed angle. When lower resistance or higher areal sheet density were required, additional wraps could be applied at the same or different bias angles. This technique was also extended to allow continuous wrapping of fibers by drawing a fiber substrate through a spinning apparatus which winds a CNT forest around the fiber.

Example 33

This Example 33 demonstrated a simple design for providing two-dimensional displacement of a load by using an arrangement of non-parallel polymer fiber or hybrid nanofiber yarn muscles or muscle segments. A CNT-wrapped, coiled nylon actuator (fabricated from a 127 µm Coats and Clark D67 transparent nylon fiber precursor) was held between two supports, suspending a 50 g load in the middle of the yarn. The spacing between supports was adjusted so that the actuator formed a V shape with a 90 degree angle, with the load supported at the vertex. Electrodes were attached at each support, and to the 50 g weight in the middle, such that each leg of the V could be heated independently. Applying equal voltage to each leg lifted the weight vertically, while applying dissimilar voltages allowed the weight to move horizontally. This motion was used to move a capillary tube between acid, base and indicator containers, demonstrating automated dispensing and mixing of solutions.

An analogous arrangement to that of this example can be used to provide to provide three-dimension displacement of a mechanical load. For example, instead of using one V-shaped actuating polymer fiber (with independently legs), two actuating polymer fibers can be deployed (again with independently addressable legs), so as to provide independently controlled displacement in the third direction. The V-shaped second yarn muscle can optionally be identically configured as the first V-shaped yarn muscle, but oriented at 90° to the first V-shaped yarn muscle. Such 2-D and 3-D muscle configurations can be used for diverse application, including, on the macroscale, microscale, or nanoscale, the displacement of probes for nano- or micro-microscopy, or moving or tilting samples for SEM (scanning electron microscope) microscopy or TEM (transmission electron microscope) microscopy. The ability to tilt can be provided by attachment of the muscles at more than one place on the item being tilted.

Example 34

This Example 34 experimentally demonstrates thermal and electrothermal actuation of various braided or plain-weave-woven structures made from coiled, two-ply, SZ twisted nylon fiber muscles (which are either mono or multi-filament and are either with or without a conducting coating).

For the first described results, eight MWNT-ribbon-sheet-wrapped, coiled, two-ply, SZ nylon 6 fibers were assembled into a flat-braid textile. The precursor fiber for the actuating fiber muscle was a commercially obtained 130 μm diameter nylon 6 monofilament (0.005 size monofilament from Coats and Clark). Twist was inserted in this fiber (3280 turns/m using a 30 g weight to provide fiber tension) and then the twisted fiber was folded back on itself to make a SZ two-ply yarn. The two-ply SZ yarn was helically wrapped with a forest-drawn MWNT sheet strip, so as to provide five wrapped layers of MWNT sheet strip. Before this MWNT coating process the outer diameter of the two-ply SZ yarn was 538 μm±2%, and after this process the diameter increased to 567 μm±3%. The typical fiber resistance of the two-ply polymer fiber after five-layer MWNT coating was 682 Ω/cm, and this resistance decreased to 167 Ω/cm for the flat braid structure in which eight wrapped SZ nylon 6 fibers operate in parallel.

Figures 21A, 21B, 21C, 21D:
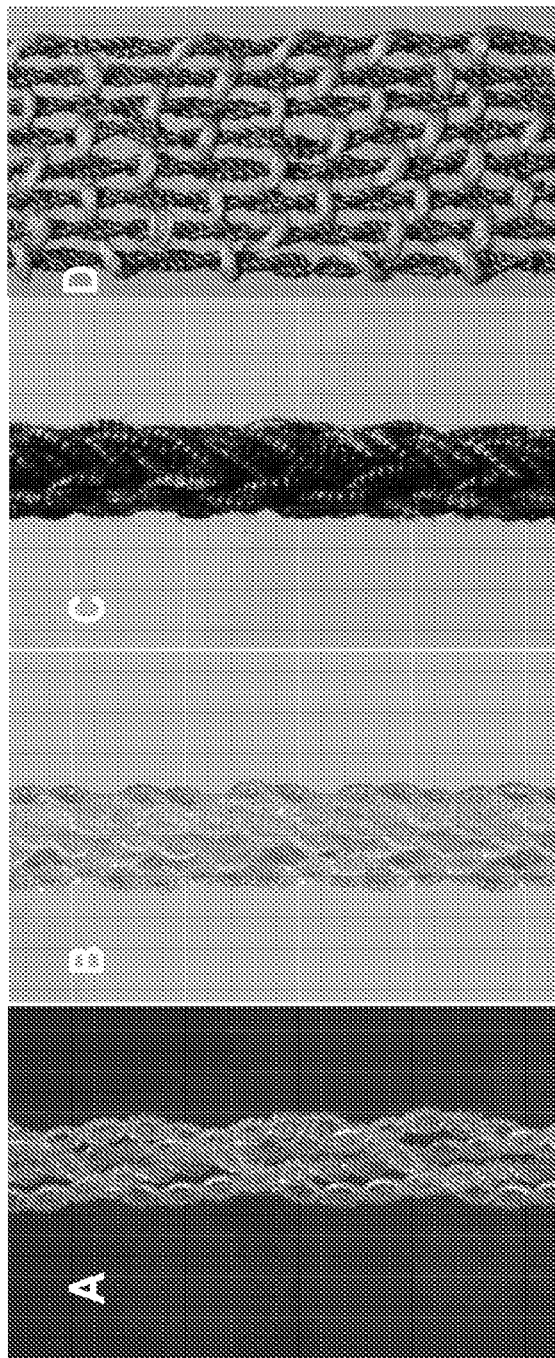
FIGS. 21A-21D are photographs of various woven structures made using coiled SZ nylon fiber muscles, which were fabricated by twisting nylon fiber to produce complete coiling and then SZ plying the coiled nylon fiber to produce a torque balanced two-ply structure.

Actuation was performed under constant 520 g load, using a square wave 100 mA current (3 seconds on, 5 seconds off). For a 12 cm long textile sample, 1.6 cm displacement was observed, which corresponds to a 13.3% stroke. A second flat braid textile (pictured in FIG. 21A) was made analogously from four non-coated, coiled, two-ply, SZ nylon 6 monofilaments, which could be actuated by environmentally provided heating or photothermal heating.

A round braided rope (pictured in FIG. 21C) was made by braiding eight of the above described MWNT-coated, SZ twisted nylon 6 yarn muscles. The resistance of the entire braided structure was 83 Ω/cm. Actuation was performed under constant 550 g load, using a square-wave voltage of 5.5 V/cm (3 seconds on and 5 seconds off). For the 7.29 cm long braid, the observed 1 cm contraction during electrothermal heating corresponds to a 13.7% stroke. Another round braid was analogously made by braiding eight SZ twisted nylon 6 yarns, but without incorporation of the MWNT electronic conductor. This braid (pictured in FIG. 21B) could be actuated by direct thermal heating or photothermal heating.

A plain weave textile was made by incorporating ten, non-coated SZ, 2-ply coiled nylon fibers (prepared as above described) in the warp direction and cotton yarn in the weft direction. This textile can be actuated by direct thermal heating. Another plain-weave structure (pictured in FIG. 21D) was constructed by first converting a commercially available silver-coated nylon 6,6 multi-filament fiber into a SZ, 2-ply, coiled nylon muscle. Eight such coiled muscle fibers were incorporated in the warp direction of a plain weave textile, while cotton yarns were in the weft direction. The textile resistance in the warp direction was 60 Ω/cm. Actuation was performed under constant 1.3 kg load using a warp direction textile length of 6.25 cm. When applying a square wave voltage of 90 V (with 6 seconds on and 25 seconds off), a displacement of 7.9 mm was observed, corresponding to a stroke of 12.6%.

Example 35

This Example 35 demonstrated a "breathing textile" in which electrothermally or thermally powered nylon fiber muscles opened and closed porosity for a McKibben braid textile weave. The utilized CNT-coated SZ, 2-ply coiled nylon muscles were made as described in Example 34. Eight of these muscles were braided together to make the actuator, which is located inside the McKibben braid. The weave pore area reversibly increased by up to 16% (as shown by comparing the FIG. 22A and FIG. 21A photographs) when this eight-muscle-based braid was electrothermally actuated (using a 40V square-wave voltage that was 5 s on and 20 s off) under a 350 g load.

Example 36

This Example 36 investigates the effect of twist density on thermal actuation for a heat-set, SS nylon fiber in which the twist direction of coiling is the same as the twist direction within the fiber. An oven (150° C. for 30 minutes) was used to heat set the 300 um diameter, mandrel-coiled nylon fiber and thermal actuation was subsequently provided using hot air from a heat gun. For the same applied load, thermally set SS coiled nylon yarn with a twist density below 170 turns/meter (for instance, coils with a fiber twist density of 0, 100, 120, and 150 turns/meter) irreversibly elongate upon heating to above the 150° C. heat-set temperature and a coiled nylon with a twist density above 170 turns/m (for example, 200 turns/m) nearly reversibly contracts when heated and elongates when cooled. Hence, the critical twist density is about 170 turns/m of fiber twist.

Example 37

This Example 37 conceptually demonstrated the use of a coiled nylon fiber muscle for harvesting thermal energy as mechanical energy due to temperature changes, and the use of a mechanically attached array of five cantilevered piezoelectric plates for converting this mechanical energy to electrical energy. This electrical energy was generated since the nylon fiber muscle was attached to the free ends of the piezoelectric cantilevers. Though for convenience in the present example the temperature change of the coiled nylon fiber muscle was electrically produced, an identical arrangement can be used for harvesting the thermal energy resulting from changes in ambient temperature.

Example 38

This Example 38 demonstrates the use of a polymer-muscle-powered system for regulation of light or air flow based on changes of environmental temperature. This application embodiment uses a mandrel-coiled nylon muscle with positive thermal expansion to do mechanical work when it expands while under compression, which is an embodiment that can also be used for smart textiles that increase porosity when temperature increases. An 860 μm diameter nylon 6 monofilament fiber was first twisted under 200 g load to just before the on-set of coiling. Then this twisted fiber was wound around a 2.7 mm diameter mandrel in an opposite direction to the inserted fiber twist and heat set at a temperature that is higher than the application temperature of 80° C. Two coils were prepared in this way. They were positioned around two metal rods that served as guides for their movements. Upon heating to approximately 80° C. by using the hot air from a heat gun, the coils expanded, moving apart a set of plastic tubes that were supported by nylon filament running between the turns of the coils (FIG. 23A). Upon natural cooling, the coils return to their original position (FIG. 23B), thereby closing the shutter.

Various Features of the Invention

The present invention includes nanofiber-based yarn actuators (such as artificial muscles). The present invention further includes actuators (artificial muscles) including twist-spun nanofiber yarn or twist-inserted polymer fibers that generate torsional and/or tensile actuation when powered electrically, photonically, chemically, by absorption, or by other means. These artificial muscles utilize non-coiled or coiled yarns and can be either neat or including a guest. The present invention also includes devices including these artificial muscles.

The disclosures of all patents, patent applications, and publications cited herein are hereby incorporated herein by reference in their entirety, to the extent that they provide exemplary, procedural, or other details supplementary to those set forth herein. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above.

What is claimed is:

1. A thermally-powered polymer fiber tensile actuator comprising a twisted polymer fiber or yarn, wherein
    (a) the thermally-powered polymer fiber tensile actuator has a first length at a first temperature;
    (b) the thermally-powered polymer fiber tensile actuator has a second length at a second temperature;
    (c) the first length and the second length are different in length by at least 5%;
    (d) the thermally-powered polymer fiber tensile actuator is operable to reversibly actuate; and
    (e) the thermally-powered polymer fiber tensile actuator is a thermally-powered, non-electrochemically-powered, and non-electroactively-powered, polymer fiber tensile actuator.

2. The thermally-powered polymer fiber tensile actuator of claim 1, wherein
    (a) the thermally-powered polymer fiber tensile actuator has the first length at the first temperature at an applied load; and
    (b) the thermally-powered polymer fiber tensile actuator has the second length at the second temperature at the applied load.

3. The thermally-powered polymer fiber tensile actuator of claim 2, wherein the thermally-powered polymer fiber tensile actuator has a third length at a third temperature at the applied load, the third temperature being between the first temperature and the second temperature, and the third length being between the first length and second length.

4. The thermally-powered polymer fiber tensile actuator of claim 2, wherein the actuator is operable in a continuous range.

5. The thermally-powered polymer fiber tensile actuator of claim 1, wherein the thermally-powered polymer fiber tensile actuator has no applied load.

6. The thermally-powered polymer fiber tensile actuator of claim 1, wherein the polymer fiber has polymer chains on the surface that are aligned along a direction having an angle of at least 20° relative to the axis of the twisted polymer fiber or yarn.

7. The thermally-powered polymer fiber tensile actuator of claim 1, wherein the actuation of the polymer fiber tensile actuator exhibits the substantial absence of hysteresis.

8. The thermally-powered polymer fiber tensile actuator of claim 1, wherein the actuation of the polymer fiber tensile actuator exhibits less than 2° C. hysteresis.

9. The thermally-powered polymer fiber tensile actuator of claim 1, wherein the twisted polymer fiber or yarn comprises a twisted and coiled polymer fiber or yarn.

10. A thermally-powered polymer fiber actuator comprising a twisted polymer fiber or yarn, wherein
    (a) the thermally-powered polymer fiber actuator is operable to reversibly actuate; and
    (b) the thermally-powered polymer fiber actuator is a thermally-powered, non-electrochemically-powered, and non-electroactively-powered, polymer fiber actuator.

11. The thermally-powered polymer fiber actuator of claim 10, wherein the actuator is operable in a continuous range.

12. The thermally-powered polymer fiber actuator of claim 10, wherein the polymer fiber has polymer chains on the surface that are aligned along a direction having an angle of at least 20° relative to the axis of the twisted polymer fiber or yarn.

13. The thermally-powered polymer fiber actuator of claim 10, wherein the actuation of the polymer fiber actuator exhibits the substantial absence of hysteresis.

14. The thermally-powered polymer fiber actuator of claim 10, wherein the actuation of the polymer fiber actuator exhibits less than 2° C. hysteresis.

15. The thermally-powered polymer fiber actuator of claim 10, wherein the actuator stroke is at least 5%.

16. The thermally-powered polymer fiber actuator of claim 10, wherein the actuator has a stroke amplification factor of 5 or greater.

17. The thermally-powered polymer fiber actuator of claim 10, wherein the twisted polymer fiber or yarn comprises a twisted and coiled polymer fiber or yarn.

18. An article comprising the thermally-actuating polymer fiber actuator of claim 10, wherein the article is a textile or a garment.

19. The article of claim 18, wherein the article is a textile.

20. The article of claim 19, wherein the thermally-actuating polymer fiber actuator has a twisted polymer fiber or yarn that comprises a twisted and coiled polymer fiber or yarn.

21. The article of claim 18, wherein the article is a garment.

\* \* \* \* \*